(12) United States Patent
Murade

(10) Patent No.: US 7,064,735 B2
(45) Date of Patent: Jun. 20, 2006

(54) ELECTRO-OPTICAL DEVICE

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 10/720,351

(22) Filed: Nov. 25, 2003

(65) Prior Publication Data

US 2004/0114088 A1   Jun. 17, 2004

Related U.S. Application Data

(62) Division of application No. 09/635,400, filed on Aug. 10, 2000, now Pat. No. 6,683,592.

(30) Foreign Application Priority Data

| Aug. 20, 1999 | (JP) | ................................. 11-234584 |
| Aug. 20, 1999 | (JP) | ................................. 11-234585 |
| Jun. 26, 2000 | (JP) | ................................. 2000-190957 |

(51) Int. Cl.
   *G09G 3/36* (2006.01)
   *G09G 3/18* (2006.01)
   *G02F 1/1335* (2006.01)
   *G09K 19/52* (2006.01)

(52) U.S. Cl. ............................ 345/87; 345/96; 345/54; 349/107; 349/166

(58) Field of Classification Search ................ 345/54, 345/55, 87, 92, 94, 96, 98–100, 211, 209; 349/37, 77, 84, 85, 123, 141, 156, 166, 107, 349/155; 348/792, 37, 293

See application file for complete search history.

(56) References Cited

U.S. PATENT DOCUMENTS

| 4,277,144 A | 7/1981 | Saurer et al. |
| 5,416,619 A | 5/1995 | Koike |
| 5,648,793 A | 7/1997 | Chen |
| 6,072,557 A | 6/2000 | Kishimoto |
| 6,507,381 B1 | 1/2003 | Katsuya et al. |

FOREIGN PATENT DOCUMENTS

| EP | 0 843 194 A1 | 5/1998 |
| EP | 0 987 582 A2 | 3/2000 |
| JP | 01-108113 | 9/1989 |
| JP | 04-251285 | 9/1992 |

(Continued)

*Primary Examiner*—Richard Hjerpe
*Assistant Examiner*—Hau Nguyen
(74) *Attorney, Agent, or Firm*—Oliff & Berridge, PLC

(57) ABSTRACT

An electro-optical device is provided which includes a TFT array substrate having pixel electrodes, and an opposing substrate having an opposing electrode. The surface of a substrate beneath the pixel electrodes in the TFT array substrate or the surface of a substrate beneath the opposing electrode in the opposing substrate is raised in a plurality of projections in an area facing the spacing between adjacent pixel electrodes which are driven by mutually opposite polarity voltages in an alternating drive manner. Arranged on top of the projections are edge portions of the adjacent pixel electrodes. The substrate surface is planarized to be flat in an area thereof facing the spacing between adjacent pixel electrodes which are driven by the same polarity voltages in an alternating drive method. With this arrangement, the electro-optical device such as a liquid-crystal display device provides a high aperture ratio of a pixel and presents a high-contrast and bright image by reducing an orientation defect of a liquid crystal resulting from a step in the surface of the substrate facing the liquid crystal and an orientation defect of the liquid crystal resulting from a transverse electric field.

9 Claims, 31 Drawing Sheets

| | FOREIGN PATENT DOCUMENTS | |
|---|---|---|
| JP | 04-305625 | 10/1992 |
| JP | 05-113578 | 5/1993 |
| JP | 05-265046 | 10/1993 |
| JP | 06-194685 | 7/1994 |
| JP | 06-274130 | 9/1994 |
| JP | 07-013164 | 1/1995 |
| JP | 07-20496 A | 1/1995 |
| JP | 07-020497 | 1/1995 |
| JP | 07-152023 | 6/1995 |
| JP | 08-006002 | 1/1996 |
| JP | 08-015678 | 1/1996 |
| JP | 08-029790 | 2/1996 |
| JP | 08-292423 | 11/1996 |
| JP | 09-015643 | 1/1997 |
| JP | 09-068721 A | 3/1997 |
| JP | 09-080427 | 3/1997 |
| JP | 09-096816 | 4/1997 |
| JP | 09-211461 | 8/1997 |
| JP | 09-230364 | 9/1997 |
| JP | 09-318960 | 12/1997 |
| JP | 10-010538 | 1/1998 |
| JP | 10-123564 | 5/1998 |
| JP | 10-221715 A | 8/1998 |
| JP | 10-268350 | 10/1998 |
| JP | 10-301100 | 11/1998 |
| JP | 11-095220 | 4/1999 |
| JP | 11-109356 | 4/1999 |
| JP | 11-133462 | 5/1999 |
| JP | 11-160730 | 6/1999 |
| JP | 11-183934 | 7/1999 |
| JP | 11-194342 | 7/1999 |
| JP | 11-194360 | 7/1999 |
| JP | 11-202293 | 7/1999 |
| JP | 11-202296 | 7/1999 |
| JP | 11-202316 | 7/1999 |
| JP | 11-202367 | 7/1999 |
| JP | 11-212053 | 8/1999 |
| JP | 11-218781 | 8/1999 |
| JP | 2001-133749 | 5/2001 |
| JP | 2001-133750 | 5/2001 |

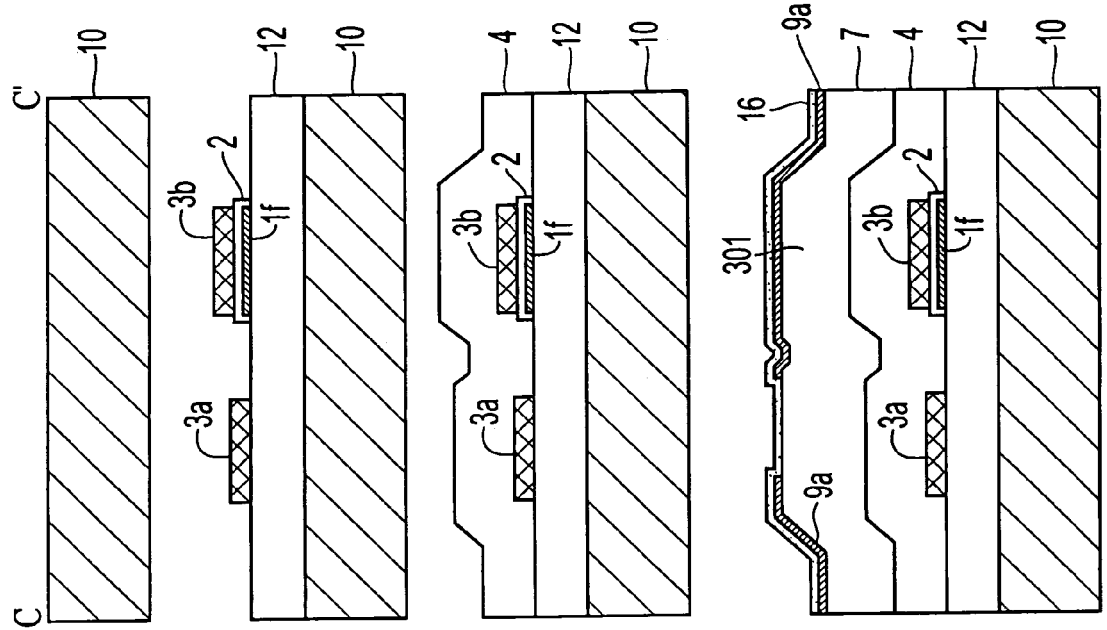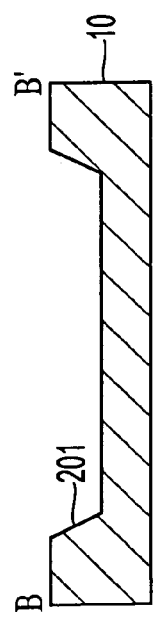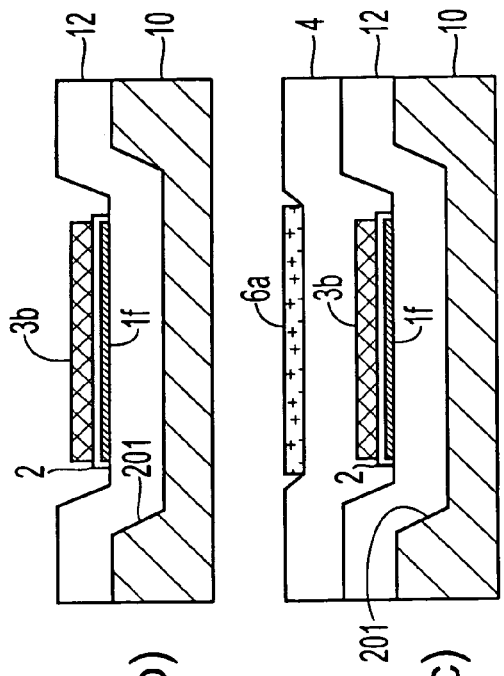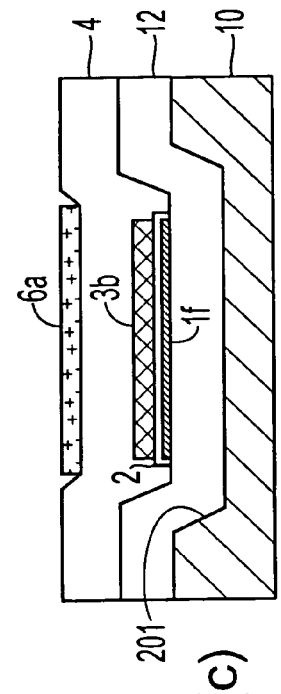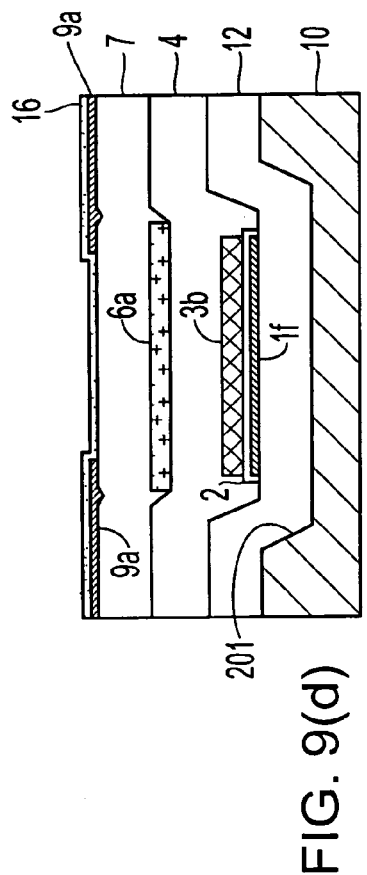
FIG. 9(a)
FIG. 9(b)
FIG. 9(c)
FIG. 9(d)

ELECTRO-OPTICAL DEVICE

This is a Division of application Ser. No. 09/635,400 filed Aug. 10, 2000, now U.S. Pat. No. 6,683,592. The entire disclosure of the prior application is hereby incorporated by reference herein in its entirety.

BACKGROUND OF THE INVENTION

1. Field of Invention

The present invention relates to the technical field of an electro-optical device such as a liquid-crystal display device. More particularly, the present invention relates to the technical field of an electro-optical device, such as a thin-film transistor (hereinafter referred as TFT) active-matrix liquid-crystal display device, which adopts an alternating drive method in which the polarities of the voltages applied to adjacent pixel electrodes are periodically alternated for every pixel row or every pixel column, so that the voltages applied to adjacent pixel electrodes in a row direction or in a column direction are inverted in polarity.

2. Description of Related Art

Electro-optical devices, such as liquid-crystal display devices, include an electro-optical material, such as a liquid crystal, interposed between a pair of substrates. The alignment state of the electro-optical material is controlled by the property of the electro-optical material and an alignment layer formed on the substrate on its surface facing the electro-optical material. If there is a step in the surface of the alignment layer (in other words, if there is a step in the surface of the pixel electrode beneath the alignment layer or in the surface of an interlayer insulator serving a substrate for the pixel electrode), an orientation defect (a disclination) occurs in the electro-optical material, depending on the magnitude of the step. If such an orientation defect occurs, proper driving of the electro-optical material in that portion becomes difficult, and the contrast ratio of the device drops due to a visible defect in the device. Since a TFT active-matrix electro-optical device includes, on a TFT array substrate, TFTs in many locations thereof for controlling and switching a variety of lines such as scanning lines, data lines, and capacitive lines, and pixel electrodes, a step inevitably occurs in the surface of an alignment layer in accordance with the presence of the lines and elements, if no planarizing process is performed.

Conventionally, the portion of the substrate suffering from such a step is aligned with the spacing between adjacent pixel electrodes, and a light-shielding layer called a black mask or a black matrix covers the portion of the step (i.e., the spacing between the pixel electrodes) so that the portion of the electro-optical material suffering from the orientation defect may remain hidden or may not contribute to display light.

Techniques for planarizing the surface of a substrate beneath the pixel electrode has been developed, in which an interlayer insulator beneath the pixel electrode is fabricated of a planarized film, such as an organic SOG (Spin On Glass) film, so that a step resulting from the presence of lines and TFTs may not be created.

The electro-optical device of this sort typically adopts an alternating drive method in which the polarity of a potential applied to the pixel electrodes is alternated at a predetermined pattern to prevent degradation of the electro-optical material as a result of the application of a direct current voltage and to control a cross-talk and flickering of a display screen image. A 1H alternating drive method is relatively easy to control and presents a high-quality image display, wherein during the presentation of a video signal of one frame or one field, the pixel electrodes arranged on an odd row are driven by a positive polarity relative to the potential of an opposing electrode, while the pixel electrodes arranged on an even row are driven by an negative polarity relative to the potential of the opposing electrode, and during the presentation of a video signal of a next frame or a next field, conversely, the pixel electrodes arranged on the even row are driven by a positive polarity while the pixel electrodes arranged on the odd row are driven by a negative polarity (in other words, the pixel electrodes on the same row are driven by the same polarity potential and the potential polarity is alternated every row with the period of frame or field). A 1S alternating drive method is also easy to control and presents a high-quality image display, wherein the pixel electrodes on the same column are driven by the same polarity potential while the potential polarity is alternated every column with the period of frame or field.

SUMMARY OF THE INVENTION

The technique to cover the above-referenced step with the light-shielding layer narrows the aperture of the pixel depending on the size of the step portion, and cannot meet the basic requirement in the technical field of the electro-optical device that the aperture ratio of the pixel be increased in a limited image display area to present a brighter image. The number of lines and TFTs per unit area increases as the pixel pitch becomes fine for high-definition video presentation. Since there is a limitation to the miniaturization of the lines and the TFTs, the ratio of the step portion to the image display area becomes relatively high, and the problem of the step portion becomes serious as high-definition design is promoted in the electro-optical device.

In accordance with the above-referenced technique for planarizing the interlayer insulator beneath the pixel electrodes, no particular problem will be presented when adjacent pixel electrodes are of the same polarity in a TFT array substrate. When the phases of the voltages (the voltages applied to the pixel electrodes adjacent in the column direction in the 1H alternating drive method, and the voltages applied to the pixel electrodes adjacent in the row direction in the 1S alternating drive method) are opposite in polarity as in the above-referenced 1H alternating drive method or 1S alternating drive method, the gap between the pixel electrode and the opposing electrode becomes wider at the edge of the pixel electrode over the line and the TFT when the planarizing process is performed than when no planarizing process is performed. A transverse electric field taking place between the adjacent pixel electrodes (specifically, an electric field in parallel with the surface of the substrate or an slant electric field having a component in parallel with the surface of the substrate) relatively intensifies. If such a transverse electric field is applied to the electro-optical material which is expected to work under a longitudinal electric field present between the pixel electrodes and the opposing electrode (i.e., an electric field perpendicular to the surface of the substrate), an orientation defect takes place in the electro-optical material, visible defect occurs there, and the contrast ratio drops. Although the area of the transverse electric field can be covered with the light-shielding layer, the aperture of the pixel is reduced with the area of the transverse electric field. As the distance between the adjacent pixel electrodes shrinks with a fine pixel pitch, the transverse electric field intensifies, and these become more problematic as high-definition design is promoted more in the electro-optical device.

The present invention has been developed in view of at least the above problems. It is an object of the present invention to at least provide an electro-optical device such as a liquid-crystal display device, which may present a high aperture ratio of pixel while displaying a high-contrast-ratio, bright and high-quality image, by generally reducing an orientation defect resulting from a step in the surface of a substrate in contact with an electro-optical material, such as a liquid crystal, and an orientation defect resulting from a transverse electric field.

An electro-optical device of an exemplary embodiment of the present invention includes a first substrate having a plurality of pixel electrodes, a second substrate having an opposing electrode facing the pixel electrodes, and an electro-optical material interposed between the first substrate and the second substrate, wherein the thickness of the electro-optical material between adjacent pixel electrodes which are driven by mutually opposite polarity voltages may be set to be thinner than the thickness of the electro-optical material between adjacent pixel electrodes which are driven by the same polarity voltages.

In the electro-optical device of this exemplary embodiment of the present invention, the pixel electrodes may be driven in an alternating drive manner on a row by row basis or on a column by column basis. The thickness of the electro-optical material between pixel electrodes aligned in perpendicular to a row or a column of the pixel electrodes which is driven in an alternating drive manner may be set to be thinner than the thickness of the electro-optical material between pixel electrodes aligned with the row or the column of the pixel electrodes which is driven in an alternating drive manner.

A 1H alternating drive method and a 1S alternating drive method effectively work as the alternating drive manner.

Since the thickness of the electro-optical material between the adjacent pixel electrodes which are driven by mutually opposite polarity voltages is thin in this arrangement, a longitudinal electric field taking place between the pixel electrode and the opposing electrode is intensified. The longitudinal electric field is intensified relative to a transverse electric field in an area where the transverse electric field is generated, and the occurrence of an orientation defect of the electro-optical material due to the transverse electric field is reduced.

In the electro-optical device of this exemplary embodiment of the present invention, the first substrate may include a plurality of projections formed beneath the pixel electrodes in a position corresponding to the spacing between the adjacent pixel electrodes which are driven by the mutually opposite polarity voltages.

The second substrate may include a plurality of projections formed beneath the opposing electrode in a position corresponding to the spacing between the adjacent pixel electrodes which are driven by the mutually opposite polarity voltages.

The projections on the first substrate may be formed by laminating an insulating layer and a wiring layer on the first flat substrate.

The projections on the second substrate may form a light-shielding layer.

It is contemplated that the cross section of the projections, sectioned in a plane perpendicular to the length direction of the projections, may have a variety of shapes, such as a trapezoid, a triangle, or a semi-circle.

The projections may be produced by making use of a conductor layer or interlayer insulator, forming lines and thin-film transistors, for instance, or may be fabricated by locally adding a film for the projections between the first substrate and the pixel electrode in a lamination process.

As long as the cross-sectional shape of the projections is determined in accordance with the property of the electro-optical material such as a liquid crystal so that the orientation defect of the electro-optical material resulting from the step is minimized, the projections is considered consistent with the object of the present invention even if the projections partly increases the thickness of the electro-optical material.

The edge portion of each of the adjacent pixel electrodes may be positioned on top of the projections.

In this case, the spacing between the edges of the adjacent pixel electrodes is preferably approximately equal to the distance between the opposing electrode on the second substrate and the edge portion of the pixel electrode.

Preferably, the spacing between the edges of the adjacent pixel electrodes is greater than half a cell gap thereof.

In this embodiment, the longitudinal electric field is intensified relative to the transverse electric field to the degree that the adverse effect of the transverse electric field is not pronounced. Without thinning the thickness of the electro-optical material, the spacing between the pixel electrodes is narrowed. If the pixel pitch becomes fine, not only the aperture ratio is maintained, but also the thickness of the electro-optical material is controlled.

The thickness of the projections is preferably at least 300 nm.

With this arrangement, the longitudinal electric field in the area where the transverse electric field is generated intensifies as the thickness of the electro-optical material is reduced. Since the step is raised to be 300 mm or more in an area where groups of pixel electrodes are adjacent to each other, the thickness is reduced accordingly, and the longitudinal electric field is intensified relative to the transverse electric field in the area to the degree that the adverse effect of the transverse electric field is not pronounced in practice.

When the electro-optical material is a TN (Twisted Nematic) liquid crystal, the projections preferably includes an inclined sidewall, and the pretilt angle of the twisted nematic liquid crystal is preferably equal to the inclination angle of the inclined sidewall of the projections.

In accordance with this embodiment, in principle, the TN liquid-crystal molecules, substantially in parallel with the surface of the substrate with no voltage applied, are aligned to be gradually twisted from the first substrate to the second substrate. With the tapered sidewall formed on the substrate surface, a good liquid-crystal alignment state, nearly as good as when the thickness of the TN liquid crystal remains fixed at the center of the pixel electrode, is obtained even if the thickness of the TN liquid crystal gradually decreases as it runs laterally. Specifically, the liquid crystal orientation defect due to the step is minimized in the portion of the liquid crystal that is locally thinned to reduce the liquid-crystal orientation defect attributed to the transverse electric field.

Since the pretilt angle of the TN liquid crystal in the first substrate matches the inclination angle of the inclined sidewall of the projections in accordance with this embodiment, the TN liquid-crystal molecules, substantially in parallel with the surface of the substrate with no voltage applied, are aligned to be inclined at a pretilt angle as large as several degrees with respect to the surface of the substrate. With the pretilt angle of the TN liquid crystal on the first substrate matching the inclination angle of the tapered sidewall, a good liquid-crystal alignment state, nearly as good as when the thickness of the TN liquid crystal remains fixed at the center of the pixel electrode, is obtained even if the thickness of the TN liquid crystal gradually decreases toward as it runs laterally. Here, "the pretilt angle of the TN liquid crystal on the first substrate matching the inclination angle of the tapered sidewall" means that both angles correspond to the degree that a good liquid-crystal orientation state nearly as good as when the thickness of the TN liquid crystal remains constant is obtained, and a permissible range of agreement is determined experimentally, theoretically and through experience.

The electro-optical material may be a VA (Vertically Aligned) liquid crystal, and the projections may include a sidewall substantially perpendicular to the surface of the first substrate.

In accordance with this embodiment, in principle, VA liquid-crystal molecules are aligned to be substantially perpendicular to the substrate with no voltage applied state, and the liquid crystal orientation is forced to be disturbed in an area where a border of substrate surfaces different in level is present. If the border of the substrate surfaces rises vertically, the portion of the liquid crystal subject to orientation disturbance is reduced in the area. A liquid crystal orientation state, nearly as good as when the thickness of the VA liquid crystal remains fixed, is obtained in a portion of the liquid crystal in a substantially flat area on the substrate relatively higher in level and in a portion of the liquid crystal in a flat area on the substrate relatively lower in level. The liquid crystal orientation defect resulting from the step where the thickness of the liquid crystal is locally thinned to reduce the liquid crystal orientation defect attributed to the transverse electric field is reduced.

In the electro-optical device of this exemplary embodiment of the present invention, the first substrate may include a flat area formed on the side thereof facing the electro-optical material in a position corresponding to the spacing between the adjacent pixel electrodes which are driven by the same polarity voltages.

The first substrate preferably includes a groove on the flat area of the surface thereof, and a line is preferably formed in an area corresponding to the groove.

In accordance with this embodiment, the planarizing process is relatively easily performed for a relatively high flatness by forming a groove by etching the first substrate and an interlayer insulator to be positioned beneath the lines, such as the data line and the scanning line, and by burying the data line and scanning line into the groove.

An electro-optical device of another exemplary embodiment of the present invention includes a first substrate having a plurality of pixel electrodes, a second substrate having an opposing electrode facing the pixel electrodes, an electro-optical material interposed between the first substrate and the second substrate, and a plurality of projections formed on the first substrate beneath the pixel electrodes in a position corresponding to the spacing between adjacent pixel electrodes which are driven by mutually opposite polarity voltages.

An electro-optical device of another exemplary embodiment of the present invention includes a first substrate having a plurality of pixel electrodes, a second substrate having an opposing electrode facing the pixel electrodes, an electro-optical material interposed between the first substrate and the second substrate, and a plurality of projections formed on the second substrate beneath the opposing electrode in a position corresponding to the spacing between adjacent pixel electrodes which are driven by mutually opposite polarity voltages.

An electro-optical device of another exemplary embodiment of the present invention includes a first substrate having a plurality of pixel electrodes, a second substrate having an opposing electrode facing the pixel electrodes, an electro-optical material interposed between the first substrate and the second substrate, and a flat area formed on the side of the first substrate facing the electro-optical material in a position corresponding to the spacing between adjacent pixel electrodes which are driven by the same polarity voltages.

An electro-optical device of another exemplary embodiment of the present invention includes an element-array substrate having a plurality of data lines, a plurality of scanning lines intersecting the data lines, a plurality of pixel electrodes arranged in a matrix, each pixel electrode arranged in an area surrounded by the data lines and the scanning lines, and a switching element, connected to the data line and the scanning line, for outputting a video signal to the pixel electrode, an opposing substrate having an opposing electrode facing the pixel electrodes, an electro-optical material interposed between the element-array substrate and the opposing substrate, a flat area formed on the element-array substrate on the side thereof facing the electro-optical material in an area along the data line, and a projection formed on the element-array substrate on the side thereof facing the electro-optical material in an area along the scanning line.

The plurality of the pixel electrodes arranged in a matrix are preferably driven in an alternating drive manner on a scanning line by scanning line basis.

The projection may be formed in an area of a capacitive line extending along the scanning line.

The projection may have a flat portion on the peak thereof.

The flat area may produced by forming a groove in an area on the element-array substrate along the data line.

An electro-optical device of another exemplary embodiment of the present invention includes an element-array substrate having a plurality of data lines, a plurality of scanning lines intersecting the data lines, a plurality of pixel electrodes arranged in a matrix, each pixel electrode arranged in an area surrounded by the data lines and the scanning lines, and a switching element, connected to the data line and the scanning line, for outputting a video signal to the pixel electrode, an opposing substrate having an opposing electrode facing the pixel electrodes, an electro-optical material interposed between the element-array substrate and the opposing substrate, a projection formed on the element-array substrate on the side thereof facing the electro-optical material in an area along the data line, and a flat area formed on the element-array substrate on the side thereof facing the electro-optical material in an area along the scanning line.

The plurality of the pixel electrodes arranged in a matrix are preferably driven in an alternating drive manner on a data line by data line basis.

The flat area may be formed in an area of a capacitive line extending along the scanning line.

The projection may have a flat portion on the peak thereof.

The flat area may produced on the element-array substrate by forming a groove in an area along the scanning line and the capacitive line.

An electro-optical device of another exemplary embodiment of the present invention includes an element-array substrate having a plurality of data lines, a plurality of scanning lines intersecting the data lines, a plurality of pixel electrodes arranged in a matrix, each pixel electrode arranged in an area surrounded by the data lines and the scanning lines, and a switching element, connected to the data line and the scanning line, for outputting a video signal to the pixel electrode, an opposing substrate having an opposing electrode facing the pixel electrodes, an electro-optical material interposed between the element-array substrate and the opposing substrate, a flat area formed on the opposing substrate on the side thereof facing the electro-optical material in an area corresponding to the data line of the element-array substrate, and a projection formed on the opposing substrate on the side thereof facing the electro-optical material in an area corresponding to the scanning line of the element-array substrate.

The plurality of the pixel electrodes arranged in a matrix are preferably driven in an alternating drive manner on a scanning line by scanning line basis.

The projection may be formed in an area of a capacitive line extending along the scanning line.

The element-array substrate may include a groove, corresponding to an area in which the data line extends, for planarizing the surface of the element-array substrate facing the electro-optical material.

The element-array substrate may include, on the surface thereof, a groove in an area corresponding to the area where the scanning line extends, for planarizing the surface of the element-array substrate facing the electro-optical material.

An electro-optical device of another exemplary embodiment of the present invention includes an element-array substrate having a plurality of data lines, a plurality of scanning lines intersecting the data lines, a plurality of pixel electrodes arranged in a matrix, each pixel electrode arranged in an area surrounded by the data lines and the scanning lines, and a switching element, connected to the data line and the scanning line, for outputting a video signal to the pixel electrode, an opposing substrate having an opposing electrode facing the pixel electrodes, an electro-optical material interposed between the element-array substrate and the opposing substrate, a projection formed on the opposing substrate on the side thereof facing the electro-optical material in an area corresponding to the data line of the element-array substrate, and a flat area formed on the opposing substrate on the side thereof facing the electro-optical material in an area corresponding to the scanning line of the element-array substrate.

The plurality of the pixel electrodes arranged in a matrix are preferably driven in an alternating drive manner on a scanning line by scanning line basis.

The element-array substrate may include, on the surface thereof, a groove, in an area corresponding to the area where which the data line extends, for planarizing the surface of the element-array substrate facing the electro-optical material.

The element-array substrate may include, on the surface thereof, a groove, in an area corresponding to the area where the scanning line extends, for planarizing the surface of the element-array substrate facing the electro-optical material.

The electro-optical device of the present invention at least reduces the orientation defect of the electro-optical material resulting from the transverse electric field and the orientation defect of the electro-optical material resulting from the step and the light-shielding layer for covering the orientation defect portions of the electro-optical material is reduced in size. The aperture ratio of each pixel is increased without creating image defects such as visible defect, and a high-contrast ratio, bright, and high-quality image is presented.

The operation and other advantages of the present invention will be shown in the following discussion of exemplary embodiments.

BRIEF DESCRIPTION OF THE DRAWINGS

FIGS. 9(a) through 9(d) are process diagrams showing manufacturing process of the electro-optical device of the first exemplary embodiment.

DETAILED DESCRIPTION OF PREFERRED EMBODIMENTS

Figure 1:
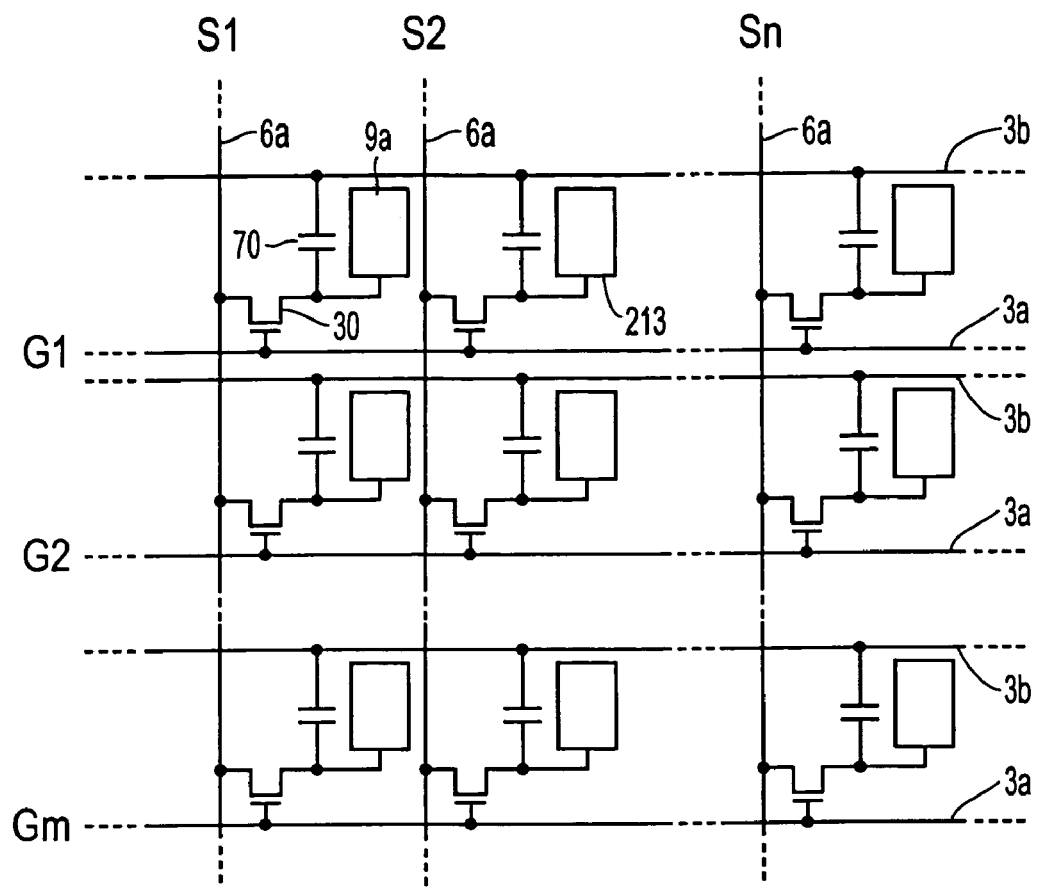
FIG. 1 is an equivalent circuit diagram of a variety of elements and lines in a plurality of pixels arranged in a matrix, constituting an image display area of the electro-optical device of a first exemplary embodiment.

The exemplary embodiments of the present invention are now discussed, referring to the drawings. In each of the following exemplary embodiments, the electro-optical device of the present invention is incorporated in a liquid-crystal display device.

First Exemplary Embodiment

Figure 2:
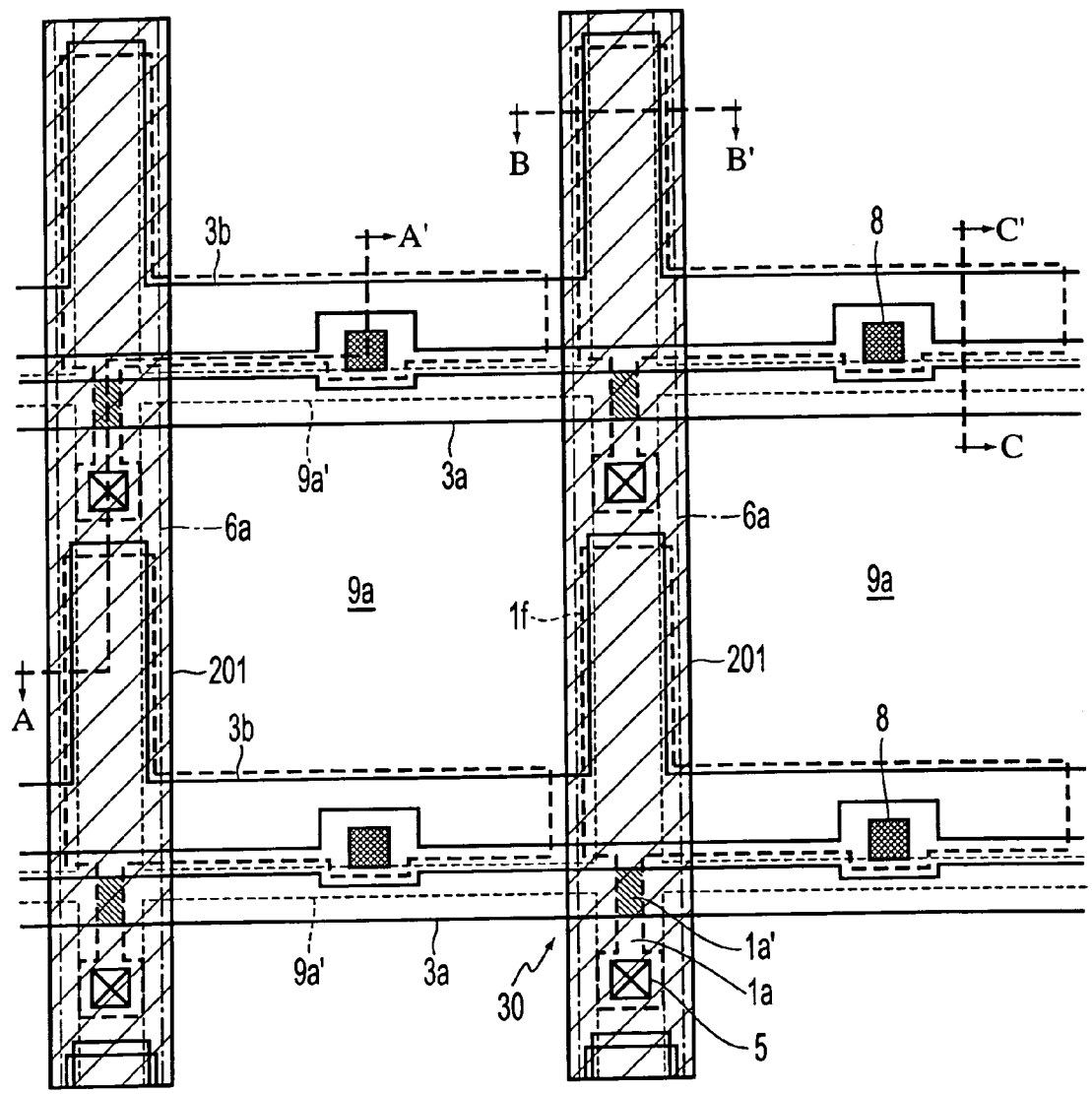
FIG. 2 is a plan view showing a plurality of pixel groups composed of a plurality of adjacent pixels in a TFT array substrate having a data line, a scanning line, a pixel electrode, etc. in the electro-optical device of the first exemplary embodiment.
Figure 3:
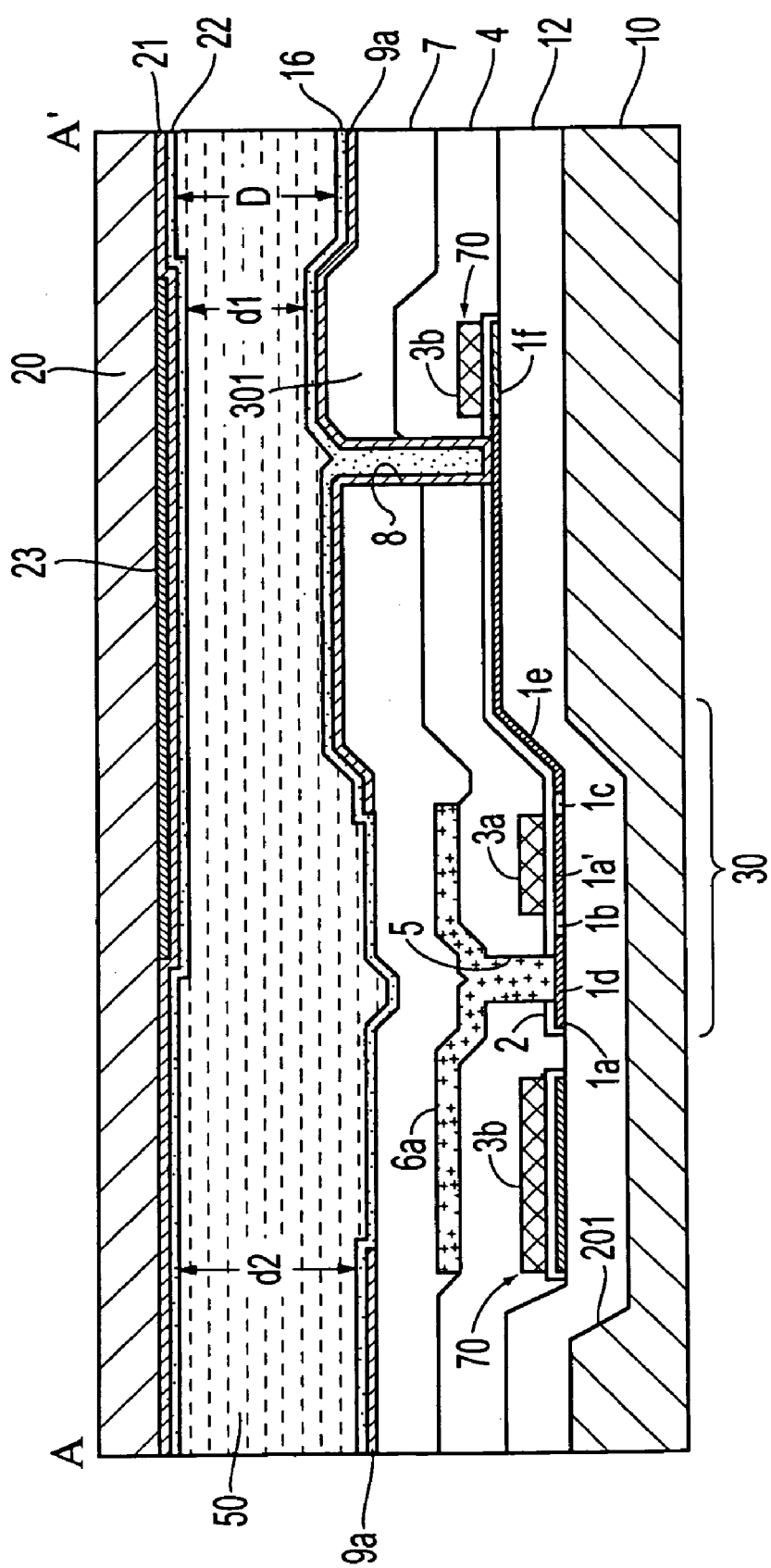
FIG. 3 is a cross-sectional view taken along line III–III' in FIG. 2.
Figure 4:
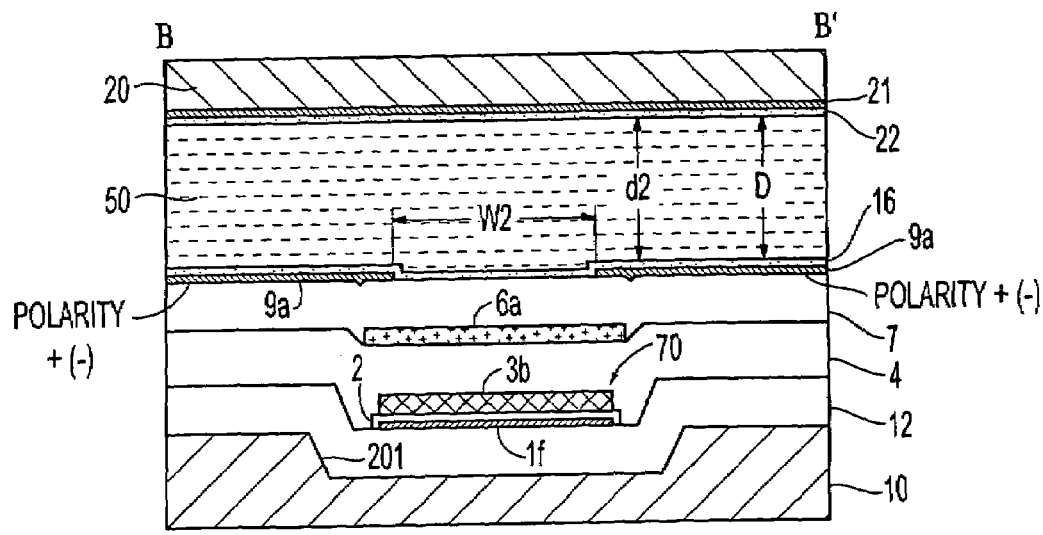
FIG. 4 is a cross-sectional view taken along IV–IV' in FIG. 2.
Figure 5:
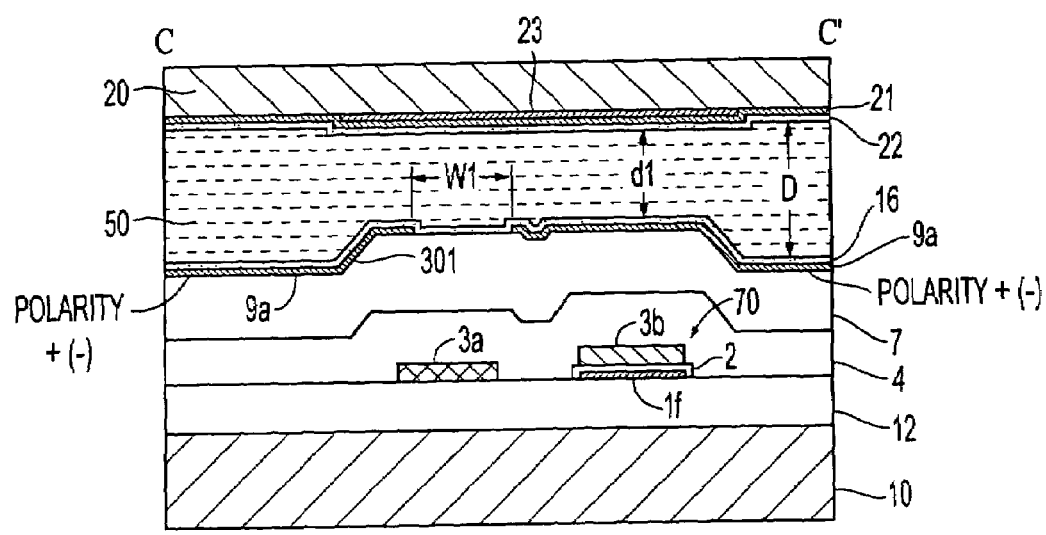
FIG. 5 is a cross-sectional view taken along V–V' in FIG. 2.

An electro-optical device of a first exemplary embodiment of the present invention is now discussed, referring to FIG. 1 through FIG. 8. FIG. 1 is an equivalent circuit diagram of a variety of elements and lines in a plurality of pixels arranged in a matrix, constituting an image display area of the electro-optical device. FIG. 2 is a plan view showing a plurality of pixel groups composed of a plurality of adjacent pixels in a TFT array substrate bearing a data line, a scanning line, a pixel electrode, etc. FIG. 3 is a cross-sectional view taken along line III–III' in FIG. 2. FIG. 4 is a cross-sectional view taken along IV–IV' in FIG. 2. FIG. 5 is a cross-sectional view taken along V–V' in FIG. 2. FIGS. 6(a) and 6(b) are diagrammatic plan views showing a pixel electrode in each pixel and an area where a transverse electric field takes place in a 1H alternating drive method. FIGS. 7(a) and 7(b) are diagrammatic cross-sectional views showing the orientation of liquid-crystal molecules of a TN liquid crystal, and FIG. 7(c) is a comparative example. FIGS. 8(a) and 8(b) are diagrammatic cross-sectional views showing the orientation of liquid-crystal molecules of a VA liquid crystal. In FIG. 3 through FIG. 5, layers and members are drawn in different scales to present them in a distinctly visible manner in the figures.

Referring to FIG. 1, the plurality of the pixels arranged in a matrix constituting the image display area of the electro-optical device of the first exemplary embodiment of the present invention include pixel electrodes 9a and TFTs 30 for controlling the respective pixel electrodes 9a arranged in a matrix. Data lines 6a carrying a video signal are respectively electrically connected to the sources of the TFTs 30. Video signals S1, S2, . . . , Sn may be supplied on the data lines 6a in a one-line-at-a-time manner in that order, or may be supplied to a group of adjacent data lines 6a at a time on a group-by-group basis. Scanning lines 3a are respectively electrically connected to the gates of the TFTs 30 and are supplied with scanning signal G1, G2, . . . , Gm in the form of a pulse at a predetermined timing in a one-line-at-a-time manner in that order. Pixel electrodes 9a are respectively electrically connected to the drains of the TFTs 30, and the video signals S1, S2, . . . , Sn fed through the data lines 6a are written at a predetermined timing by closing the TFTs 30 used as a switching element, for a predetermined duration of time. The video signals S1, S2, . . . , Sn at a predetermined level, which are written on a liquid crystal used as an electro-optical material through the pixel electrodes 9a, are stored in the liquid crystal for a predetermined duration of time with an opposing electrode (to be discussed later) formed on an opposing substrate (to be discussed later). The liquid crystal modulates light to present it in a gradation by varying the orientation or the order of the collection of molecules. In a normally white mode, the amount of light transmitted through the liquid crystal is reduced depending on a voltage applied, while in a normally black mode, the amount of light transmitted through the liquid crystal is increased depending on a voltage applied, and as a result, the electro-optical device outputs light bearing a contrast responsive to the video signal. To prevent the stored video signal from leaking, a storage capacitor 70 is added in parallel with the capacitor of the liquid crystal formed between the pixel electrode 9a and the opposing electrode.

Figure 6A:
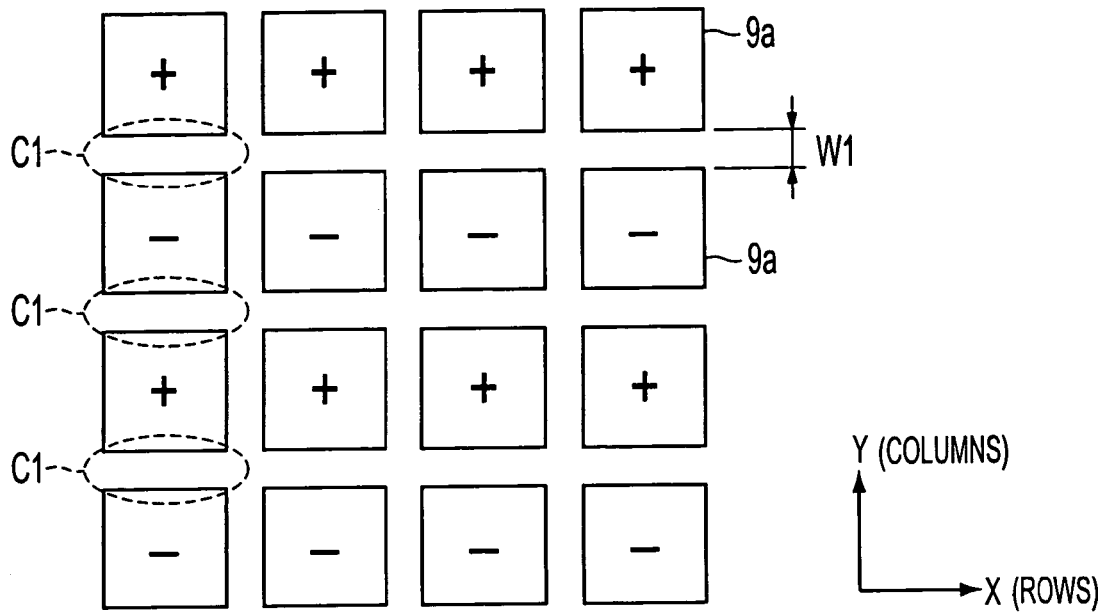
FIGS. 6(a) and 6(b) are diagrammatic plan views showing a pixel electrode in each pixel and an area where a transverse electric field takes place in a 1H alternating drive method used in the first exemplary embodiment and a third exemplary embodiment.
Figure 6B:
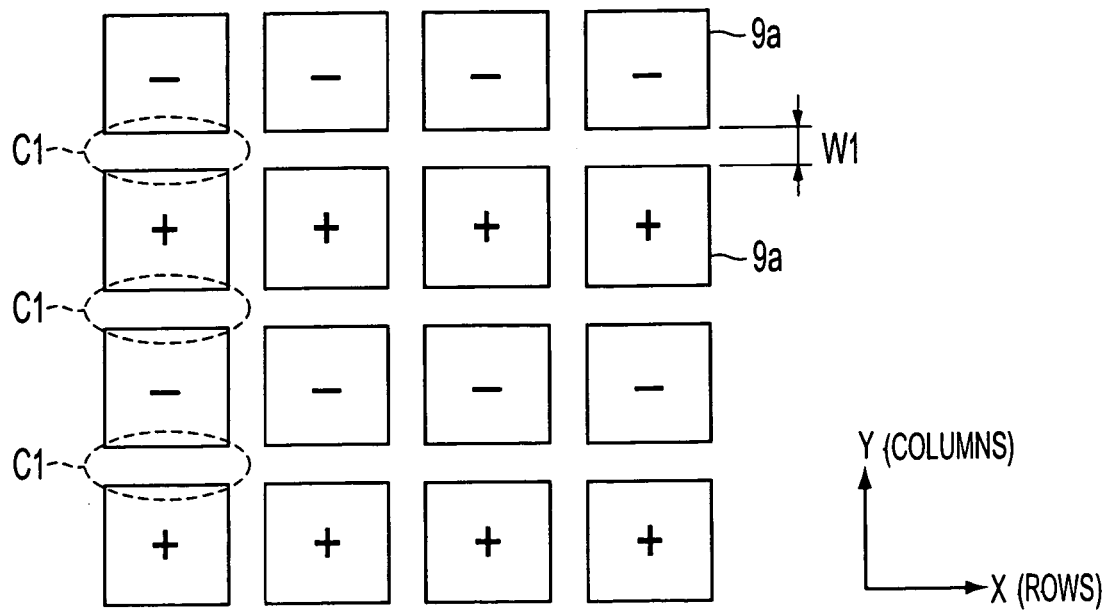

In the first exemplary embodiment, the 1H alternating drive method from among the above-referenced conventional alternating drive methods is performed (see FIGS. 6(a) and 6(b)). In this way, the electro-optical device avoids the degradation of the liquid crystal resulting from the application of a direct current while presenting an image with a reduced flickering taking place with the period of frame or field, and a reduced vertical cross talk in particular.

Referring to FIG. 2, a matrix of transparent pixel electrodes 9a (the peripheral outline of which is represented by broken lines 9a') is arranged on a TFT array substrate of the electro-optical device, and the data line 6a, the scanning line 3a, and the capacitive line 3b extend along the vertical and horizontal borders between the pixel electrodes 9a. The data line 6a is electrically connected to the source region, to be discussed later, of a semiconductor layer 1a fabricated of a polysilicon layer, through a contact hole 5. The pixel electrode 9a is electrically connected to the drain region, to be discussed later, of the semiconductor layer 1a through a contact hole 8. The scanning line 3a is arranged to face a channel region 1a' of the semiconductor layer 1a, represented as a box hatched with rightwardly downwardly inclined lines, as shown in FIG. 2, and functions as a gate electrode. In this way, a pixel switching TFT 30, with the scanning line 3a facing the channel region 1a' as the gate electrode thereof, is arranged at each intersection of the scanning line 3a and the data line 6a.

The capacitive line 3b includes a main line portion that substantially linearly extends along the scanning line 3a and a projecting portion that upwardly projects along the data line 6a from an intersection thereof with the data line 6a, as shown in FIG. 2.

Particularly in the first exemplary embodiment, strips of grooves 201 are formed in an area extending along the data line 6a, including the data line 6a and the TFT 30, in the TFT array substrate 10 (the outline of the area is represented by solid lines as shown in FIG. 2). The planarizing process is thus performed on the data line 6a.

Referring to a cross-sectional view in FIG. 3, the electro-optical device includes the transparent TFT array substrate 10 and a transparent opposing substrate 20 opposing the transparent TFT array substrate 10. The TFT array substrate 10 is fabricated of a quartz substrate, a glass substrate, or a silicon substrate, for instance, and the opposing substrate 20 is fabricated of a glass substrate or a quartz substrate, for instance. The TFT array substrate 10 is provided with the pixel electrodes 9a, and arranged on top of them is an alignment layer 16 which has been subjected to a predetermined alignment process such as a rubbing process. The pixel electrode 9a is fabricated of a transparent, electrically conductive film, such as an ITO (Indium Tin Oxide) film. The alignment layer 16 is fabricated of an organic thin film, such as a polyimide thin film.

The opposing substrate 20 has an opposing electrode 21 extending on the entire surface thereof, and an alignment layer 22 therebeneath that has been subjected to a predetermined alignment process such as a rubbing process. The opposing electrode 21 is fabricated of a transparent, electrically conductive film, such as an ITO film. The alignment layer 22 is fabricated of an organic thin film such as a polyimide thin film.

Arranged on the TFT array substrate 10 is a pixel switching TFT 30, adjacent to each pixel electrode 9a, for controlling the pixel electrode 9a.

Arranged on the opposing substrate 20 is a light-shielding layer 23, typically referred to as a black mask or a black matrix, in a non-aperture area in each pixel, as shown in FIG. 3. For this reason, no incident light from the opposing substrate 20 enters the channel region 1a', a lightly doped source region 1b, and a lightly doped drain region 1c of the semiconductor layer 1a of the pixel switching TFT 30. The light-shielding layer 23 has the function of improving a contrast ratio, and the function of preventing color mixing of color materials when a color filter is produced. In this exemplary embodiment, the data line 6a having light-shielding property and constructed of Al or the like may be used to shield the non-aperture area of each pixel from light to define a segment of the outline of the aperture area of each pixel along the data line 6a, or a light-shielding layer 23 arranged on the opposing substrate 20 may redundantly or solely shield the non-aperture area along the data line 6a from light.

A liquid crystal, as one example of the electro-optical material, is encapsulated in a gap surrounded by a sealing material, to be discussed later, between the TFT array substrate 10 and the opposing substrate 20 arranged with the pixel electrodes 9a facing the opposing electrode 21, and a liquid-crystal layer 50 is thus formed. The liquid-crystal layer 50 takes a predetermined orientation state by the alignment layer 16 and the alignment layer 22 with no electric field applied by the pixel electrode 9a. The liquid-crystal layer 50 is formed of a mixture of one or several types of nematic liquid crystals. The sealing material is an adhesive agent made of a thermal setting agent or a photo-setting agent for bonding the TFT array substrate 10 to the opposing substrate 20 along the edges thereof, and is mixed with spacers such as glass fiber or glass beads to keep a predetermined distance between the two substrates.

An insulator substrate 12 is arranged between the TFT array substrate 10 and the plurality of the pixel switching TFTs 30. The insulator substrate 12 extends on the entire surface of the TFT array substrate 10, preventing irregularities during the polishing of the surface of the TFT array substrate 10 and dirt left after a cleaning operation, from changing the characteristics of the pixel switching TFT 30. The insulator substrate 12 is fabricated of highly insulating glass such as NSG (non-doped silicate glass), PSG (phosphosilicate glass), BSG (borosilicate glass), BPSG (borophosphosilicate glass) or a silicon oxide film or a silicon nitride film.

In the first exemplary embodiment, the semiconductor layer 1a extends from a heavily doped drain region 1e, forming a first storage capacitor electrode 1f. A portion of the capacitive line 3b facing the capacitor electrode 1f becomes a second capacitor electrode. A thin insulator layer 2 including a gate insulator extends from a position thereof facing the scanning line 3a, thereby serving as a dielectric layer interposed between these electrodes, and thereby forming the storage capacitor 70.

Referring to FIG. 3, the pixel switching TFT 30 has an LDD (Lightly Doped Drain) structure, and includes the scanning line 3a, the channel region 1a' of the semiconductor layer 1a in which a channel is formed by the electric field from the scanning line 3a, the thin insulator layer 2 including the gate insulator for insulating the scanning line 3a from the semiconductor layer 1a, the data line 6a, the lightly doped source region 1b and the lightly doped drain region 1c of the semiconductor layer 1a, and the heavily doped source region 1d and the heavily doped drain region 1e of the semiconductor layer 1a. A corresponding one of the plurality of the pixel electrodes 9a is connected to the heavily doped drain region 1e through the contact hole 8. Formed on top of the scanning line 3a and the capacitive line 3b is a first interlayer insulator 4 having the contact hole 5 connecting to the heavily doped source region 1d and the contact hole 8 connecting to the heavily doped drain region 1e. Formed on top of the data line 6a and the first interlayer insulator 4 is a second interlayer insulator 7 having the contact hole 8 connecting to the heavily doped drain region 1e. The above-referenced pixel electrode 9a is formed on top of the second interlayer insulator 7 thus constructed.

Referring to FIG. 4, the data line 6a is arranged in the non-aperture area of the pixel in the spacing between the horizontally adjacent pixel electrodes 9a as shown in FIG. 2. The data line 6a defines the segment of the outline of the aperture area of each pixel along the data line 6a, and the visible defect is prevented by the data line 6a in the non-aperture area. The storage capacitor 70 is formed beneath the data line 6a, making use of the projecting portion of the main line portion of the capacitive line 3b extending beneath the data line 6a, and the non-aperture area is thus effectively utilized.

As shown in FIG. 3 and FIG. 4, the first exemplary embodiment in particular includes the plurality of the grooves 201 in the area extending along the data line 6a, including the data line 6a and the TFT 30 in the TFT array substrate 10. With this arrangement, the planarizing process is performed on the data line 6a.

Referring to FIG. 5, the scanning line 3a and the capacitive line 3b are arranged in the non-aperture area of each pixel positioned in the spacing between vertically adjacent pixel electrodes 9a as shown in FIG. 2, and the light-shielding layer 23 on the opposing substrate 20 defines a segment of the outline of the aperture area of each pixel along the scanning line 3a, and prevents visible defect in the non-aperture area.

Referring to FIG. 3 and FIG. 5, the first exemplary embodiment in particular does not include grooves 201 in an area extending along the scanning line 3a, except the intersection area where the scanning line 3a intersects the data line 6a and the area peripheral to the intersection area on the TFT array substrate 10. Also as shown, no groove 201 may be formed in the area extending along the capacitive line 3b. When the lamination becomes thick in the area of the capacitive line 3b, the groove 201 may be formed along the light transmissive area at least in a portion of the area of the capacitive line 3b. In this way, the visible defect due to the step is thus prevented. The planarizing process is thus not performed at least on the scanning line 3a, and the substrate surface (the surface of the second interlayer insulator 7 in the first exemplary embodiment) beneath the pixel electrode 9a is protruded in a projection in the spacing between the pixel electrodes 9a where the scanning line 3a or the like is arranged, and the projection 301 is thus formed. The edge of the pixel electrode 9a is formed on top of the projection 301.

The relationship between the voltage polarity of adjacent pixel electrodes 9a and the generation area of the transverse electric field in the 1H alternating drive method adopted in the first exemplary embodiment is now discussed, referring to FIGS. 6(a) and 6(b).

Referring to FIG. 6(a), during the presentation of an n-th (n is a natural number) field video signal or frame video signal, the polarity of the liquid-crystal driving voltage represented by + or − in each pixel electrode 9a is not inverted, and the pixel electrodes 9a are driven by the same polarity on a row-by-row basis. Referring to FIG. 6(b), during the presentation of an (n+1)-th field video signal or frame video signal, the voltage polarity of the liquid-crystal driving voltage in the pixel electrodes 9a is inverted, and during the presentation of the (n+1)-th field or the one frame video signal, the polarity of the liquid-crystal driving voltage represented by + or − in each pixel electrode 9a is not inverted, and the pixel electrodes 9a are driven by the same polarity on a row-by-row basis. The states shown in FIG. 6(a) and FIG. 6(b) are repeated with the period of field and frame, and the device is driven in the 1H alternating drive method. As a result, the device is free from the degradation of the liquid-crystal through the application of the direct current while presenting an image with reduced cross talk and reduced flickering. The 1H alternating drive method outperforms the 1S alternating drive method in that almost no vertical cross talk is presented.

Referring to FIG. 6(a) and FIG. 6(b), in the 1H alternating drive method, the generation area C1 of the transverse electric field is always located in the spacing between adjacent pixel electrodes 9a in a vertical direction (a Y direction).

Referring to FIG. 3 and FIG. 5, the first exemplary embodiment includes the projection 301 in the area extending along the scanning line 3a so that the longitudinal electric field in the edge portions of the pixel electrodes 9a located on the projection 301 intensifies. Specifically, referring to FIG. 5, the distance d1 between the edge portion of the pixel electrode 9a located on top of the projection 301 and the opposing electrode 21 is shortened by the step (height) of the projection 301. In contrast, as shown in FIG. 4, the planarizing process is performed on the data line 6a by forming the groove 201 so that the distance d2 between the edge portion of the pixel electrode 9a and the opposing electrode 21 becomes approximately equal to the distance D between the central area of the pixel electrode 9a, which is a majority area of the pixel electrode 9a, and the opposing electrode 21. The distance d2 between the edge portion of the pixel electrode 9a in the planarized area and the opposing electrode 21 and the cell gap D of the liquid-crystal layer 50 in the approximate center of the pixel electrode are related to be d2+300 nm≧D. Specifically, if a step having a magnitude of 300 nm or larger in the cell gap D of the liquid crystal in the area where no transverse electric field takes place, the visible defect may be created.

In the generation area C1 of the transverse electric field shown in FIGS. 6(a) and 6(b), the longitudinal electric field between the pixel electrode 9a and the opposing electrode 21 can thus be intensified. Even if the distance d1 is decreased as shown in FIG. 5, the spacing W1 between the adjacent pixel electrodes 9a remains unchanged, and the transverse electric field, which could intensify with a narrowing spacing W1, is also kept constant. For this reason, the longitudinal electric field is set to be stronger than the transverse electric field in localized areas in the generation area C1 of the transverse electric field shown in FIGS. 6(a) and 6(b), and as a result, the longitudinal electric field becomes predominant, thereby controlling the orientation defect of the liquid crystal in the generation area C1 of the transverse electric field.

Referring to FIG. 4, the planarizing process is performed on the data line 6a, reducing the creation of the orientation defect of the liquid crystal attributed to the step caused by the data line 6a or the like in that area. Because of the planarizing process implemented, the distance d2 between the pixel electrode 9a and the opposing electrode 21 is not decreased and the longitudinal electric field is not intensified. No transverse electric field is created in this area, unlike in the spacing between the pixel electrodes 9a as shown in FIGS. 6(a) and 6(b). Without any step implemented for the transverse electric field in this area, the planarizing process keeps the orientation state of the liquid crystal extremely good.

In accordance with the first exemplary embodiment, as a result, taking advantage of the characteristics of the transverse electric field generated in the 1H alternating drive method, the longitudinal electric field is intensified by arranging the edge of the pixel electrode 9a on the projection 301 in the generation area C1 of the transverse electric field, thereby reducing the adverse effect of the transverse electric field with the longitudinal electric field intensified, while the planarizing process is performed in the area where no transverse electric field is generated, in order to reduce the adverse effect of the step in the pixel electrode 9a. In this way, the orientation defect of the liquid crystal resulting from the transverse electric field and the orientation defect of the liquid crystal resulting from the step are generally reduced, and the light-shielding layer 23 for covering the orientation defect portions of the liquid crystal is reduced in size. The aperture ratio of each pixel is increased without creating image defects such as visible defect, and a high-contrast ratio, bright, and high-quality image is thus presented.

According to the study carried out by the inventors of this invention, the liquid-crystal layer 50 needs to have a thickness (as thick as 3 μm or so, for instance) to keep the light resistance thereof at a certain level, not to make difficult an injection process of the liquid-crystal layer 50, and to allow liquid-crystal molecules to well move in response to an electric field applied in operation. On the other hand, the study also shows that if the spacing W1 (see FIG. 5) between the adjacent pixel electrodes 9a is set to be shorter than the distance d1 between the pixel electrode 9a in the corresponding area and the opposing electrode 21 (specifically, W1<d1), the adverse effect of the transverse electric field becomes pronounced. If the thickness D (see FIG. 4 and FIG. 5) of the entire liquid-crystal layer 50 is merely thinned to achieve a high aperture ratio of fine-pitched pixels, the control of the thickness of the liquid crystal will become difficult, the light resistance will drop, the injection process will become difficult, and the liquid crystal molecules will be thus subject to faulty operations. Conversely, if the spacing W1 between the adjacent pixel electrodes 9a is merely decreased without thinning the liquid-crystal layer 50 to achieve a high aperture ratio of the fine-pitched pixels, the transverse electric field will intensify relative to the horizontal electric field, and the orientation defect of the liquid crystal due to the transverse electric field will become pronounced. Considering these properties of the liquid-crystal display apparatus, as in the first exemplary embodiment discussed above, the thickness d1 of the liquid-crystal layer 50 is decreased (to 1.5 μm or so, for instance) in only the area where the transverse electric field is generated while the thickness D of the liquid-crystal layer 50 in the remaining area, which occupies the majority of the pixel electrode 9a, is not decreased, and the thickness D in the light transmissive area of the liquid-crystal layer 50 is assured to be enough (to 3 μm or so, for instance), and the spacing W1 between the adjacent pixel electrodes 9a is narrowed while not relatively intensifying the transverse electric field. This arrangement works effectively, achieving a high aperture ratio in the fine-pitched pixels and presenting a high-definition image.

Referring to FIG. 5, in the first exemplary embodiment in particular, the pixel electrodes 9a are preferably two-dimensionally arranged to hold the relationship of 0.5D<W1. This is because the orientation defect of the liquid crystal becomes pronounced unless the thickness D of the liquid crystal is controlled to be greater than twice the spacing W1 between the pixel electrodes 9a. Furthermore, the projection 301 is formed to satisfy the relationship of d1+300 nm (nanometer)≦D. Specifically, if the projection 301 is protruded for a step of 300 nm or larger, the longitudinal electric field in this area is intensified relative to the transverse electric field to the degree that the adverse effect of the transverse electric field is not pronounced. Although decreasing the spacing W1 (and the spacing W2 of FIG. 4) to be as small as possible is effective to achieve a high aperture ratio in the fine-pitched pixels and to present a high definition image, the spacing W1 cannot be limitlessly decreased in an effort to keep the adverse effect of the transverse electric field contained. If the spacing W1 is decreased to be nearly equal to d1, a high aperture ratio of the fine-pitched pixels is most effectively achieved without degrading the quality of the image.

Furthermore in the first exemplary embodiment, the edge of the pixel electrode 9a is preferably positioned to be on the lengthwise edge portion of the top of the longitudinally extending projection 301. With this arrangement, the distance d1 between the edge portion of the pixel electrode 9a and the opposing electrode 21 is decreased by making maximum use of the height of the projection 301. At the same time, by taking full advantage of the width of the top of the projection 301, the spacing W1 between the adjacent pixel electrodes, where the transverse electric field is generated, is shortened. In this way, the longitudinal electric field is intensified relative to the transverse electric field in the generation area C1 of the transverse electric field by efficiently making use of the configuration of the projection 301.

The above-referenced projection 301 is formed making use of the conductive film and the interlayer insulator, constructing the scanning line 3a and the TFT 30. A film for the projection may be added between the TFT array substrate 10 and the pixel electrode 9a in localized areas in a lamination process, the surface of the TFT array substrate 10 may be etched to form the projection, or the surface of the interlayer insulator interposed between the TFT array substrate 10 and the pixel electrode 9a may be etched to form the projection. The cross-sectional shape of the projection 301 perpendicular to the length direction of the projection may be any of a variety of shapes, such as a trapezoid, a triangle, a semi-circle, a semi-ellipsoid, a semi-circle or semi-ellipsoid having a flattened top surface, a quadratic curve with the gradient thereof increasing as it rises, a cubical curve outline having an approximate trapezoidal shape, or a cubical curve outline having an approximate triangular shape. The scanning line 3a and the main line portion of capacitive line 3b shown in FIG. 5 may be partly subjected to the planarizing process. These lines may be partly embedded into a groove formed in the TFT array substrate 10 or in the interlayer insulator to form a projection having a desired height at a desired location. In practice, the cross-sectional shape may be appropriately determined to minimize the orientation defect of the liquid crystal resulting from the step in accordance with the property of the liquid crystal.

Figure 7A:
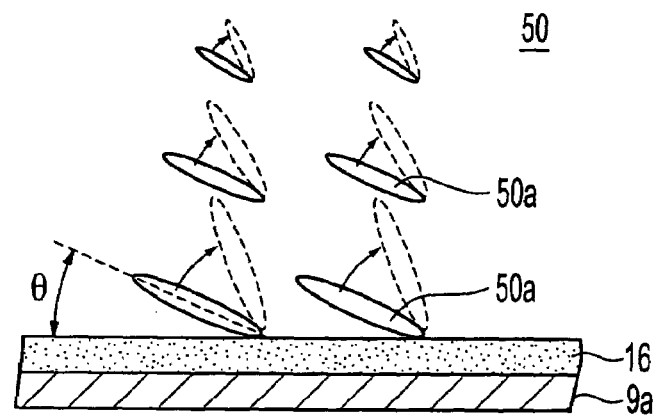
FIGS. 7(a) and 7(b) are diagrammatic cross-sectional views showing the orientation of liquid-crystal molecules when a TN liquid crystal is used in the first exemplary embodiment.
Figure 7B:
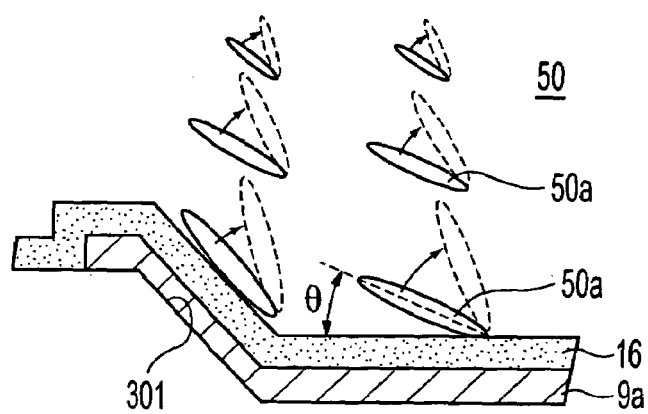

Referring to FIG. 7(b), the liquid-crystal layer 50 is preferably fabricated of a TN (Twisted Nematic) liquid crystal in the first exemplary embodiment, and the projection 301 preferably has a tapered sidewall. The pretilt angle θ of the TN liquid crystal in the TFT array substrate 10 is set to match the inclination angle of the tapered sidewall.

Figure 7C:
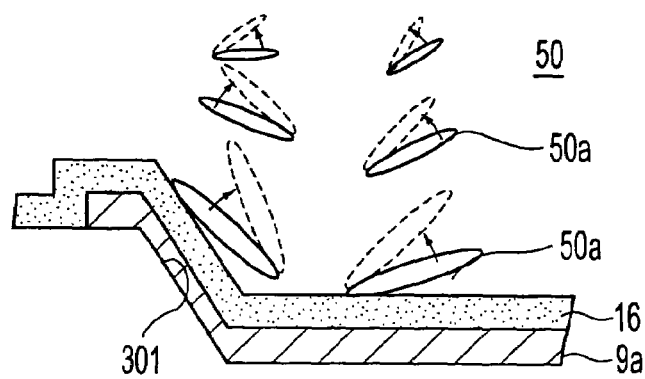
FIG. 7(c) shows a comparative example to FIG. 7(b).

Specifically, as shown in FIG. 7(a), the liquid-crystal molecules 50a of the TN liquid crystal are aligned to be substantially in parallel with the substrate with no voltage applied, while gradually being twisted toward the opposing substrate 20 from the TFT array substrate 10. With a voltage applied, the liquid-crystal molecules 50a are aligned to be vertical to the substrate surface as represented by arrows. Referring to FIG. 7(b), the sidewall of the projection 301 is tapered, and the inclination angle of the tapered sidewall is set to match the pretilt angle θ of the TN liquid crystal. Even if the thickness d1 of the liquid crystal gradually decreases between the projection 301 and the opposing substrate 20, a good liquid-crystal orientation state as good as when the layer thickness D of the liquid crystal remains constant is obtained. In other words, this arrangement minimizes the liquid crystal orientation defect attributed to the step caused by the presence of the projection 301 to control the liquid crystal orientation defect due to the transverse electric field. If the pretilt angle θ of the TN liquid crystal fails to match the inclination angle of the tapered sidewall as shown in FIG. 7(c), there occur liquid-crystal molecules 50b which rise in a direction opposite to the direction of the remaining liquid-crystal molecules 50a, between the projection 301 and the opposing substrate 20, and a liquid-crystal orientation defect, i.e., orientation state discontinuity occurs. The light-shielding layer is preferably formed on the opposing substrate 20 and the TFT array substrate 10 to hide this area.

Figure 8A:
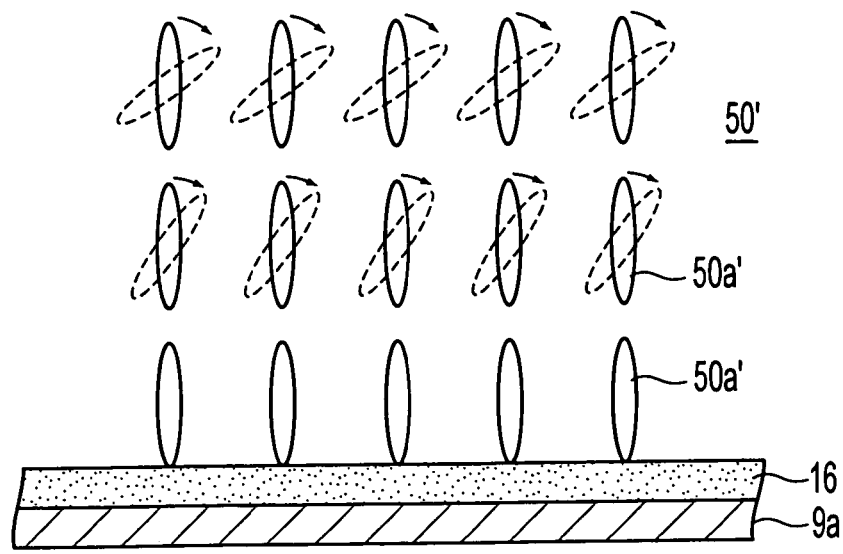
FIGS. 8(a) and 8(b) are diagrammatic cross-sectional views showing the orientation of liquid-crystal molecules when a VA liquid crystal is used in the first exemplary embodiment.
Figure 8B:
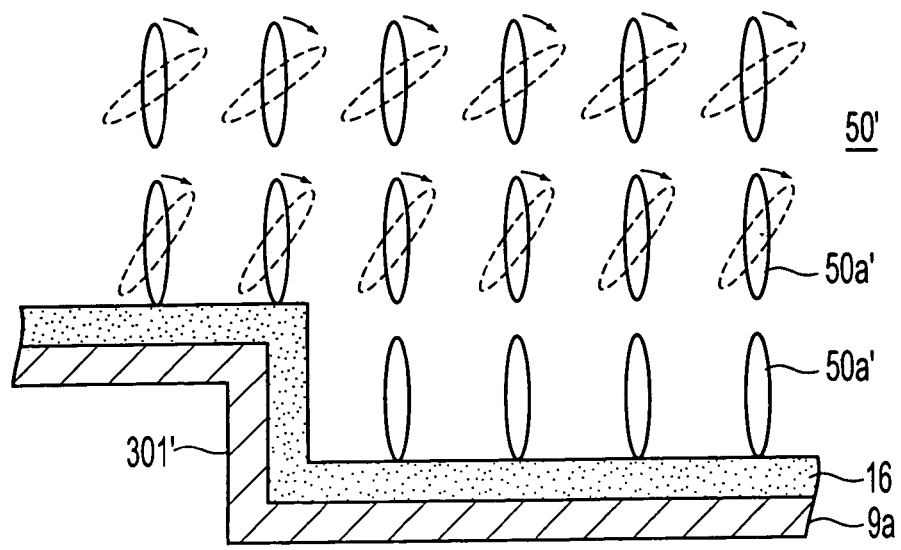

Referring to FIG. 8(b), in the first exemplary embodiment, a liquid crystal 50' is fabricated of a VA (Vertically Aligned) liquid crystal, and a projection 301' may have almost no taper on the sidewall thereof.

Specifically, referring to FIG. 8(a), the VA liquid crystal molecules 50a' are aligned to be vertical to the substrate with no voltage applied in principle. In a plan view, the liquid crystal orientation is forced to be disturbed in the area where the sidewall of the projection 301' is tapered, but if the projection 301' has almost no taper in the sidewall thereof, the portion of the liquid crystal suffering from orientation disturbance at the sidewall is minimized. Referring to FIG. 8(b), a good liquid crystal orientation state nearly as good as when the layer thickness D of the liquid crystal remains constant as shown in FIG. 8(a) is obtained on both a substantially flat portion of the pixel electrode 9a on top of the projection 301' and on a substantially flat portion of the pixel electrode 9a beside the step of the projection 301'.

In the above-referenced first exemplary embodiment, the planarizing process is performed by forming the groove 201 and by burying the data line 6a or the like into the groove 201, but alternatively, the planarizing process may be performed by polishing the step on the surface of the second interlayer insulator 7 or 12 over the data line 6a through a CMP (Chemical Mechanical Polishing) process or an organic SOG may be used to assure flatness.

Subsequent to the planarizing process, a projection may be partly formed in an area extending along the data line 6a or the scanning line 3a. In one method of forming the projection, an interlayer insulator is etched in the area thereof other than the area where the projection is to be formed. In this way, the projection is easily formed in the area where the transverse electric field is generated.

In the above-referenced first exemplary embodiment, the pixel switching TFT 30 preferably has an LDD structure as shown in FIG. 3, but may have an offset structure in which no impurity implantation is performed on the lightly doped source region 1b and the lightly doped drain region 1c, or may have a self-aligned type TFT in which a high dose impurity is implanted with the gate electrode formed of a portion of the scanning line 3a being used as a mask, to form heavily doped source and drain in a self-alignment process. In the first exemplary embodiment, the gate electrode of the pixel switching TFT 30 is a single gate structure in which a single gate is interposed between the heavily doped source region 1d and the heavily doped drain region 1e, but alternatively, more than one gate electrode may be interposed therebetween. With dual gates or triple gates employed in a TFT, leakage currents in junctions between the channel region and the source region and between the channel region and the drain region are prevented, and thereby a current during off period is reduced.

Manufacturing Process in the First Exemplary Embodiment

A manufacturing process of the TFT array substrate constituting the electro-optical device of the first exemplary embodiment having the above-discussed construction is now discussed, referring to FIGS. 9(a) through 9(d). FIGS. 9(a) through 9(d) are process diagrams showing the layers of the TFT array substrate, corresponding to the cross section IV–IV' in FIG. 2 and the cross section V–V' in FIG. 2, as shown in FIG. 4 and FIG. 5.

Referring to FIG. 9(a), the TFT array substrate 10, such as a quartz substrate, a hard glass substrate, or a silicon substrate is prepared, and the groove 201 is formed where the data line 6a is to be laid out.

Referring to FIG. 9(b), the scanning line 3a and the capacitive line 3b are formed on the TFT array substrate 10 using a thin-film forming technique. In parallel with this step, the TFT 30 and the storage capacitor 70 shown in FIG. 3 are formed.

Specifically, formed on the TFT array substrate 10 having the groove 201 thereon is an insulator substrate 12 which has a thickness within a range from 500 to 2000 mm, and is fabricated of a silicate glass film such as NSG, PSG, BSG, or BPSG, a silicon nitride film, or a silicon oxide film, using TEOS (tetraethylorthosilicate) gas, TEB (triethyl borate) gas, or TMOP (trimethyl phosphate) gas or the like through an atmospheric CVD method or a reduced pressure CVD method. Next, an amorphous silicon layer is formed on top of the insulator substrate 12 using a reduced pressure CVD and is subjected to a heat treatment process, and a polysilicon layer is thus epitaxially grown in solid phase. Alternatively, rather than through the amorphous silicon layer, a polysilicon layer is directly formed through a reduced pressure CVD process. By subjecting the polysilicon layer to a photolithographic process, an etching process, etc., the semiconductor layer 1a having a predetermined pattern including the first storage capacitor electrode 1f shown in FIG. 2 is formed. Through a thermal oxidation, the thin insulator layer 2 including the dielectric layer for the storage capacitor is formed along with the gate insulator of the TFT 30 shown in FIG. 3. As a result, the thickness of the semiconductor layer 1a falls within a range of about 30 to 150 mm, and preferably within a range of about 35 to 50 nm, and the thickness of the thin insulator layer 2 falls within a range of about 20 to 150 nm, and preferably within a range of 30 to 100 mm. A polysilicon layer having a thickness within a range of about 100 to 500 nm is deposited through a reduced pressure CVD process, and P (phosphorus) is thermally diffused to turn the polysilicon layer into a conductive layer, and then through a photolithographic process, an etching process, etc., the scanning line 3a and the capacitive line 3b having predetermined patterns shown in FIG. 2 are produced. The scanning line 3a and the capacitive line 3b may be fabricated of a metal alloy of a refractory metal or a metal silicide, or may be a multilayer wiring in combination with a polysilicon film. Next, doping impurity at two phases of a low dose and a high dose produces the pixel switching TFT 30 having the LDD structure including the lightly doped source region 1b and the lightly doped drain region 1c, and the heavily doped source region 1d and the heavily doped drain region 1e.

In parallel with the step in FIG. 9(b), TFTs constituting peripheral circuits such a data line drive circuit and a scanning line drive circuit may be formed on the TFT array substrate 10.

Referring to FIG. 9(c), the interlayer insulator 4, fabricated of a silicate glass film such as NSG, PSG, BSG, or BPSG, a silicon nitride film, or a silicon oxide film, is produced using TEOS gas through an atmospheric CVD process or a reduced pressure CVD process to cover the laminate of the scanning line 3a, the capacitive line 3b, the thin insulator layer 2 and the insulator substrate 12. The interlayer insulator 4 has a thickness within a range of 1000 to 2000 nm. In parallel with or immediately subsequent to this calcination process, a heat treatment process may be performed at 1000° C. to activate the semiconductor layer 1a. The contact hole 5 for electrically connecting the data line 6a shown in FIG. 3 to the heavily doped source region 1d of the semiconductor layer 1a is drilled in the first interlayer insulator 4 and the thin insulator layer 2, and contact holes for connecting the scanning line 3a and the capacitive line 3b to unshown lines in the area peripheral to the substrate are also drilled at the same step as that for the contact hole 5. In succession, a low-resistance metal film of Al or the like and a metal silicide film are deposited to a thickness within a range of about 100 to 500 nm on the first interlayer insulator 4 through a sputtering process, and the data line 6a is formed through a photolithographic process, an etching process, and the like.

Referring to FIG. 9(d), the second interlayer insulator 7 is deposited on the data line 6a. Referring to FIG. 3, the contact hole 8 for electrically connecting the pixel electrode 9a to the heavily doped drain region 1e is formed through a dry etching process such as a reactive ion etching or a reactive ion beam etching, or a wet etching process. In succession, a transparent, electrically conductive layer such as an ITO layer is deposited to a thickness within a range of about 50 to 200 nm on the second interlayer insulator 7 using a sputtering step, and the pixel electrode 9a is formed through a photolithographic process, an etching process, and the like. When the electro-optical device is used as a reflective type, the pixel electrode 9a may be made of a highly opaque material such as Al.

In accordance with the manufacturing method of the first exemplary embodiment, the liquid-crystal display device of the first exemplary embodiment is relatively easily manufactured, wherein the liquid-crystal orientation defect due to the step is reduced in the area where no transverse electric field is generated, because the planarizing process is performed on the data line 6a by forming the groove 201 in the TFT array substrate 10 to lay the data line 6a there while no planarizing process is performed on portions of the scanning line 3a and the capacitive line 3b, and the liquid-crystal orientation defect due to the transverse electric field is reduced by the projection 301 where the transverse electric field is generated.

Second Exemplary Embodiment

Figure 10:
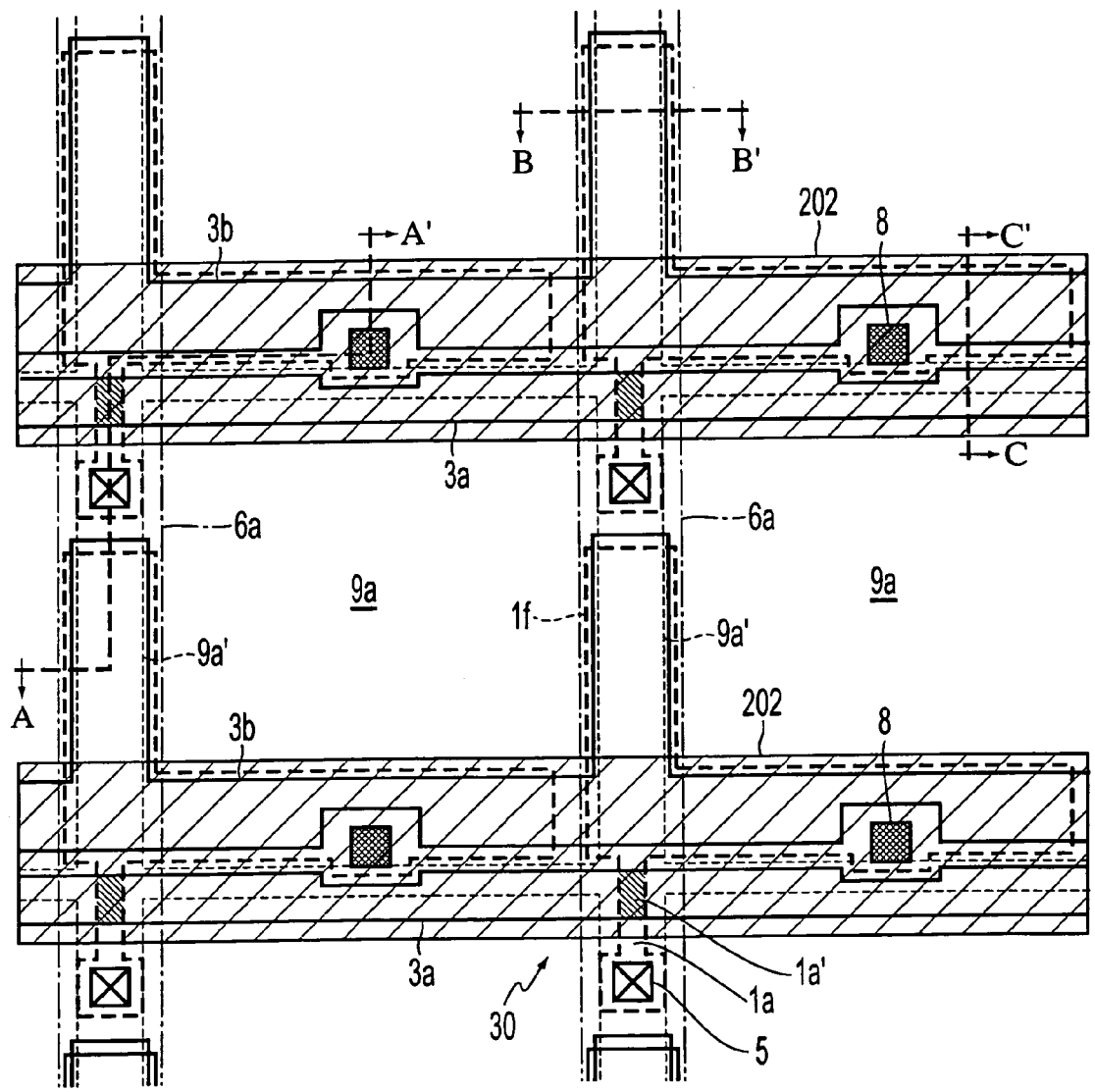
FIG. 10 is a plan view showing a group of adjacent pixels on a TFT array having a data line, a scanning line, a pixel electrode, etc. thereon in an electro-optical device of a second exemplary embodiment of the present invention.
Figure 11:
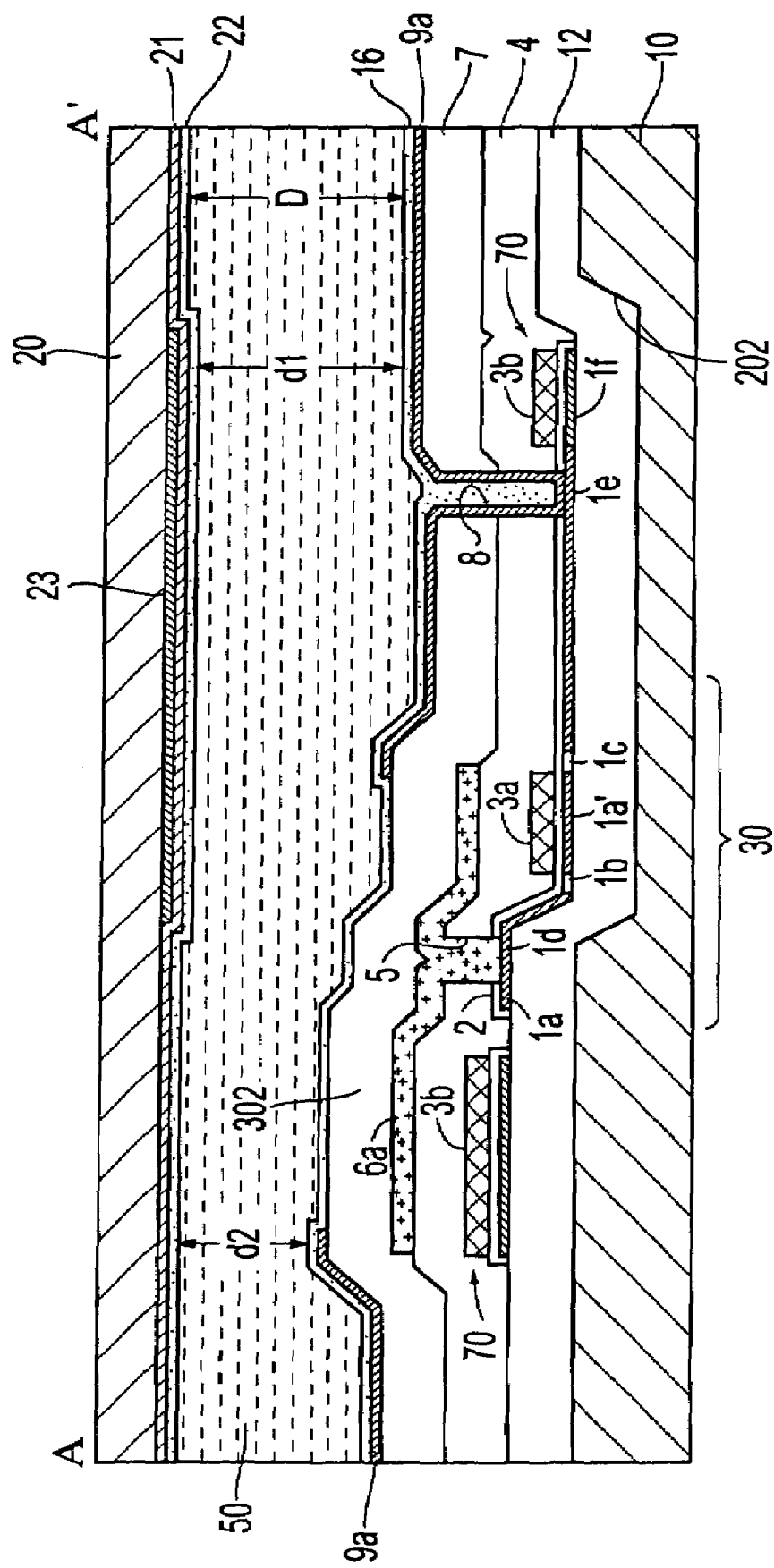
FIG. 11 is a cross-sectional view taken along line XI–XI' in FIG. 10.
Figure 12:
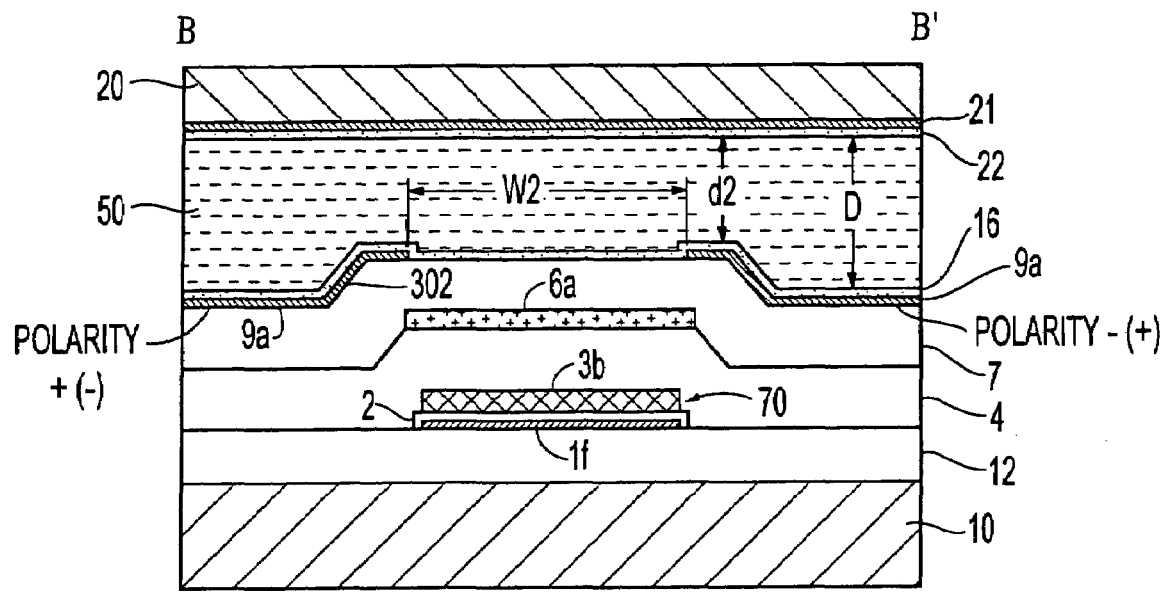
FIG. 12 is a cross-sectional view taken along line XII–XII' in FIG. 10.
Figure 13:
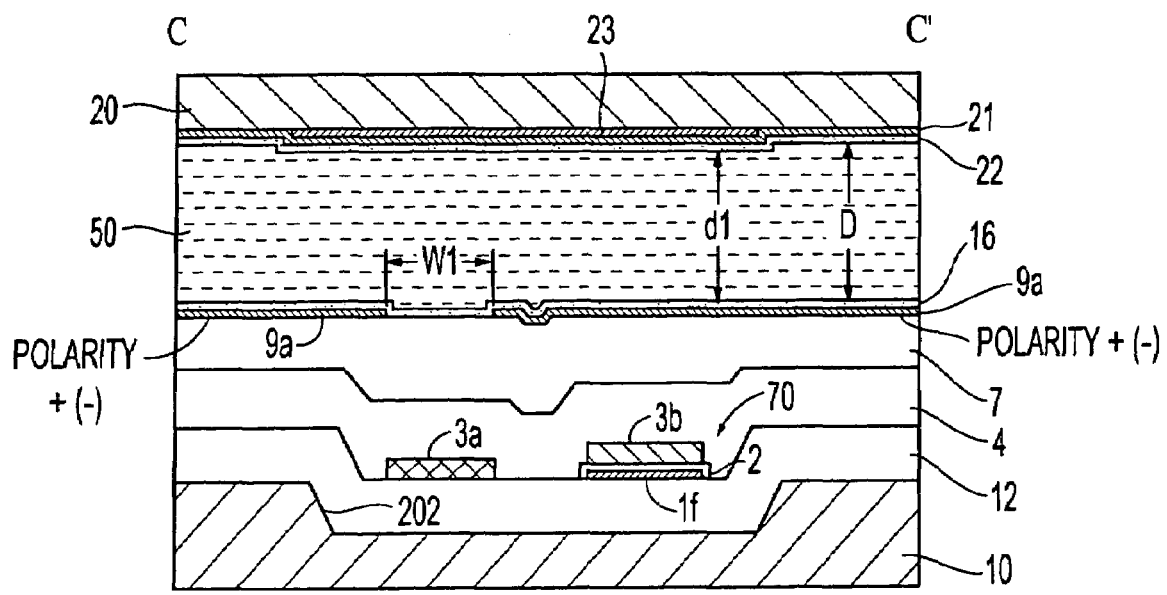
FIG. 13 is a cross-sectional view taken along line XII-I–XIII' in FIG. 10.
Figure 14A:
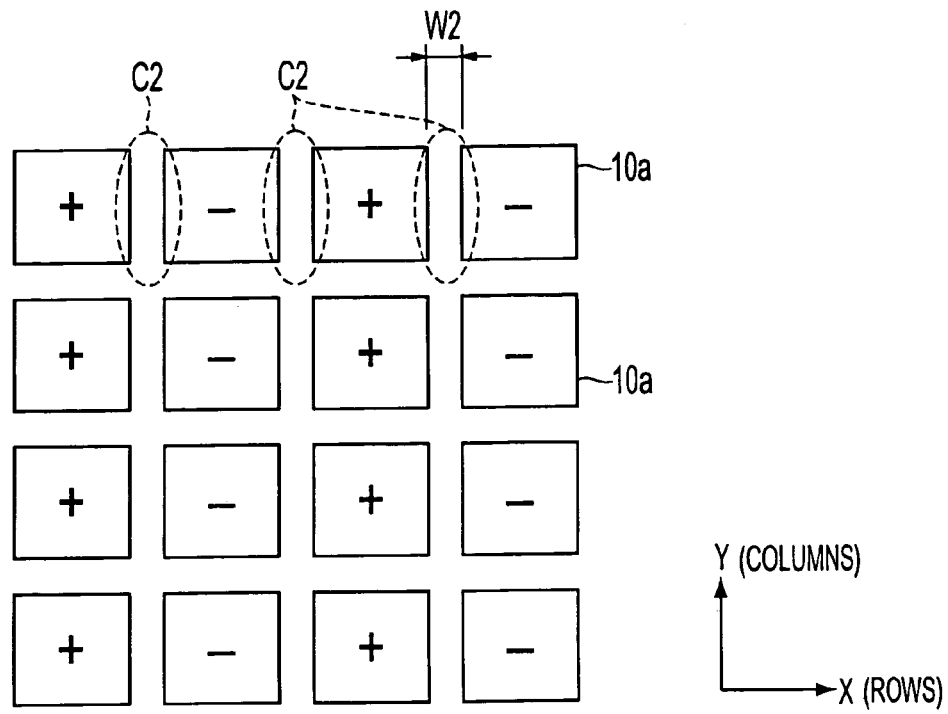
FIGS. 14(a) and 14(b) are diagrammatic plan views of pixel electrodes, showing the voltage polarity in each pixel electrode and an area where a transverse electric field is generated in a 1S alternating drive method used in the second exemplary embodiment and a fourth exemplary embodiment.
Figure 14B:
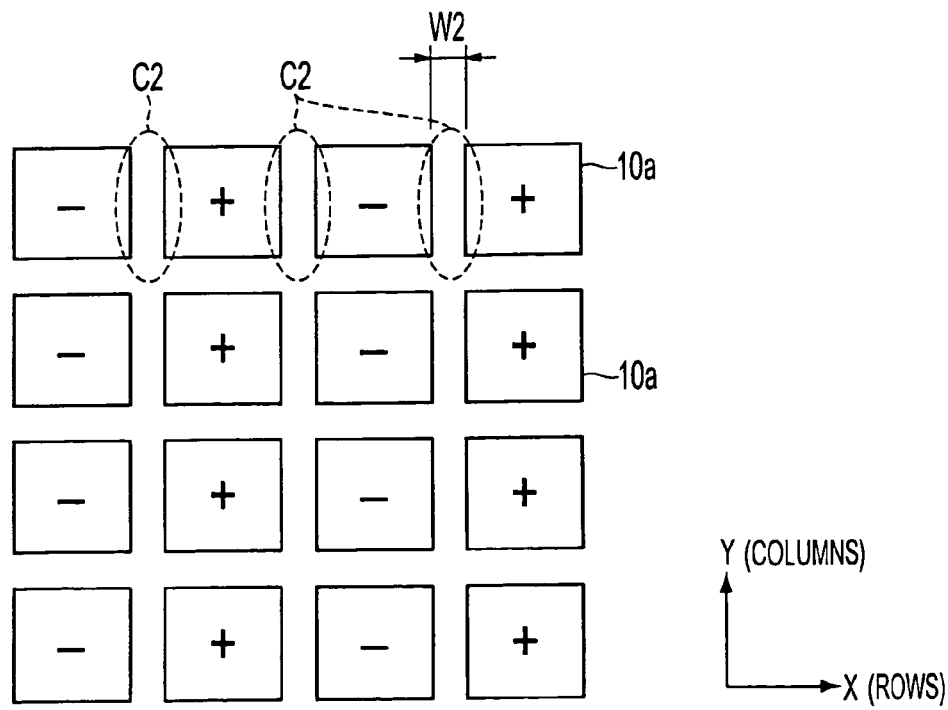

The construction of the electro-optical device of a second exemplary embodiment of the present invention is now discussed, referring to FIG. 10 through FIG. 14(b). FIG. 10 is a plan view showing a plurality of groups of adjacent pixels on a TFT array having a data line, a scanning line, a pixel electrode, etc. thereon. FIG. 11 is a cross-sectional view taken along line XI–XI' in FIG. 10. FIG. 12 is a cross-sectional view taken along line XII–XII' in FIG. 10. FIG. 13 is a cross-sectional view taken along line XIII–XIII' in FIG. 10. FIGS. 14(a) and 14(b) are diagrammatic plan views of pixel electrodes, showing the potential polarity in each pixel electrode and an area where a transverse electric field is generated in a 1S alternating drive method. In FIG. 11 through FIG. 13, layers and members are drawn in different scales to present them in a distinctly visible manner in the figures. In the second exemplary embodiment described with reference to FIG. 10 to FIG. 14(b), components identical to those in connection with the first exemplary embodiment shown in FIG. 2 through FIG. 6(b) are designated with the same reference numerals, and the discussion thereabout is not repeated here.

A circuit diagram of the second exemplary embodiment remains unchanged from that of the first exemplary embodiment shown in FIG. 1.

Referring to FIG. 10, the second exemplary embodiment includes a groove 202 in an area (enclosed by solid lines as shown) extending along the scanning line 3a and the capacitive line 3b in contrast to the first exemplary embodiment where the groove 201 is formed in the area extending along the data line 6a. Referring to FIG. 11 and FIG. 12, in the second exemplary embodiment, a projection 302 is formed of the data line 6a and the storage capacitor 70 along the data line 6a (in a plan view, the portion of the capacitive line 3b projecting from the main line portion thereof, and the thin insulator layer 2 and the storage capacitor electrode 1f facing the projecting portion), and as shown in FIG. 12 and FIG. 13, the planarizing process is performed on the scanning line 3a and the capacitive line 3b. In the second exemplary embodiment as shown in FIGS. 14(a) and 14(b), the device is driven in the 1S alternating drive method. The remaining construction and the operation of the second exemplary embodiment remain unchanged from those of the first exemplary embodiment.

In accordance with the second exemplary embodiment, as shown in FIG. 14(a), during the presentation of an n-th (n is a natural number) field video signal or frame video signal, the polarity of the liquid-crystal driving voltage represented by + or − in each pixel electrode 9a is not inverted, and the pixel electrodes 9a are driven by the same polarity on a column-by-column basis. Referring to FIG. 14(b), during the presentation of an (n+1)-th field video signal or frame video signal, the polarity of the liquid-crystal driving potential in the pixel electrodes 9a is inverted, and during the presentation of the (n+1)-th field or frame video signal, the polarity of the liquid-crystal driving potential represented by + or − in each pixel electrode 9a is not inverted, and the pixel electrodes 9a are driven by the same polarity on a column-by-column basis. The states shown in FIG. 14(a) and FIG. 14(b) are repeated with the period of field and frame, and the device is driven in the 1S alternating drive method in this exemplary embodiment. As a result, in accordance with this exemplary embodiment, the device is free from the degradation of the liquid-crystal through the application of the direct current while presenting an image with reduced cross talk and reduced flickering.

Referring to FIG. 14(a) and FIG. 14(b), in the 1S alternating drive method, the generation area C2 of the transverse electric field is always located in the spacing between adjacent pixel electrodes 9a in a horizontal direction (an X direction).

Referring to FIG. 11 and FIG. 12, the second exemplary embodiment includes the projection 302 so that the longitudinal electric field in the edge portion of the pixel electrode 9a located on the projection 302 intensifies. Specifically, referring to FIG. 12, the distance d2 between the edge portion of the pixel electrode 9a located on top of the projection 302 and the opposing electrode 21 is shortened by the step (height) of the projection 302. In contrast, as shown in FIG. 13, the planarizing process is performed on the scanning line 3a and the main line of the capacitive line 3b so that the distance d1 between the edge portion of the pixel electrode 9a and the opposing electrode 21 becomes approximately equal to the distance D between the central area of the pixel electrode 9a, which is a majority area of the pixel electrode 9a, and the opposing electrode 21.

In the generation area C2 of the transverse electric field shown in FIGS. 14(a) and 14(b), the longitudinal electric field between the pixel electrode 9a and the opposing electrode 21 can thus be intensified. Even if the distance d2 is decreased as shown in FIG. 12, the spacing W2 between the adjacent pixel electrodes 9a remains unchanged, and the transverse electric field, which could intensify with a narrowing spacing W2, is also kept constant. For this reason, the longitudinal electric field is set to be stronger relative to the transverse electric field in localized areas in the generation area C2 of the transverse electric field shown in FIGS. 14(a) and 14(b), and as a result, the longitudinal electric field becomes predominant, thereby controlling the orientation defect of the liquid crystal in the generation area C2 of the transverse electric field.

Referring to FIG. 13, the planarizing process is performed on the scanning line 3a and the capacitive line 3b, reducing the creation of the orientation defect of the liquid crystal attributed to the step, which could be otherwise caused by the scanning line 3a and the capacitive line 3b in that area. Because of the planarizing process implemented, the distance d1 between the pixel electrode 9a and the opposing electrode 21 is not decreased and the longitudinal electric field is not intensified, but no transverse electric field is created in this area, unlike in the spacing between the pixel electrodes 9a as shown in FIGS. 14(a) and 14(b). Without any step implemented for the transverse electric field in this area, the planarizing process keeps the orientation state of the liquid crystal extremely good. Since almost no orientation defect takes place due to the step in the liquid-crystal layer 50 facing the scanning line 3a and the capacitive line 3b in the second exemplary embodiment, the width of the light-shielding layer 23 for covering the area can be smaller than that of the light-shielding layer 23 in the first exemplary embodiment.

In accordance with the second exemplary embodiment, as a result, taking advantage of the characteristics of the transverse electric field generated in the 1S alternating drive method, the longitudinal electric field is intensified by arranging the edge of the pixel electrode 9a on the projection 302 in the generation area C2 of the transverse electric field, thereby reducing the adverse effect of the transverse electric field, while the planarizing process is performed in the area where no transverse electric field is generated, in order to reduce the adverse effect of the step in the pixel electrode 9a.

Third Exemplary Embodiment

Figure 15:
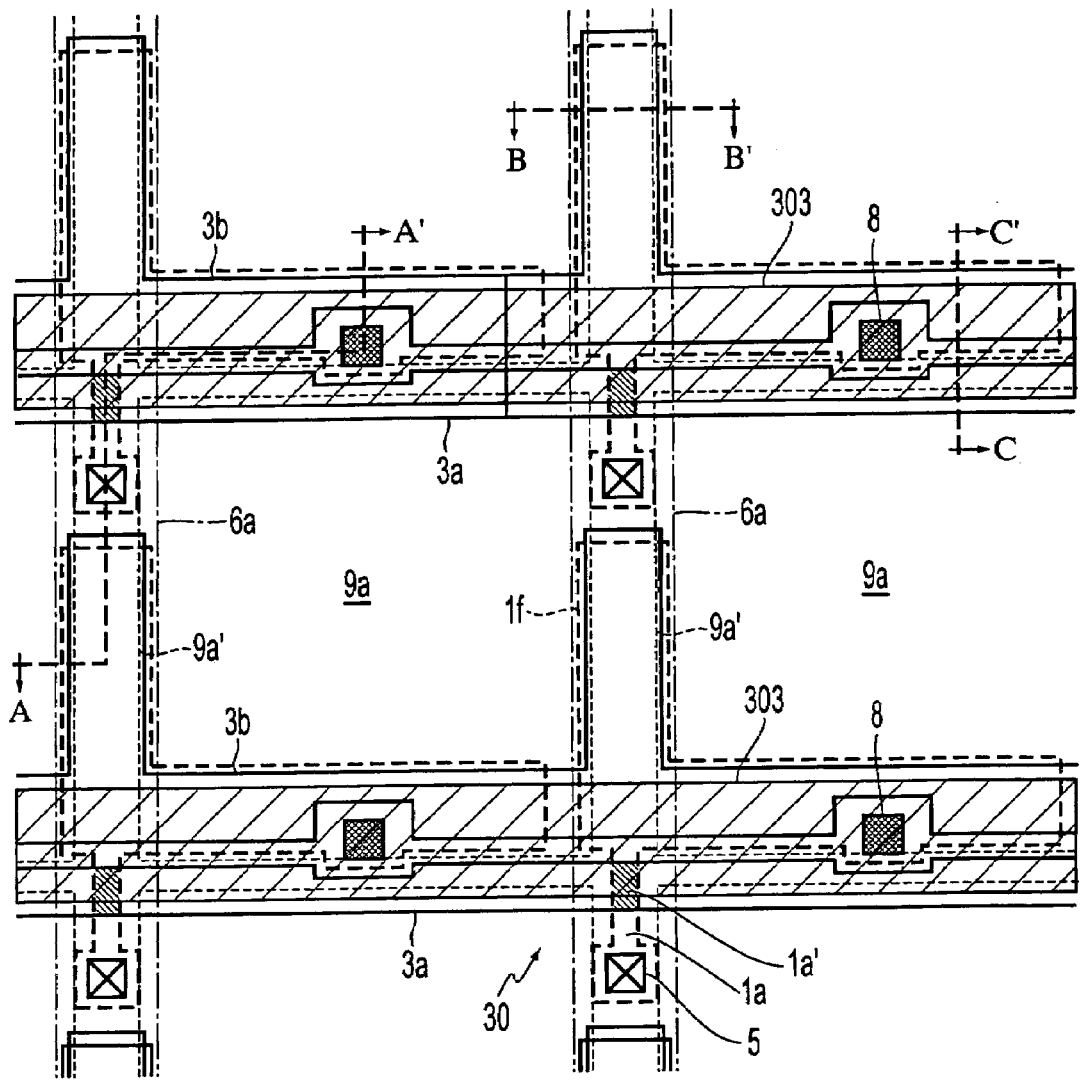
FIG. 15 is a plan view showing a plurality of groups of adjacent pixels on a TFT array having a data line, a scanning line, a pixel electrode, etc. thereon in an electro-optical device of the third exemplary embodiment of the present invention.
Figure 16:
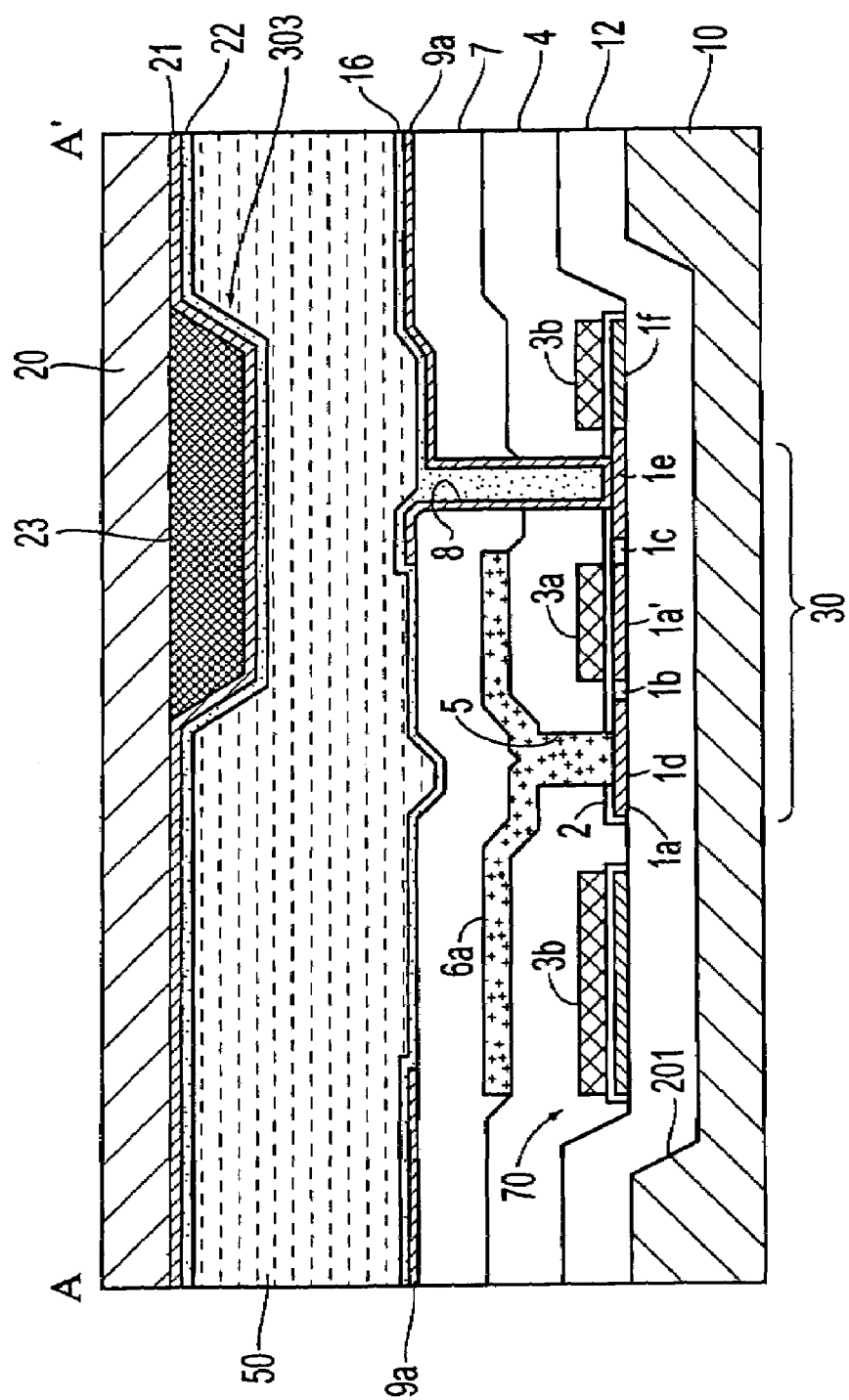
FIG. 16 is a cross-sectional view taken along line XVI–XVI' in FIG. 15.
Figure 17:
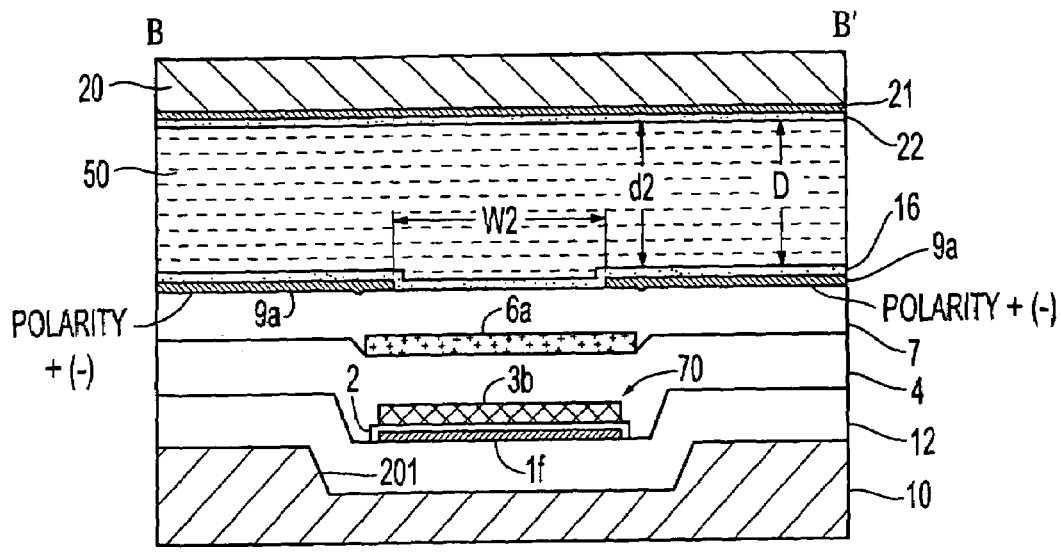
FIG. 17 is a cross-sectional view taken along line XVI-I–XVII' in FIG. 15.
Figure 18:
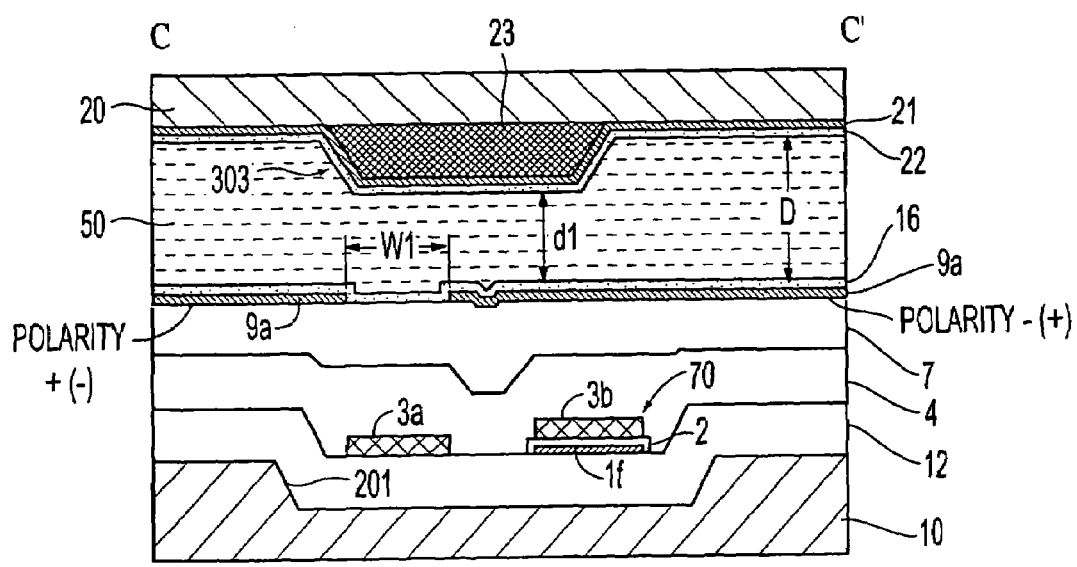
FIG. 18 is a cross-sectional view taken along line XVII-I–XVIII' in FIG. 15.
Figure 20A:
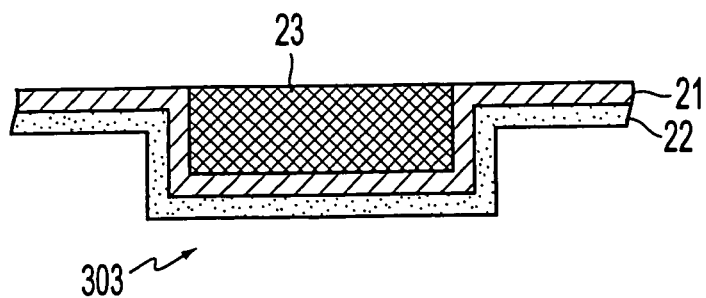
FIGS. 20(a) through 20(d) are cross-sectional views showing a variety of sections of projections in the third exemplary embodiment.
Figure 20B:
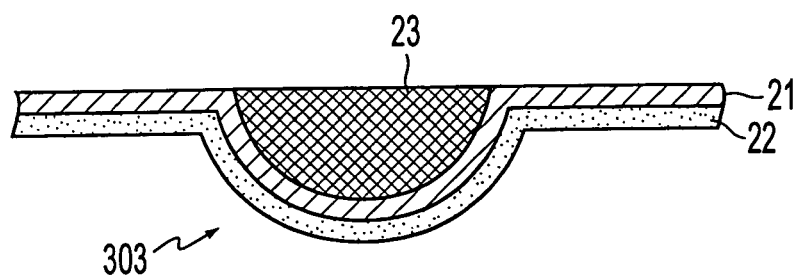
Figure 20C:
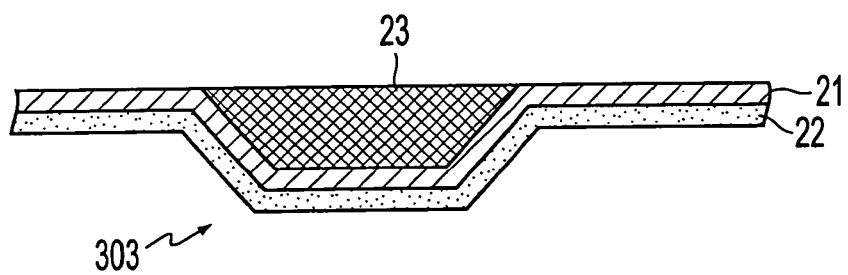
Figure 20D:
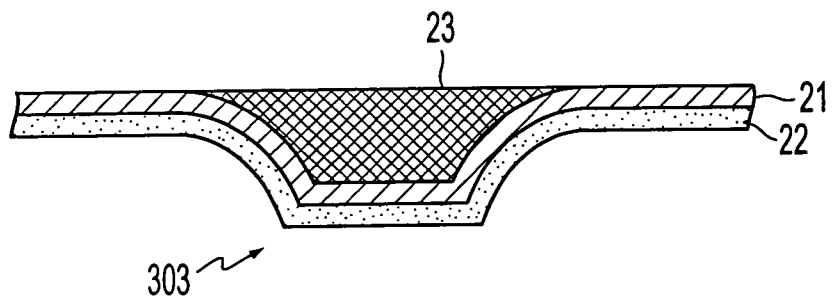
Figure 21A:
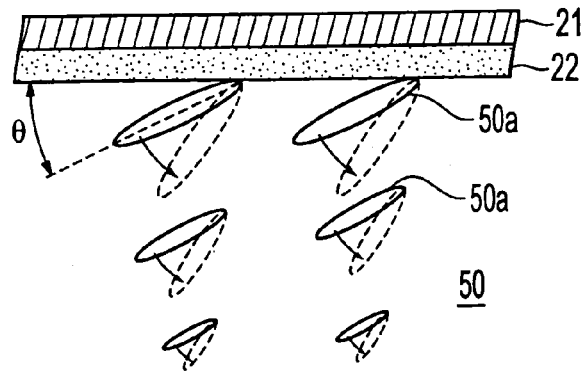
FIGS. 21(a) through 21(c) are cross-sectional views showing alignment states of liquid-crystal molecules when a TN liquid crystal is used in the third exemplary embodiment.
Figure 21B:
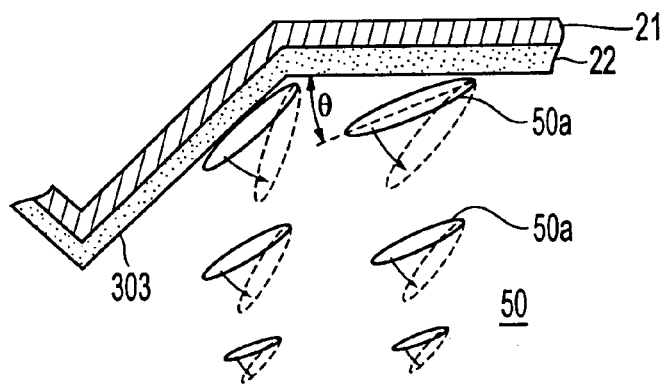
Figure 21C:
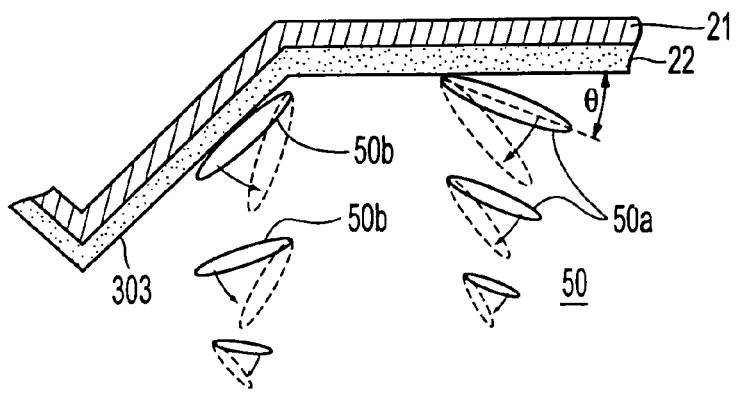
Figure 22A:
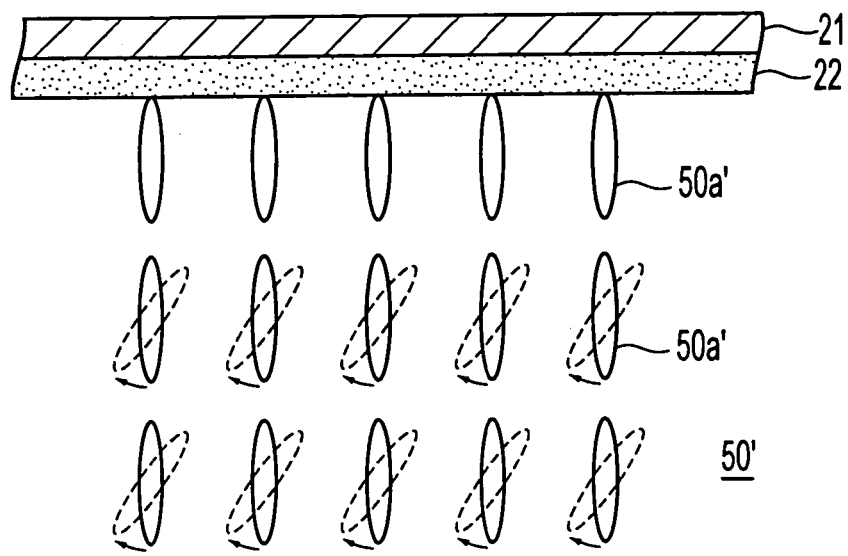
FIGS. 22(a) and 22(b) are cross-sectional views showing alignment states of liquid-crystal molecules when a VA liquid crystal is used in the third exemplary embodiment.
Figure 22B:
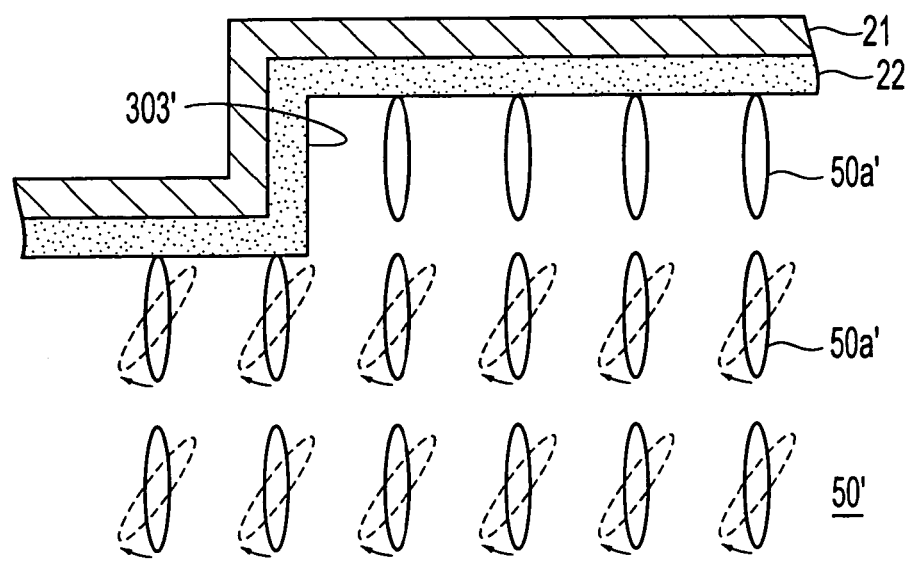

The electro-optical device of a third exemplary embodiment of the present invention is now discussed, referring to FIG. 15 through FIG. 22(b). FIG. 15 is a plan view showing a plurality of pixel electrodes adjacent to each other in a TFT array substrate having a data line, a scanning line, a pixel electrode, etc. thereon. FIG. 16 is a cross-sectional view taken along line XVI–XVI' in FIG. 15. FIG. 17 is a cross-sectional view taken along line XVII–XVII' in FIG. 15. FIG. 18 is a cross-sectional view taken along line XVIII–XVIII' in FIG. 15. FIG. 19(a) through FIG. 20(d) are cross-sectional views showing a variety of cross-sectional shapes of projections. FIGS. 21(a) through 21(c) are diagrammatic cross-sectional views showing the alignment states of liquid-crystal molecules when a TN liquid crystal is used. FIGS. 22(a) and 22(b) are diagrammatic cross-sectional views showing alignment states of liquid-crystal molecules when a VA liquid crystal is used. In FIG. 16 through FIG. 18, and FIG. 19(a) through FIG. 20(d), layers and members are drawn in different scales to present them in a distinctly visible manner in the figures. In the third exemplary embodiment, components identical to those in the first exemplary embodiment are designated with the same reference numerals, and the discussion thereabout is not repeated here.

In the third exemplary embodiment, a groove 201 is formed in the spacing between pixel electrodes 9a, where the data line 6a, the scanning line 3a, the capacitive line 3b and the TFT 30 are formed, and the data line 6a, the scanning line 3a, capacitive line 3b and the TFT 30 are buried in the groove 201. In other words, the planarizing process is performed on the TFT array substrate. The opposing substrate 20 facing the TFT array substrate 10, on which the planarizing process is performed, is furnished with a plurality of projections 303 in an area extending along the scanning line 3a and the capacitive line 3b (as represented by solid lines shown in FIG. 15) in a stripe configuration.

Referring to FIG. 16, the electro-optical device includes the transparent TFT array substrate 10 and the opposing substrate 20 facing to the TFT array substrate 10. The TFT array substrate 10 is fabricated of a quartz substrate, a glass substrate, or a silicon substrate, for instance, and the opposing substrate 20 is fabricated of a glass substrate or a quartz substrate, for instance. The TFT array substrate 10 is provided with the pixel electrodes 9a, and arranged on top of them is an alignment layer 16 which has been subjected to a predetermined alignment process such as a rubbing process. The pixel electrode 9a is fabricated of a transparent, electrically conductive film, such as an ITO (Indium Tin Oxide) film. The alignment layer 16 is fabricated of an organic thin film, such as a polyimide thin film.

The opposing substrate 20 has an opposing electrode 21 on the entire surface thereof, and an alignment layer 22 therebeneath that has been subjected to a predetermined alignment process such as a rubbing process. The opposing electrode 21 is fabricated of a transparent, electrically conductive film, such as an ITO film. The alignment layer 22 is fabricated of an organic thin film such as a polyimide thin film.

Arranged on the TFT array substrate 10 is a pixel switching TFT 30 adjacent to each pixel electrode 9a, for controlling the pixel electrode 9a.

In the third exemplary embodiment, a projection 303 formed of a light-shielding layer 23 is arranged in a non-aperture area of each pixel between the opposing substrate 20 and the opposing electrode 21 as shown in FIG. 16. The function and advantage of the projection 303 in the reduction of the transverse electric field will be discussed in detail later. The projection 303, constructed of the light-shielding layer 23, functions as a black mask or a black matrix, and no incident light from the opposing substrate 20 enters the channel region 1a', a lightly doped source region 1b, and a lightly doped drain region 1c of the semiconductor layer 1a of the pixel switching TFT 30. The projection 303 formed of light-shielding layer 23 has the function of improving a contrast ratio, and the function of preventing color mixing of color materials when a color filter is produced. In the third exemplary embodiment, the data line 6a having light-shielding property and constructed of Al or the like may be used to shield the non-aperture area of each pixel from light to define a segment of the outline of the aperture area of each pixel along the data line 6a, and a projection 303 formed of the light-shielding layer 23 arranged on the opposing substrate 20 may redundantly or solely shield the non-aperture area along the data line 6a from light.

A liquid crystal, as one example of the electro-optical material, is encapsulated in a gap surrounded by a sealing material, to be discussed later, between the TFT array substrate 10 and the opposing substrate 20 arranged with the pixel electrode 9a facing the opposing electrode 21, and a liquid-crystal layer 50 is thus formed. The liquid-crystal layer 50 takes a predetermined orientation state by the alignment layer 16 and the alignment layer 22 with no electric field applied by the pixel electrode 9a. The liquid-crystal layer 50 is formed of a mixture of one or several types of nematic liquid crystals. The sealing material is an adhesive agent made of a thermal setting agent or a photo-setting agent for bonding the TFT array substrate 10 to the opposing substrate 20 along the edges thereof, and is mixed with spacers such as glass fiber or glass beads to keep a predetermined distance between the two substrates.

An insulator substrate 12 is arranged between the TFT array substrate 10 and the plurality of the pixel switching TFTs 30. The insulator substrate 12 extends on the entire surface of the TFT array substrate 10, preventing irregularities during the polishing of the surface of the TFT array substrate 10 and dirt left after a cleaning operation, from changing the characteristics of the pixel switching TFT 30. The insulator substrate 12 is fabricated of highly insulating glass such as NSG (non-doped silicate glass), PSG (phosphosilicate glass), BSG (borosilicate glass), BPSG (borophosphosilicate glass) or a silicon oxide film or a silicon nitride film.

In the third exemplary embodiment, the semiconductor layer 1a extends from a heavily doped drain region 1e, forming a first storage capacitor electrode 1f. A portion of the capacitive line 3b facing the capacitor electrode 1f becomes a second capacitor electrode. A thin insulator layer 2 including a gate insulator extends from a position thereof facing the scanning line 3a, thereby serving as a dielectric layer interposed between these electrodes, and thereby producing the storage capacitor 70.

Referring to FIG. 16, the pixel switching TFT 30 has an LDD (Lightly Doped Drain) structure, and includes the scanning line 3a, the channel region 1a' of the semiconductor layer 1a in which a channel is formed by the electric field from the scanning line 3a, the thin insulator layer 2 including the gate insulator for insulating the scanning line 3a from the semiconductor layer 1a, the data line 6a, the lightly doped source region 1b and the lightly doped drain region 1c of the semiconductor layer 1a, and the heavily doped source region 1d and the heavily doped drain region 1e of the semiconductor layer 1a. A corresponding one of the plurality of the pixel electrodes 9a is connected to the heavily doped drain region 1e through the contact hole 8. Formed on top of the scanning line 3a and the capacitive line 3b is a first interlayer insulator 4 having the contact hole 5 connecting to the heavily doped source region 1d and the contact hole 8 connecting to the heavily doped drain region 1e. Formed on top of the data line 6a and the first interlayer insulator 4 is a second interlayer insulator 7 having the contact hole 8 connecting to the heavily doped drain region 1e. The above-referenced pixel electrode 9a is formed on top of the second interlayer insulator 7 thus constructed.

As shown in FIG. 16 and FIG. 18, the groove 201 is arranged in the area where the data line 6a, the scanning line 3a, the capacitive line 3b and the TFT 30 in the TFT array substrate 10. With this arrangement, the planarizing process is performed on the TFT array substrate 10.

Referring to FIG. 15 to FIG. 17, the data line 6a is arranged in the non-aperture area of the pixel, in the spacing between the horizontally adjacent pixel electrodes 9a and the data line 6a defines the segment of the outline of the aperture area of each pixel along the data line 6a, and the visible defect is prevented by the data line 6a in the non-aperture area. The storage capacitor 70 is formed beneath the data line 6a, making use of the projecting portion of the main line portion of the capacitive line 3b extending beneath the data line 6a, and the non-aperture area is thus effectively utilized.

Referring to FIG. 16 and FIG. 18, the scanning line 3a and the main line portion of the capacitive line 3b are arranged in the non-aperture area of each pixel positioned in the spacing between vertically adjacent pixel electrodes 9a as shown in FIG. 15.

In the third exemplary embodiment, as shown in FIG. 15, no projection 301 is formed on the substrate surface beneath the opposing electrode 21 in the opposing substrate 20 facing the spacing between the horizontally adjacent pixel electrodes 9a, and the opposing electrode 21 is flat, as shown in FIG. 17. Referring to FIG. 15, in contrast, the substrate surface beneath the opposing electrode 21 in the opposing substrate 20 facing the spacing between the vertically adjacent pixel electrodes 9a bulges in a projection as shown in FIG. 18. A projection 303 is formed of the light-shielding layer 23, and the opposing electrode 21 projects toward the pixel electrode 9a. The projection 303 defines a segment of the aperture area of each pixel electrode along the scanning line 3a, and the projection 301 formed of the light-shielding layer 23 prevents the visible defect through the non-aperture area.

Referring to FIG. 16 and FIG. 18, the present exemplary embodiment includes the projection 303 in the area extending along the scanning line 3a so that the longitudinal electric field intensifies in the projecting portion of the opposing electrode 21 on the projection 303. Specifically, referring to FIG. 18, the distance d1 between the opposing electrode 21 arranged on the projection 303 and the pixel electrode 9a is shortened by the step (height) of the projection 303. In contrast, as shown in FIG. 17, no projection 303 is formed in an area facing the data line 6a, and the distance d2 between the edge portion of the pixel electrode 9a and the opposing electrode 21 becomes approximately equal to the distance D between the central area of the pixel electrode 9a, which is a majority area of the pixel electrode 9a, and the opposing electrode 21.

In the generation area C1 of the transverse electric field shown in FIGS. 6(a)–(b), the longitudinal electric field between the pixel electrode 9a and the opposing electrode 21 can thus be intensified. Even if the distance d1 is decreased as shown in FIG. 18, the spacing W1 between the adjacent pixel electrodes 9a remains unchanged, and the transverse electric field, which could intensify with a narrowing spacing W1, is also kept constant. For this reason, the longitudinal electric field is set to be strong relative to the transverse electric field in localized areas in the generation area C1 of the transverse electric field shown in FIGS. 6(a)–(b), and as a result, the longitudinal electric field becomes predominant, thereby controlling the orientation defect of the liquid crystal in the generation area C1 of the transverse electric field.

Referring to FIG. 17, no projection 303 is formed and the opposing electrode 21 is flat in the area facing the data line 6a, and the creation of the orientation defect of the liquid crystal attributed to the step caused by the presence of the projection 303 is minimized. Because of the flatness, the distance d2 between the pixel electrode 9a and the opposing electrode 21 is not decreased and the longitudinal electric field is not intensified, but no transverse electric field is created in this area, unlike in the spacing between the pixel electrodes 9a as shown in FIGS. 6(a)–(b). Without any step implemented for the transverse electric field in this area, the planarizing process keeps the orientation state of the liquid crystal extremely good.

In accordance with the third exemplary embodiment, taking advantage of the characteristics of the transverse electric field generated in the 1H alternating drive method, the longitudinal electric field is intensified by projecting the opposing electrode 21 on the projection 303 in the generation area C1 of the transverse electric field, thereby reducing the adverse effect of the transverse electric field with the longitudinal electric field intensified. The opposing electrode 21 is flattened in the area where no transverse electric field is generated, in order to reduce the adverse effect of the step in the opposing electrode 21. In this way, the orientation defect of the liquid crystal resulting from the transverse electric field and the orientation defect of the liquid crystal resulting from the step are generally reduced and the projection 303 formed of the light-shielding layer 23 for covering the orientation defect portions of the liquid crystal is reduced in size (however, the light-shielding layer 23 having a width slightly wider than that of the projection 303 is integrally formed with the projection 303 or formed of a different member to cover the orientation defect of the liquid crystal due to the step of the projection 303). The aperture ratio of each pixel is increased without creating image defects such as visible defect, and a high-contrast ratio, bright, and high-quality image is thus presented.

According to the study carried out by the inventors of this invention, the liquid-crystal layer 50 needs to have a thickness (as thick as 3 μm or so, for instance) to keep the light resistance thereof at a certain level, not to make difficult an injection process of the liquid-crystal layer 50, and to allow liquid-crystal molecules to well move in response to an electric field applied in operation. On the other hand, the study also shows that if the spacing W1 (see FIG. 18) between the adjacent pixel electrodes 9a is set to be shorter than the distance d1 between the pixel electrode 9a in the corresponding area and the opposing electrode 21 (specifically, W1<d1), the adverse effect of the transverse electric field becomes pronounced. If the thickness D (see FIG. 17 and FIG. 18) of the entire liquid-crystal layer 50 is merely thinned to achieve a high aperture ratio of fine-pitched pixels, a uniform control of the thickness of the liquid crystal will become difficult, the light resistance will drop, the injection process will become difficult, and the liquid crystal molecules will be thus subject to faulty operations. Conversely, if the spacing W1 between the adjacent pixel electrodes 9a is merely decreased without thinning the liquid-crystal layer 50 to achieve a high aperture ratio of the fine-pitched pixels, the transverse electric field will intensify relative to the horizontal electric field, and the adverse effect (i.e., the orientation defect) of the liquid crystal due to the transverse electric field will become pronounced. Considering these properties of the liquid-crystal display apparatus, as in the exemplary embodiment discussed above, the thickness d1 of the liquid-crystal layer 50 is decreased (to 1.5 μm or so, for instance) in only the area where the transverse electric field is generated while the thickness D of the liquid-crystal layer 50 in the remaining area, which occupies the majority of the pixel electrode 9a, is not decreased, and the transverse electric field is not intensified. Since the spacing W1 between the adjacent pixel electrodes 9a is narrowed, this arrangement works effectively, achieving a high aperture ratio in the fine-pitched pixels and presenting a high-definition image.

Referring to FIG. 18, in the third exemplary embodiment in particular, the pixel electrodes 9a are preferably two-dimensionally arranged to hold the relationship of 0.5D<W1, and the projection 303 is formed to satisfy the relationship of d1+300 nm (nanometer)≦D. Specifically, if the pixel electrodes 9a are arranged to be not too close to each other, and the projection 303 is formed to have a step of 300 nm or larger, the longitudinal electric field in this area is intensified relative to the transverse electric field to the degree that the adverse effect of the transverse electric field is not pronounced. Although decreasing the spacing W1 (and the spacing W2 of FIG. 17) to be as small as possible is effective to achieve a high aperture ratio in the fine-pitched pixels and to present a high definition image, the spacing W1 cannot be limitlessly decreased in an effort to keep the adverse effect of the transverse electric field contained. If the spacing W1 is decreased to be nearly equal to d1, a high aperture ratio of the fine-pitched pixels is most effectively achieved without degrading the quality of the image.

The above-referenced projection 303 is formed making use of the light-shielding layer 23, but alternatively a projection forming film fabricated of an organic film or resist may be added between the opposing substrate 20 and the opposing electrode 21 in localized areas in a lamination process. The cross-sectional shape of the projection 303 perpendicular to the length direction of the projection may be any of a variety of shapes, such as a trapezoid, a triangle, a semi-circle, a semi-ellipsoid, a semi-circle or semi-ellipsoid having a flattened top surface, a quadratic curve with the gradient thereof increasing as it rises, a cubical curve outline having an approximate trapezoidal shape, or a cubical curve outline having an approximate triangular shape. In practice, the cross-sectional shape may be appropriately determined to minimize the orientation defect of the liquid crystal resulting from the step in accordance with the property of the liquid crystal. Since the formation of the projection 303 creates the orientation defect due to the step, the light-shielding layer 23 having a width slightly wider than that of the projection 303 is preferably arranged between the projection 303 and the opposing substrate 20 or between the projection 303 and the pixel electrode.

Figure 19A:
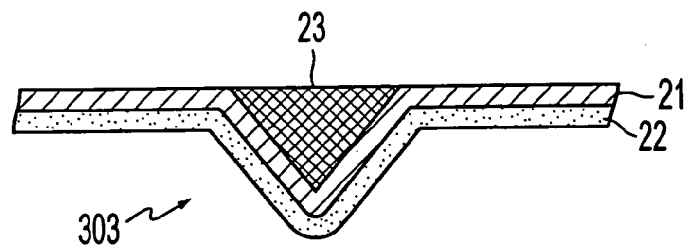
FIGS. 19(a) through 19(d) are cross-sectional views showing a variety of sections of projections in the third exemplary embodiment.
Figure 19B:
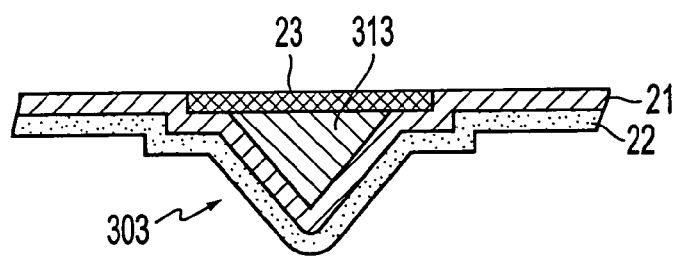
Figure 19C:
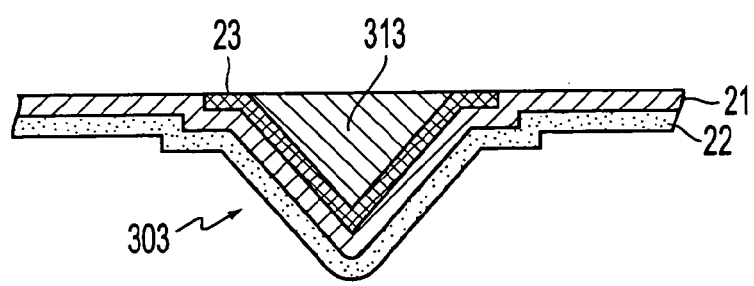
Figure 19D:
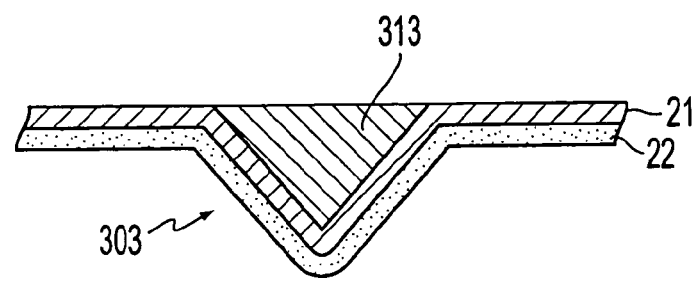

The projection 303, having a triangular cross-sectional shape in a plane perpendicular to the longitudinal direction of thereof, may be formed of the light-shielding layer 23 as shown in FIG. 19(a), or the projection 303 may be formed of a projection forming film 313, constructed of a resist or an organic film, on the light-shielding layer 23 having a width slightly wider than that of the projection 303 as shown in FIG. 19(b), or the projection 303 may be formed by forming the projection forming film 313, fabricated of a resist or an organic film, on the opposing substrate 20 and by covering the film 313 with the light-shielding layer 23 having a width slightly wider than that of the projection 303 as shown in FIG. 19(c), or the projection 303 may be formed by forming, on the opposing substrate 20, a projection forming film 313, which is fabricated of a resist or an organic film, and which is not followed by the covering of the light-shielding layer as shown in FIG. 19(d) (in this case, a light-shielding layer for covering this area is formed on the TFT array substrate).

The cross-sectional shape of the projection 303, sectioned in a plane perpendicular to the longitudinal direction thereof, may be rectangular as shown in FIG. 20(a), may be semicircular as shown in FIG. 20(b), may be trapezoidal as shown in FIG. 20(c), or may be substantially trapezoidal as shown in FIG. 20(d). The laminate structures shown in FIG. 20(a) through FIG. 20(d) are formed by forming the projection 303 on the light-shielding layer 23 arranged on the opposing substrate 20 in the same manner as shown in FIG. 19(a). Any of the laminate structures shown in FIG. 19(a) through FIG. 19(d) may be employed. Since a color filter, a protective film, an insulator, or the like can be arranged on the opposing substrate 20, variations are possible in the actual laminate structure.

Referring to FIG. 21(b), the liquid-crystal layer 50 is preferably fabricated of a TN liquid crystal in the third exemplary embodiment, and the projection 303 has a tapered side wall. The pretilt angle θ of the TN liquid crystal in the opposing substrate 20 is set to match the inclination angle of the tapered sidewall.

Specifically, as shown in FIG. 21(a), in principle, the liquid-crystal molecules 50a of the TN liquid crystal are aligned to be substantially in parallel with the substrate with no voltage applied, while gradually being twisted toward the opposing substrate 20 from the TFT array substrate 10. With a voltage applied, the liquid-crystal molecules 50a are aligned to be vertical to the substrate surface as represented by arrows. Referring to FIG. 21(b), the sidewall of the projection 303 is tapered, and the inclination angle of the tapered sidewall is set to match the pretilt angle θ of the TN liquid crystal. Even if the thickness d1 of the liquid crystal gradually decreases between the projection 303 and the opposing substrate 20, a good liquid-crystal orientation state as good as when the layer thickness D of the liquid crystal remains constant is obtained. In other words, this arrangement minimizes the liquid crystal orientation defect attributed to the step caused by the presence of the projection 303 to control the liquid crystal orientation defect due to the transverse electric field. If the pretilt angle θ of the TN liquid crystal fails to match the inclination angle of the tapered sidewall as shown in FIG. 21(c), there occur liquid-crystal molecules 50b which rise in a direction opposite to the direction of the remaining liquid-crystal molecules 50a, between the projection 303 and the TFT array substrate 10, and a liquid-crystal orientation defect of orientation state discontinuity occurs. In such a case, the light-shielding layer is preferably formed on at least one of the opposing substrate 20 and the TFT array substrate 10 to control visible defect.

Referring to FIG. 22(b), in the third exemplary embodiment, a liquid crystal 50' is fabricated of a VA liquid crystal, and a projection 303' may have almost no taper on the sidewall thereof.

Specifically, referring to FIG. 22(a), the VA liquid crystal molecules 50a' are aligned to be vertical to the substrate with no voltage applied. In a plan view, the liquid crystal orientation is forced to be disturbed in the area where the sidewall of the projection 303' is tapered, but if the projection 303' has almost no taper in the sidewall thereof, the portion of the liquid crystal suffering from orientation disturbance at the sidewall is minimized. Referring to FIG. 22(b), a good liquid crystal orientation state nearly as good as when the layer thickness D of the liquid crystal remains constant as shown in FIG. 22(a) is obtained on both a substantially flat portion of the pixel electrode 9a on top of the projection 303' and on a substantially flat portion of the pixel electrode 9a beside the step of the projection 303'.

In the above-referenced third exemplary embodiment, the planarizing process is performed by forming the groove 201 in the TFT array substrate 10 and by burying the scanning line 3a or the like into the groove 201, but alternatively, the planarizing process may be performed by polishing the step on the surface of the second interlayer insulator 7 or 12 over the scanning line 3a through a CMP (Chemical Mechanical Polishing) process or an organic SOG maybe used to assure flatness.

Subsequent to the planarizing process, a projection may be partly formed in an area extending along the data line 6a or the scanning line 3a. In one method of forming the projection, an interlayer insulator is etched in the area thereof other than the area where the projection is to be formed. In this way, the projection is easily formed in the area where the transverse electric field is generated. In the generation area of the transverse electric field, the projections may be formed on both the TFT array substrate 10 and the opposing substrate 20.

In the above-referenced third exemplary embodiment, the pixel switching TFT 30 preferably has an LDD structure as shown in FIG. 3, but may have an offset structure in which no impurity implantation is performed on the lightly doped source region 1b and the lightly doped drain region 1e or may have a self-aligned type TFT in which a high dose impurity is implanted with the gate electrode formed of a portion of the scanning line 3a being used as a mask, to form heavily doped source and drain in a self-alignment process. In the third exemplary embodiment, the gate electrode of the pixel switching TFT 30 is a single gate structure in which a single gate is interposed between the heavily doped source region 1d and the heavily doped drain region 1e, but alternatively, more than one gate electrode may be interposed therebetween. With dual gates or triple gates employed in a TFT, leakage currents in junctions between the channel region and the source region and between the channel region and the drain region are prevented, and thereby a current during off period is reduced.

Manufacturing Process of the Third Exemplary Embodiment

A manufacturing process of the TFT array substrate constituting the electro-optical device of the third exemplary embodiment having the above-discussed construction is now discussed, referring to FIGS. 23(a) through 23(d). FIGS. 23(a) through 23(d) are process diagrams showing the layers of the TFT array substrate, corresponding to the cross section XVIII–XVIII' in FIG. 15, as shown in FIG. 18.

Figure 23A:
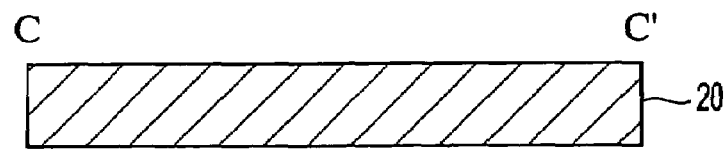
FIGS. 23(a) through 23(d) are process diagrams sequentially showing the manufacturing process of the electro-optical device of the third exemplary embodiment.

Referring to FIG. 23(a), the opposing substrate 20, such as a glass substrate or a quartz substrate, having no particular defined shape, is prepared.

Figure 23B:
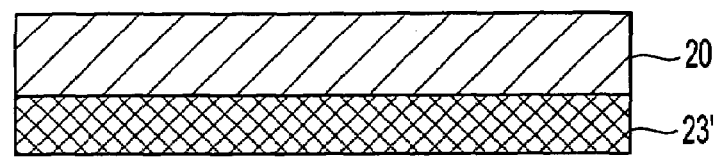

Referring to FIG. 23(b), a light-shielding layer 23', such as an organic film or a metal film, is formed to a thickness of approximately 300 nm.

Figure 23C:
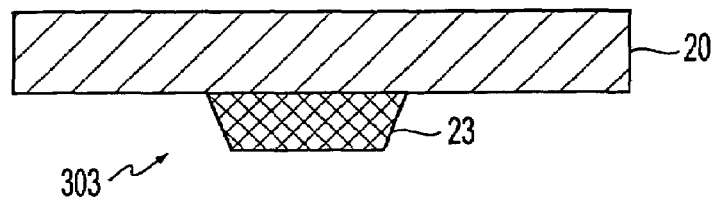

Referring to FIG. 23(c), the projection 303 is formed as a band-like light-shielding layer 23 in the area where the transverse electric field is generated, by a patterning technique through the photolithographic process and the etching process.

Figure 23D:
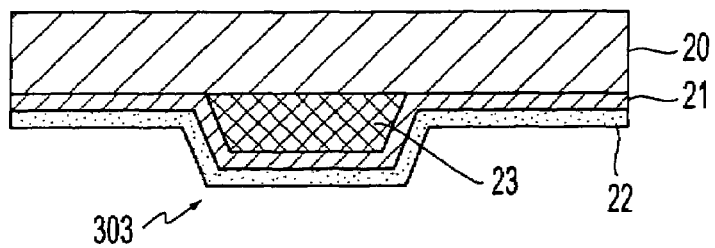

Referring to FIG. 23(d), the opposing electrode is formed of a transparent, electrically conductive film such as an ITO (Indium Tin Oxide) film on top of the projection 303, and the alignment layer 22 made of an organic film such as a polyimide thin film is deposited and is rubbed in a predetermined direction.

The projection 303 may be formed of the light-shielding layer through a printing technique, rather than using the step in FIG. 23(b) and the step in FIG. 23(c).

A liquid-crystal display device, which reduces, through the projection 303, the liquid-crystal orientation defect through the transverse electric field in the generation area of the transverse electric field, is easily manufactured in accordance with the manufacturing method of the third exemplary embodiment.

The specific plan layout of the projection 303 and the light-shielding layer formed on the opposing substrate 20 in the third exemplary embodiment is discussed, referring to FIG. 24(a) through FIG. 25(b). In these specific examples, the spacing between the pixel electrodes 9a extending in the Y direction along the data line 6a is shielded from light by the data line 6a on the TFT array substrate 10, and the spacing between the pixel electrodes 9a extending in the X direction along the scanning line 3a is shielded from light by the light-shielding layer on the opposing substrate 20.

Figure 24B:
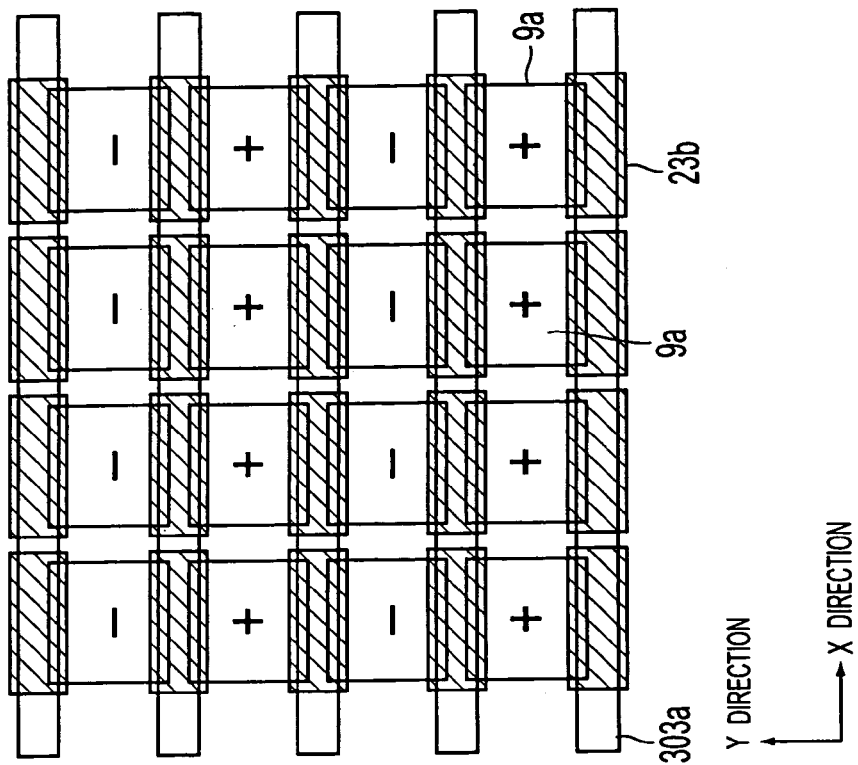
FIGS. 24(a) and 24(b) are plan views showing specific examples of the plan layout of a projection and a light-shielding layer formed on an opposing substrate in the third exemplary embodiment.
Figure 24A:
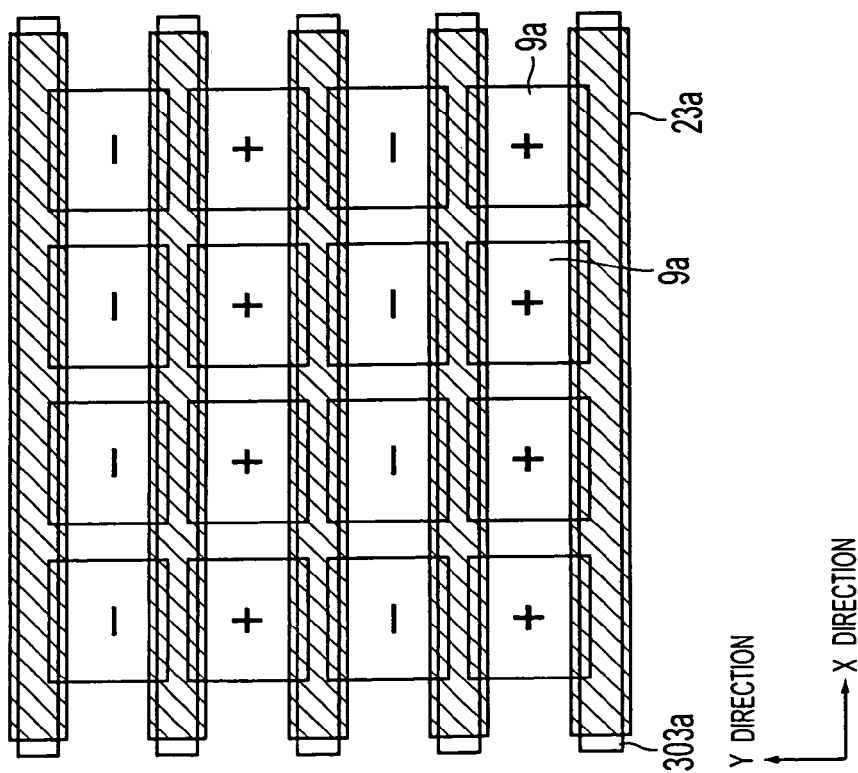
Figure 25B:
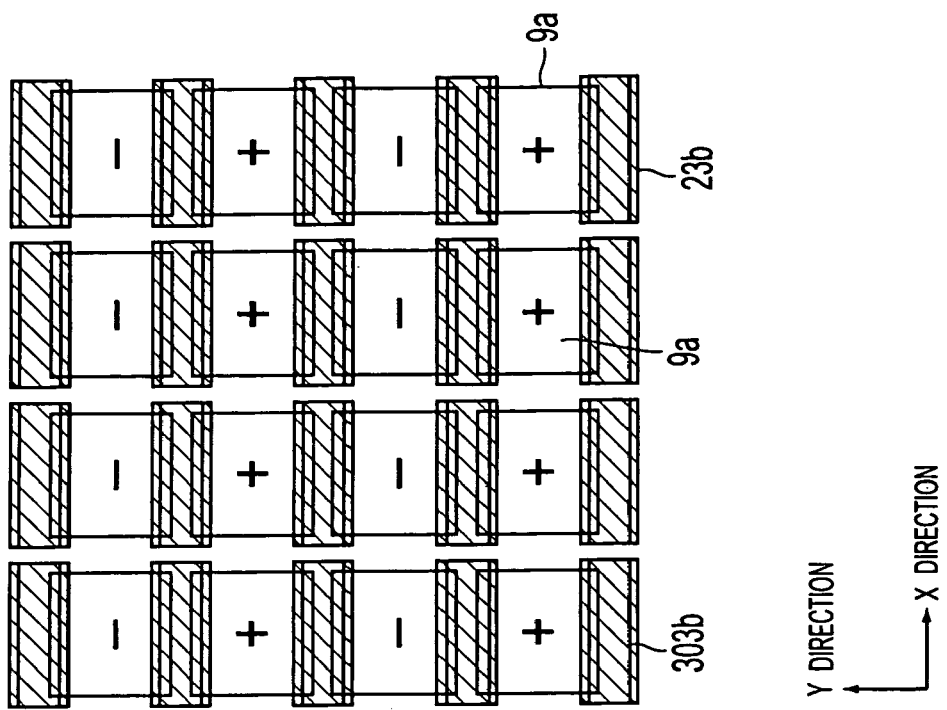
FIGS. 25(a) and 25(b) are plan views showing specific examples of the plan layout of a projection and a light-shielding layer formed on an opposing substrate in the third exemplary embodiment.
Figure 25A:
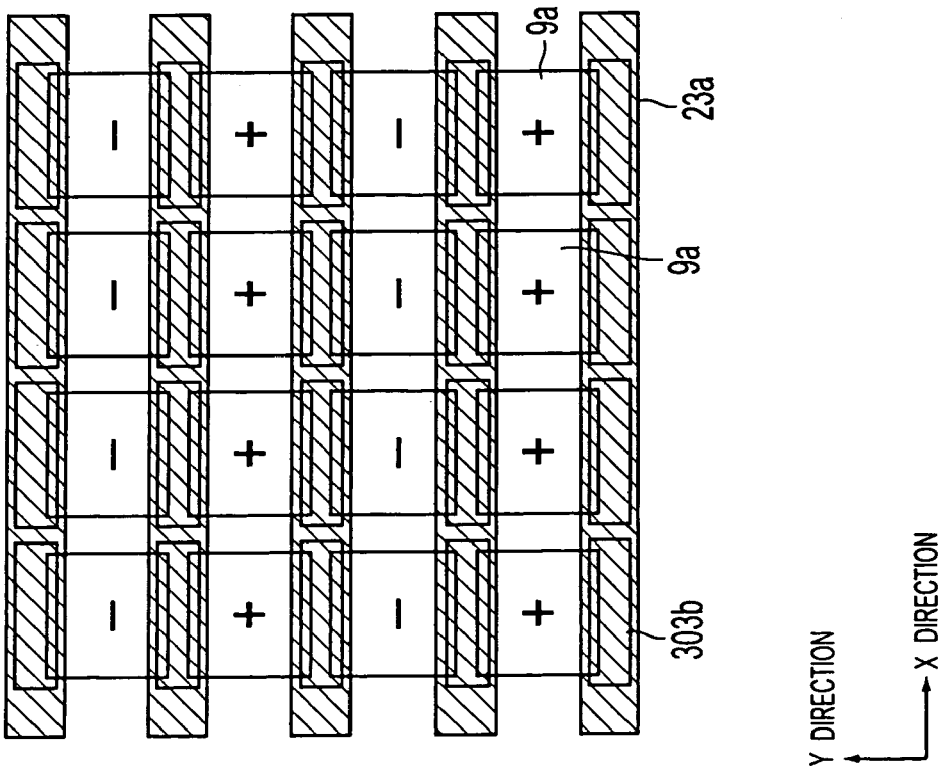

Referring to FIG. 24(a), a projection 303a and a light-shielding layer 23a may be formed in stripes which extend in the X direction straddling a plurality of the pixel electrodes 9a. Referring to FIG. 24(b), the projection 303a may be formed in stripes which extend in the X direction straddling a plurality of the pixel electrodes 9a, and the light-shielding layer 23b may be formed in islands respectively for the pixel electrodes 9a. Referring to FIG. 25(a), a projection 303b may be formed in islands respectively for the pixel electrodes 9a while the light-shielding layer 23a may be formed in stripes which extend in the X direction straddling a plurality of the pixel electrodes 9a. Alternatively, referring to FIG. 25(b), a projection 303b and a light-shielding layer 23b may be formed in islands respectively for the pixel electrodes 9a. In any case, as shown in FIG. 24(a) through FIG. 25(b), the use of the projection 303a or 303b intensifies the longitudinal electric field in the area where the transverse electrode field is generated. At the same time, the light-shielding layers 23a and 23b cover the orientation defect due to the presence of the projections 303a and 303b.

A liquid-crystal display device having a high-aperture ratio and a high pixel electrode pitch is thus provided by arranging the layout of the projection and the light-shielding layer on the opposing substrate in the area where the transverse electric field is generated.

Fourth Exemplary Embodiment

Figure 26:
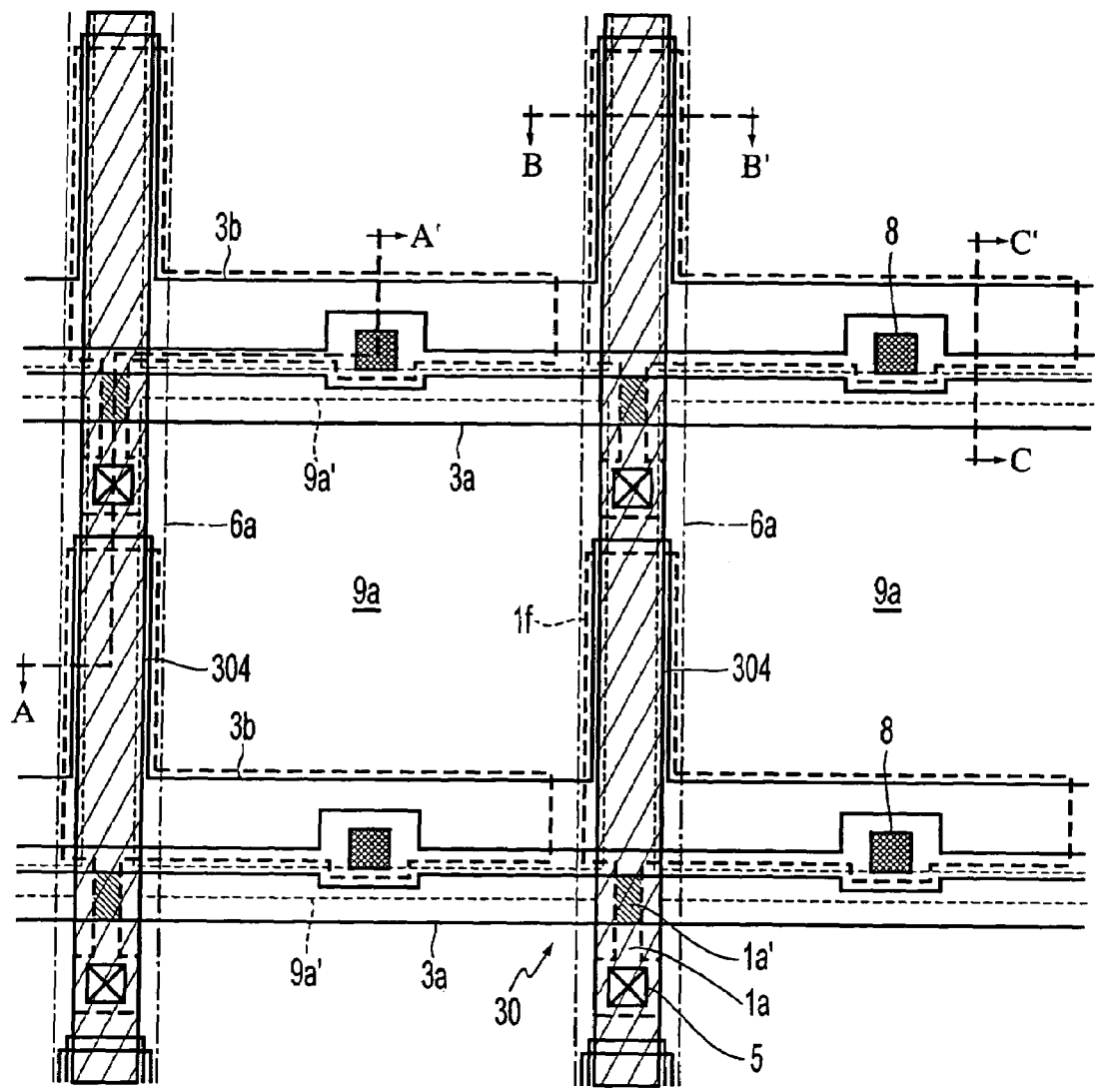
FIG. 26 is a plan view showing a plurality of groups of adjacent pixels on a TFT array having a data line, a scanning line, a pixel electrode, etc. thereon in an electro-optical device of the fourth exemplary embodiment of the present invention.
Figure 27:
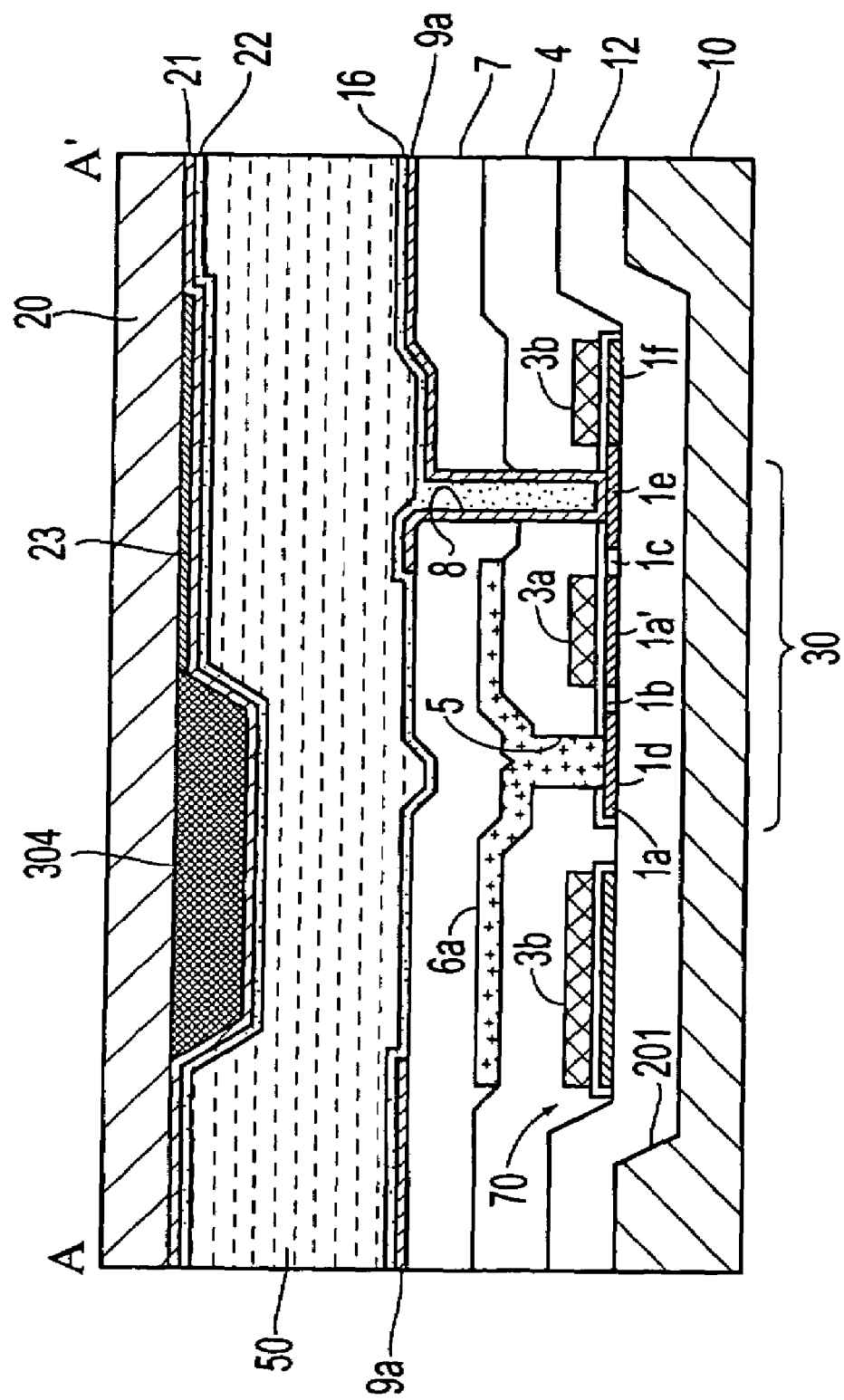
FIG. 27 is a cross-sectional view taken along line XXVII–XXVII' in FIG. 26.
Figure 28:
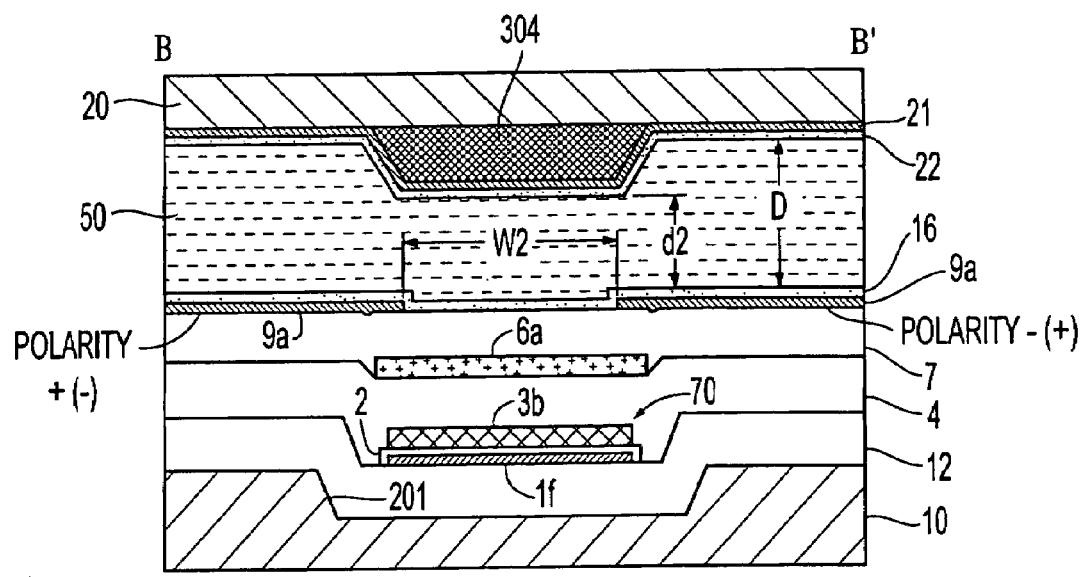
FIG. 28 is a cross-sectional view taken along line XXVII–XXVIII' in FIG. 26.
Figure 29:
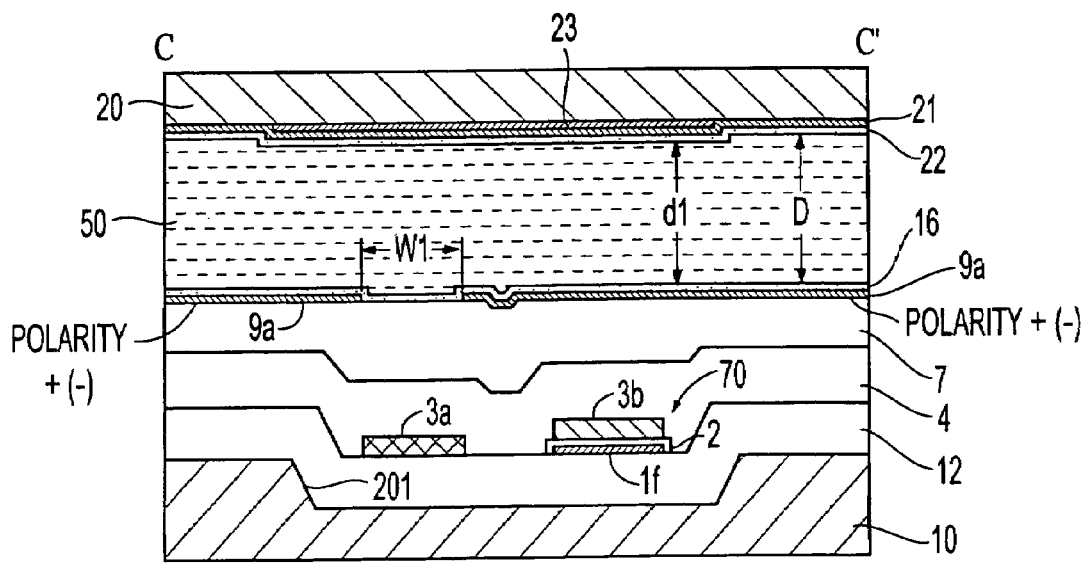
FIG. 29 is a cross-sectional view taken along line XXIX–XXIX' in FIG. 26.

The electro-optical device of a fourth exemplary embodiment of the present invention is now discussed, referring to FIG. 26 through FIG. 29. FIG. 26 is a plan view showing a plurality of pixel electrodes adjacent to each other in a TFT array substrate having a data line, a scanning line, a pixel electrode, etc. thereon. FIG. 27 is a cross-sectional view taken along line XXVII–XXVII' in FIG. 26. FIG. 28 is a cross-sectional view taken along line XXVIII–XXVIII' in FIG. 26. FIG. 29 is a cross-sectional view taken along line XXIX–XXIX' in FIG. 26. In FIG. 27 through FIG. 29, layers and members are drawn in different scales to present them in a distinctly visible manner in the figures. In the fourth exemplary embodiment shown in FIG. 26 through FIG. 29, components identical to those described in connection with the third exemplary embodiment shown in FIG. 15 through FIG. 18 are designated with the same reference numerals, and the discussion thereabout is not repeated.

In contrast to the third exemplary embodiment shown in FIG. 15 through FIG. 22(b) in which the projection 303 is formed along the scanning line 3a, a projection 304 is formed on the opposing substrate 20 in an area along the data line 6a (as represented by solid lines in FIG. 26). Since the data line 6a functions as a light-shielding layer in this case, the projection 304 may be formed of the light-shielding layer, or a transparent layer. Referring to FIG. 27 and FIG. 29, the opposing substrate 20 is flat in an area thereof facing the scanning line 3a and the main line portion of the capacitive line 3b. The light-shielding layer 23 is formed in the area of the opposing substrate 20 facing the scanning line 3a and the main line portion of the capacitive line 3b, and defines the segment of the aperture area of each pixel electrode running at least along the scanning line 3a. The light-shielding layer 23 may be formed on the opposing substrate 20 in an area along the data line 6a. In the fourth exemplary embodiment, also shown in FIGS. 14(a)–(b), the electro-optical device is driven in the 1S alternating drive method. The remaining construction and operation of the fourth exemplary embodiment remain unchanged from those of the third exemplary embodiment.

In accordance with the fourth exemplary embodiment, as shown in FIG. 14(a), during the presentation of an n-th (n is a natural number) field video signal or frame video signal, the polarity of the liquid-crystal driving voltage represented by + or − in each pixel electrode 9a is not inverted, and the pixel electrodes 9a are driven by the same polarity on a column-by-column basis. Referring to FIG. 14(b), during the presentation of an (n+1)-th field video signal or frame video signal, the voltage polarity of the liquid-crystal driving voltage in the pixel electrodes 9a is inverted, and during the presentation of the (n+1)-th field or frame video signal, the polarity of the liquid-crystal driving voltage represented by + or − in each pixel electrode 9a is not inverted, and the pixel electrodes 9a are driven by the same polarity on a column-by-column basis. The states shown in FIG. 14(a) and FIG. 14(b) are repeated with the period of field and frame, and the device is driven in the 1S alternating drive method in the fourth exemplary embodiment. As a result, in accordance with the fourth exemplary embodiment, the device is free from the degradation of the liquid-crystal through the application of the direct current while presenting an image with reduced cross talk and reduced flickering.

Referring to FIG. 14(a) and FIG. 14(b), in the 1S alternating drive method, the generation area C2 of the transverse electric field is always located in the spacing between adjacent pixel electrodes 9a in a horizontal direction (an X direction).

Referring to FIG. 27 and FIG. 28, the fourth exemplary embodiment includes the projection 304 to project the opposing electrode 21 on the projection 304 to intensify the longitudinal electric field. Specifically, referring to FIG. 28, the distance d2 between the opposing electrode 21 on the projection 304 and the pixel electrode 9a is shortened by the step (height) of the projection 304. In contrast, as shown in FIG. 29, the opposing substrate 20 is flat in the area facing the scanning line 3a and the capacitive line 3b, and the distance d1 between the opposing electrode 21 and the pixel electrode 9a is approximately equal to the distance D between the central area of the pixel electrode 9a and the opposing electrode 21.

In the generation area C2 of the transverse electric field shown in FIGS. 14(a)–(b), the longitudinal electric field between the pixel electrode 9a and the opposing electrode 21 is thus intensified. Even if the distance d2 is decreased as shown in FIG. 28, the spacing W2 between the adjacent pixel electrodes 9a remains unchanged, and the transverse electric field, which could intensify with a narrowing spacing W2, also remains constant. For this reason, the longitudinal electric field is set to be stronger relative to the transverse electric field in localized areas in the generation area C2 of the transverse electric field shown in FIGS. 14(a)–(b), and as a result, the longitudinal electric field becomes predominant, thereby controlling the orientation defect of the liquid crystal in the generation area C2 of the transverse electric field.

Since the opposing substrate 20 is flat in the area facing the scanning line 3a and the capacitive line 3b as shown in FIG. 29, the creation of the orientation defect of the liquid crystal attributed to the step caused by the presence of the projection 304 in that area is minimized. Because of the flatness, the distance d1 between the pixel electrode 9a and the opposing electrode 21 is not decreased and the longitudinal electric field is not intensified, but no transverse electric field is created in this area, unlike in the spacing between the pixel electrodes 9a as shown in FIGS. 14(a)–(b). Without any step implemented for the transverse electric field in this area, the planarizing process keeps the orientation state of the liquid crystal extremely good. Since almost no orientation defect takes place due to the step in the liquid-crystal layer 50 facing the scanning line 3a and the capacitive line 3b in the fourth exemplary embodiment, the width of the light-shielding layer 23 for covering the area can be smaller than that of the light-shielding layer 23 in the third exemplary embodiment.

In accordance with the fourth exemplary embodiment, as a result, taking advantage of the characteristics of the transverse electric field generated in the 1S alternating drive method, the longitudinal electric field is intensified by arranging the edge of the pixel electrode 9a on the projection 304 in the generation area C2 of the transverse electric field, thereby reducing the adverse effect of the transverse electric field, while the planarizing process is performed in the area where no transverse electric field is generated, reducing the adverse effect of the step in the pixel electrode 9a.

Besides the formation of the projection 303 or 304 on the opposing substrate 20 in the third exemplary embodiment and the fourth exemplary embodiment, the substrate surface beneath the pixel electrode 9a on the TFT array substrate 10 may be raised in a projection in an area covering the scanning line 3a and the capacitive line 3b or the data line 6a. Since the distance between the pixel electrode 9a and the opposing electrode 21 is shortened in the area where the transverse electric field is generated, the advantages as those of the preceding exemplary embodiments are provided. A partial planarizing process may be performed on the data line 6a, the scanning line 3a, the capacitive line 3b, and the TFT 30. For instance, these lines may be buried in a groove formed in the TFT array substrate 10 or the interlayer insulator to form a projection at a desired location to a desired height.

Fifth Exemplary Embodiment

Figure 30:
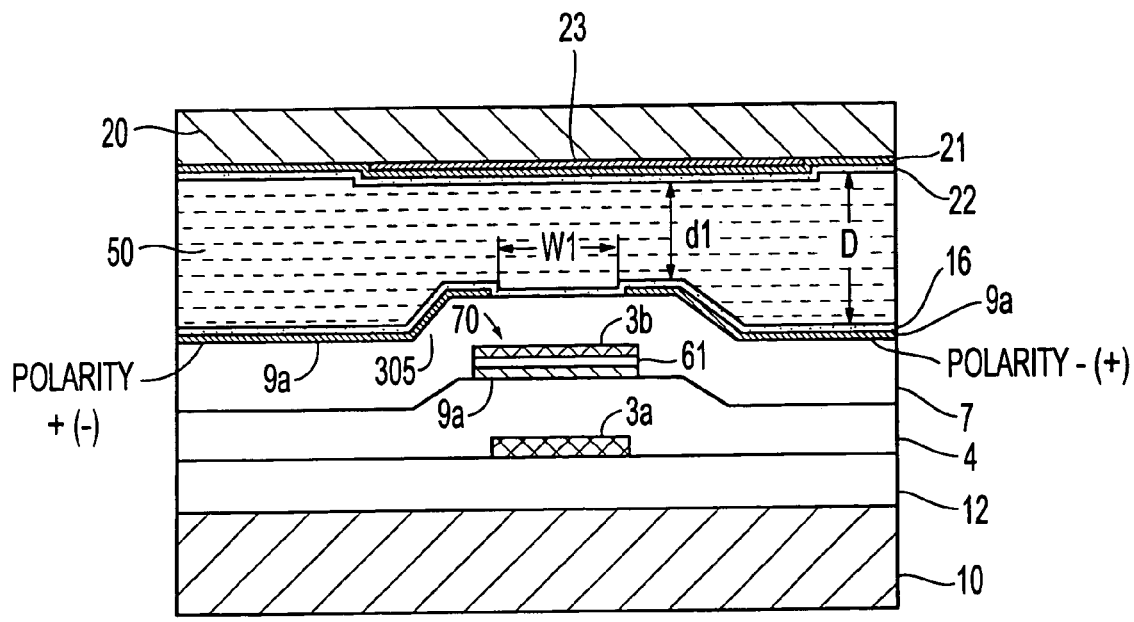
FIG. 30 is a cross-sectional view showing an area where a scanning line and a capacitive line extend in a fifth exemplary embodiment.

The construction of the electro-optical device of a fifth exemplary embodiment of the present invention is now discussed, referring to FIG. 30. FIG. 30 is a cross-sectional view showing a portion of the electro-optical device where a scanning line and a capacitive line run. Components identical to those described in connection with the first exemplary embodiment are designated with the same reference numerals, and the discussion thereabout is not repeated.

Referring to FIG. 30, the fifth exemplary embodiment includes the capacitive line 3b which is located above the scanning line 3a with the first interlayer insulator 4 interposed therebetween, in contrast to the first exemplary embodiment, where the scanning line 3a and the capacitive line 3b are formed of the same layer as lines running in a close range. A first capacitor electrode 62 is separated from the capacitive line 3b by an insulating thin film 61, thus forming a storage capacitor 70. The capacitive line 3b, fabricated of a refractory metal, shields the capacitive line 3b from light.

A projection 305 is formed on top of the capacitive line 3b to intensify the longitudinal electric field in the vicinity of the edge of the pixel electrode 9a on the projection 305.

Alternatively, the capacitive line 3b may be arranged beneath the scanning line 3a with an interlayer insulator interposed therebetween.

Sixth Exemplary Embodiment

Figure 31:
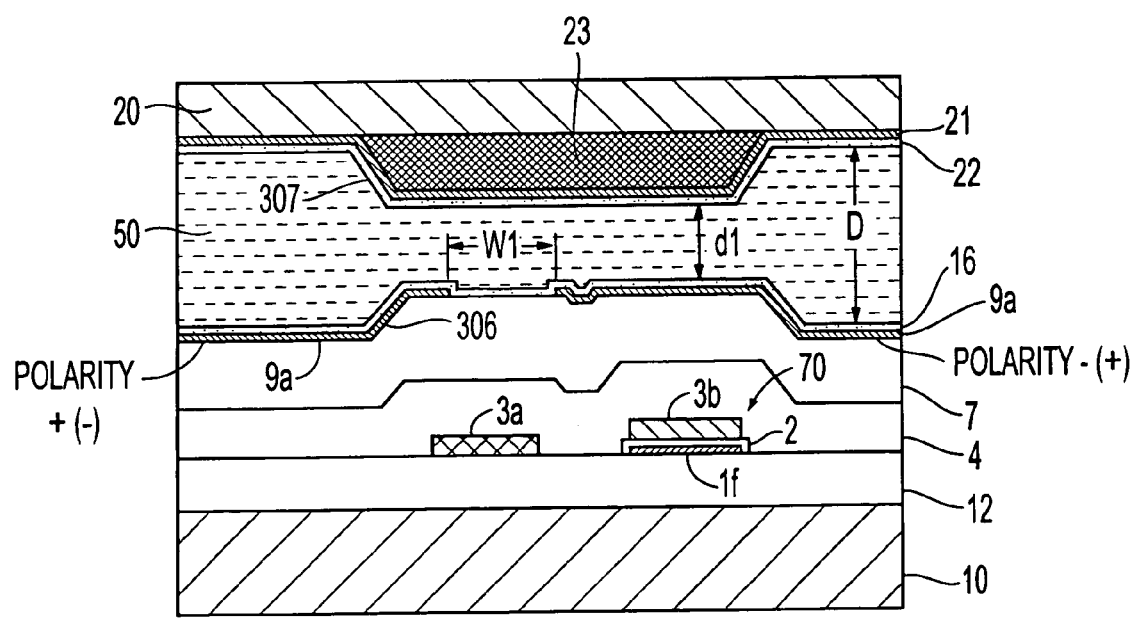
FIG. 31 is a cross-sectional view showing an area where a scanning line and a capacitive line extend in a sixth exemplary embodiment.

The construction of the electro-optical device of a sixth exemplary embodiment of the present invention is now discussed, referring to FIG. 31. FIG. 31 is a cross-sectional view showing a portion of the electro-optical device where a scanning line and a capacitive line run. Components identical to those described in connection with the first exemplary embodiment are designated with the same reference numerals, and the discussion thereabout is not repeated.

Referring to FIG. 31, the sixth exemplary embodiment includes a projection 306 arranged on the TFT array substrate 10 and a projection 307 arranged on the opposing substrate 20 to thin the thickness D of the liquid crystal. The constructions of the projections 306 and 307 are respectively identical to those of the projection 301 in the first exemplary embodiment and the projection 303 in the third exemplary embodiment. The mutually facing projections 306 and 307 intensifies the longitudinal electric field in the vicinity of the edge of the pixel electrode arranged on the projection 306.

Although the projections 306 and 307 are arranged to mutually face each other, the two projections may be arranged out of alignment with each other.

In the exemplary embodiments of the present invention, the polarity of the driving voltage may be inverted every row, or every two adjacent rows, or every plural number of adjacent rows in the 1H alternating drive method. Similarly, the polarity of the driving voltage may be inverted every column, or every two adjacent columns, or every plural number of adjacent columns in the 1S alternating drive method.

(General Construction of the Electro-Optical Device)

Figure 32:
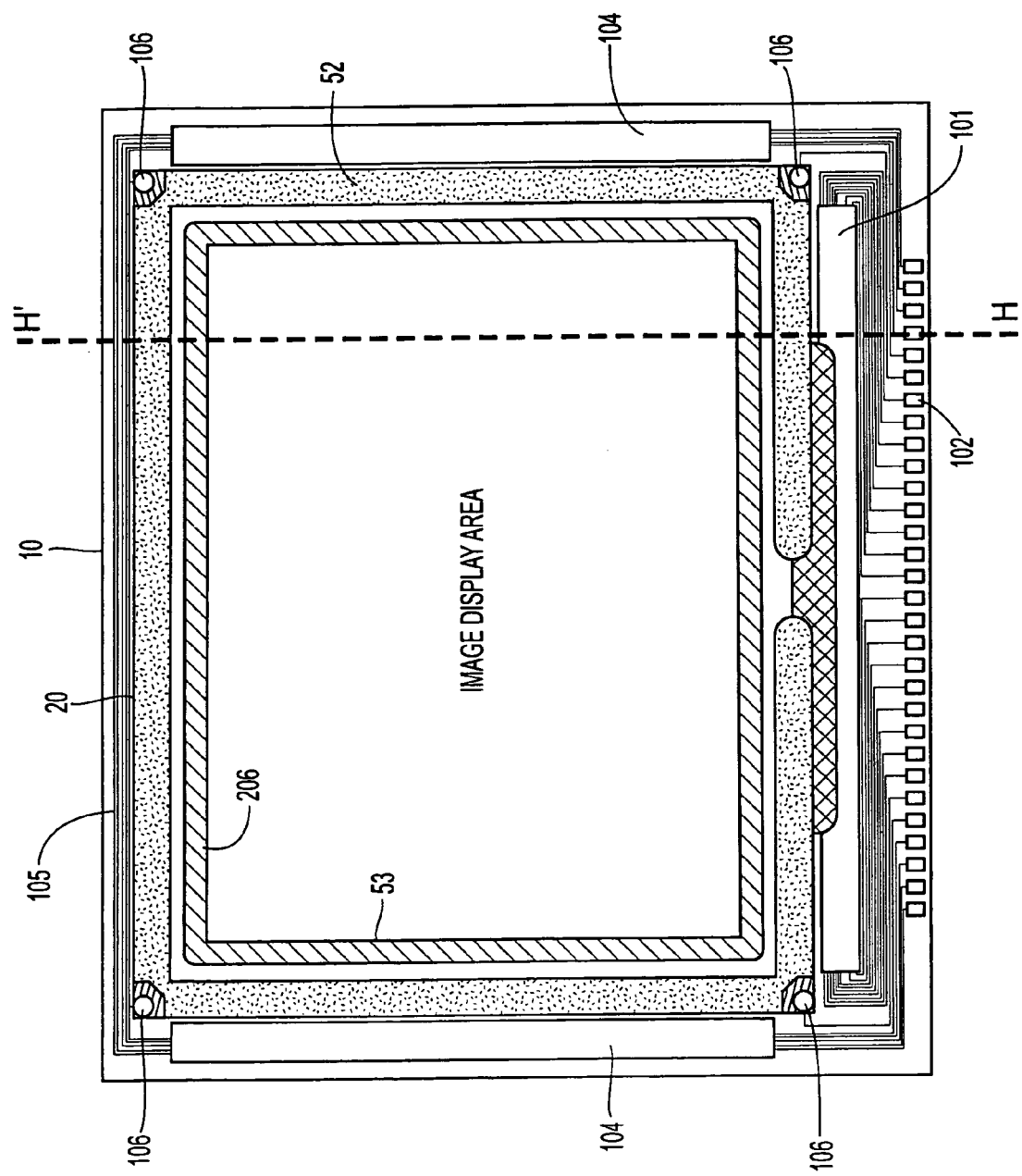
FIG. 32 is a plan view of the TFT array substrate with components arranged thereon, viewed from the opposing substrate in the electro-optical device of each exemplary embodiment.
Figure 33:
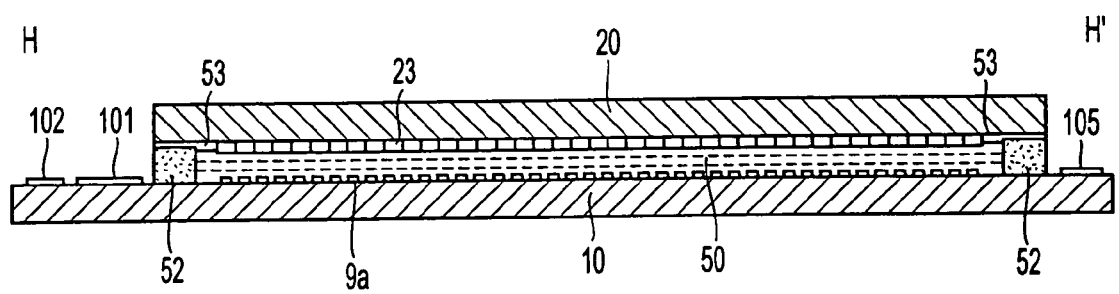
FIG. 33 is a cross-sectional view taken along line XXXII–XXXIII' in FIG. 30.

The general construction of the electro-optical device of the above exemplary embodiments is now discussed, referring to FIG. 32 and FIG. 33. FIG. 32 is a plan view of the TFT array substrate 10 with components arranged thereon, viewed from the opposing substrate 20, and FIG. 33 is a cross-sectional view taken along line XXXIII–XXXIII' in FIG. 32.

Referring to FIG. 32, the TFT array substrate 10 is provided with a sealing material 52 along the edges thereof, and a frame 53, fabricated of the same material as that of the light-shielding layer 23, or fabricated of a different material, extends along the internal edge of the sealing material 52, defining the peripheral outline of an image display area. A data line drive circuit 101 for driving the data line 6a by supplying the data line 6a with a video signal at a predetermined timing, and external circuit interconnect terminals 102 are arranged on one side of the TFT array substrate 10, external to the area of the sealing material 52. Scanning line drive circuits 104 for driving the scanning line 3a by supplying the scanning line 3a with a scanning signal at a predetermined timing is arranged on two sides of the TFT array substrate 10. If a delay in the scanning signal supplied to the scanning line 3a presents no problem, the scanning line drive circuit 104 may be mounted on one side only. Data line drive circuits 101 may be arranged on both sides of the image display area. For instance, odd data lines may be supplied with the video signal by the data line drive circuit arranged on one side of the image display area, and even data lines may be supplied with the video signal by the data line drive circuit arranged on the opposite side of the image display area. If the data lines 6a are driven in an interdigital fashion in this way, the area occupied by the data line drive circuits 101 is expanded, and a complex circuit may be incorporated therewithin. Arranged on the remaining one side of the image display area of the TFT array substrate 10 is a plurality of lines 105 for connecting the scanning line drive circuits 104 mounted on the two sides of the image display area. A conductive material 106 for electrically connecting the TFT array substrate 10 to the opposing substrate 20 is mounted at least one corner of the opposing substrate 20. Referring to FIG. 33, the opposing substrate 20 having almost the same outline as that of the sealing material 52 shown in FIG. 32 is bonded to the TFT array substrate 10 through the sealing material 52.

Besides the data line drive circuits 101 and the scanning line drive circuit 104, the TFT array substrate 10 may be provided with a sampling circuit for applying the video signal to the plurality of the data lines 6a at a predetermined timing, a precharge circuit for supplying a precharge signal at a predetermined voltage level to the plurality of the data lines 6a prior to the application of the video signal, and a test circuit for checking the quality and defects of the electro-optical device in the middle of the production or at the shipment thereof.

In each of the above-referenced exemplary embodiments, the data line drive circuit 101 and the scanning line drive circuit 104 may be electrically and mechanically connected to a driver LSI mounted on a TAB (Tape Automated Bonding) board, through an anisotropically electrically conductive film arranged about the TFT array substrate 10, rather than mounting the data line drive circuit 101 and the scanning line drive circuit 104 on the TFT array substrate 10. Arranged on the light-incident side of the opposing substrate 20 and the light-emitting side of the TFT array substrate 10 are respectively polarizer films, retardation films, and polarizers in predetermined directions to work with operation modes such as a TN mode, a VA mode, a PDLC (Polymer Dispersed Liquid Crystal) mode, and normally white mode/normally black modes.

When the electro-optical device of each of the above exemplary embodiments is incorporated in a projector, three panels of the electro-optical devices are used as RGB light valves, and each light valve receives the respective color light separated through RGB color separating dichroic mirrors. In each of the above exemplary embodiments, the opposing substrate 20 is not equipped with a color filter. Optionally, an RGB color filter may be arranged in a predetermined area facing the pixel electrode 9a having no light-shielding layer 23, on the opposing substrate 20 along with a protective film. In this way, the electro-optical device of each embodiment finds applications in a direct viewing or reflective type color electro-optical device, besides the liquid-crystal projector.

In each of the above exemplary embodiments, a light-shielding layer fabricated of a refractory metal may be mounted on the TFT array substrate 10 in a position facing the pixel switching TFT 30 (i.e., beneath the TFT). The light-shielding layer mounted beneath the TFT 30 prevents a rear surface reflection (returning light) from the TFT array substrate 10, or prevents projection light coming in from another electro-optical device penetrating a prism from entering the TFT 30 of the electro-optical device when a plurality of liquid-crystal devices are combined through prisms or the like. Microlenses may be arranged on the opposing substrate 20 on a one microlens to one pixel basis. A color filter may be arranged on the underside of the RGB pixel electrode 9a on the TFT array substrate 10 using color resist. In this way, condensation efficiency of the incident light is increased, and an electro-optical device providing a bright image results. By laminating interference layers having different refractive indexes on the opposing substrate 20, a dichroic filter for creating the RGB colors is formed taking advantage of interference of light. The opposing substrate with such a dichroic filter equipped makes an even brighter electro-optical device.

(Construction of the Electronic Equipment)

Figure 34:
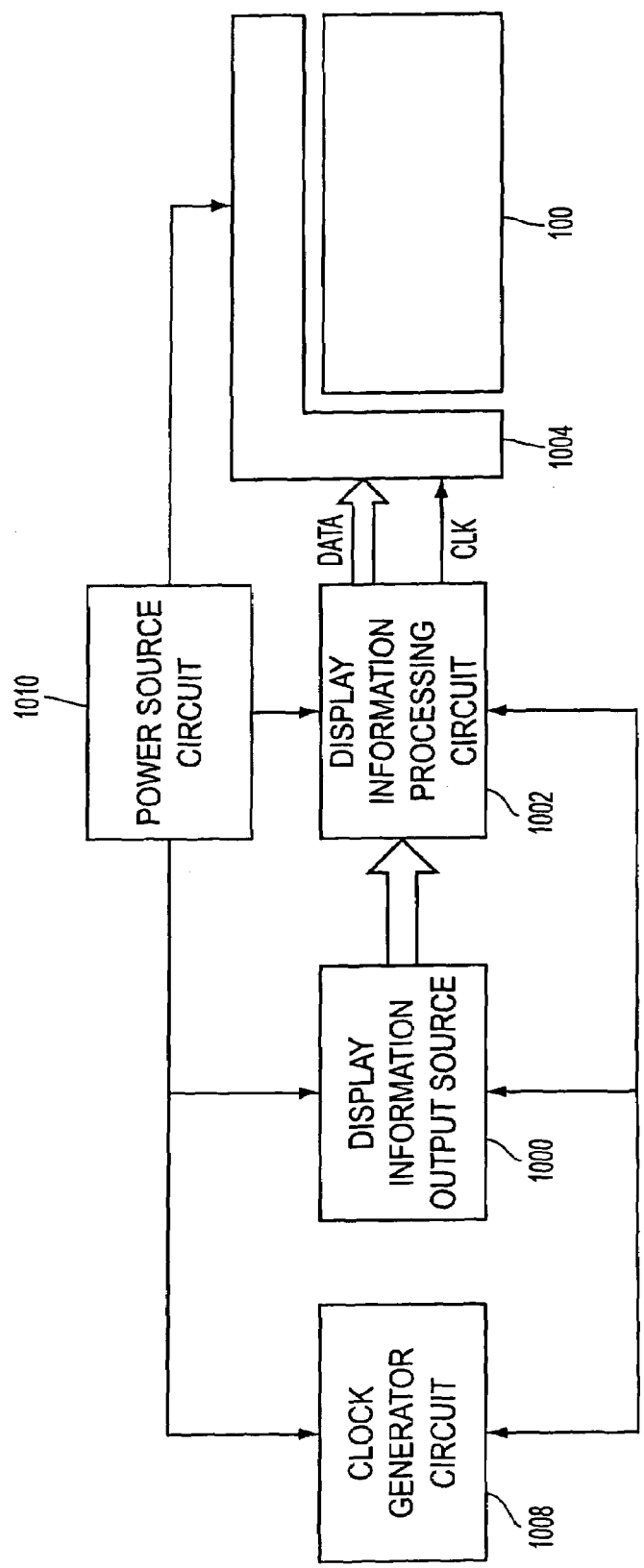
FIG. 34 shows an exemplary embodiment of electronic equipment.

FIG. 34 shows electronic equipment incorporating the liquid-crystal device of each of the above exemplary embodiments, and includes a display information output source 1000, a display information processing circuit 1002, a display drive circuit 1004, an electro-optical device 100 such as a liquid-crystal display device, a clock generator circuit 1008, and a power source circuit 1010. The display information output source 1000 includes a memory, such as a ROM or a RAM and a tuning circuit for outputting a video signal by tuning to the video signal in response to a clock signal from the clock generator circuit 1008. The display information processing circuit 1002 processes display information and outputs the processed display information in response to a clock signal from the clock generator circuit 1008. The display information processing circuit 1002 includes a variety of known processing circuits such as an amplifier and polarity reversal circuit, a serial-to-parallel converter circuit, a rotation circuit, a gamma correction circuit, and a clamp circuit. The display drive circuit 1004, including a scanning drive circuit and a data drive circuit, drives the liquid-crystal display device 100. The power source circuit 1010 supplies power to each of the above units.

Figure 35:
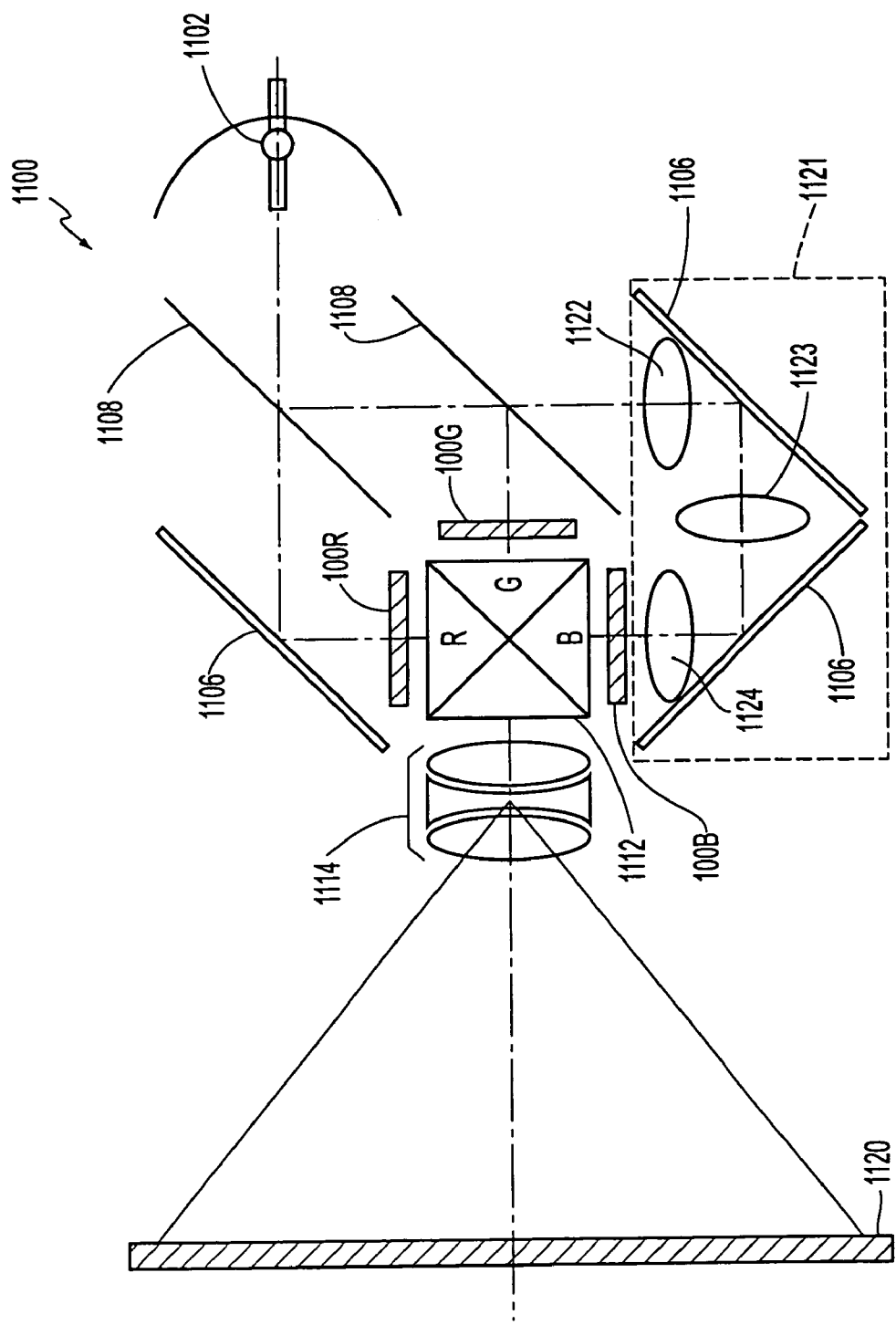
FIG. 35 shows an exemplary embodiment of a projection display apparatus in which each of the exemplary embodiments is implemented.
Figure 36:
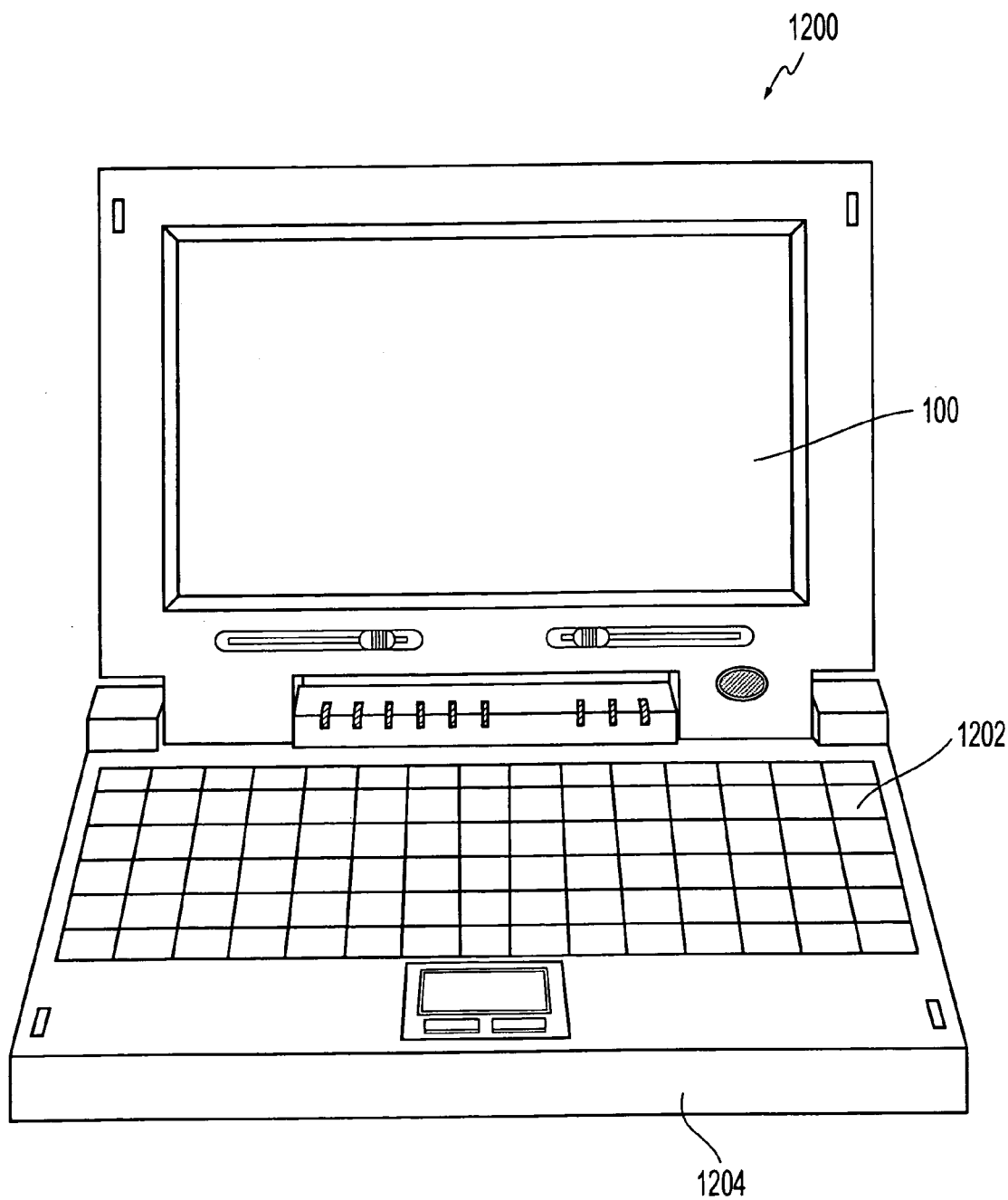
FIG. 36 shows an exemplary embodiment of a personal computer in which each of the exemplary embodiments is implemented.

As examples of the electronic equipment having the above construction, FIG. 35 shows a projection-type display apparatus and FIG. 36 shows a multimedia personal computer (PC) or an engineering workstation (EWS).

FIG. 35 shows the general construction of the major components of the projection-type display apparatus. There are shown a light source 1102, dichroic mirrors 1108, reflective mirrors 1106, an entrance lens 1122, a relay lens 1123, an exit lens 1124, liquid-crystal light modulators 100R, 100G, and 100B, a cross-dichroic prism 1112, and a projection lens 1114. The light source 1102 is composed of a lamp such as a metal halide lamp and a reflector for reflecting light from the lamp. The blue-light and green-light reflecting dichroic mirror 1108 transmits red light out of the light beam from the light source 1102 while reflecting blue light and green light. The transmitted red light is reflected from the reflective mirror 1106, and is incident on the red-color liquid-crystal light modulator 100R. The green light of light rays reflected from the dichroic mirror 1108 is reflected from a green-light reflecting dichroic mirror 1108, and is incident on the green-light liquid-crystal light modulator 100G. The blue light is then transmitted through the green-light reflecting dichroic mirror 1108. A light guide 1121, including a relay lens system composed of the entrance lens 1122, the relay lens 1123, and the exit lens 1124, is arranged for the blue light to avoid light loss in a long light path thereof, and via the light guide 1121, the blue light is incident on the blue-light liquid-crystal light modulator 100B. Three color light rays modulated through the light modulators are incident on the cross-dichroic prism 1112. This prism is constructed by gluing four right-angle prisms with a red-light reflecting dielectric multilayer film and a blue-light reflecting dielectric multilayer film interposed between interfaces thereof in a cross configuration. These dielectric multilayer films synthesize the three color light rays to form light indicating a color image. The projection lens 1114 constituting a projection optical system projects the synthesized light onto a screen, thereby enlarging and displaying the image on a screen 1120.

The personal computer 1200 shown in FIG. 36 includes a main unit 1204 provided with a keyboard 1202, and a liquid-crystal display screen 100, which is the electro-optical device.

The present invention is not limited to the above exemplary embodiments, and changes are possible within the spirit and scope of the claims and the specification, and the method for the electro-optical device incorporating such changes and the electro-optical device fall within the technical scope of the present invention.

What is claimed is:

1. An electro-optical device, comprising:
   a first substrate having a plurality of pixel electrodes;
   a second substrate having an opposing electrode facing the pixel electrodes; and
   an electro-optical material interposed between the first substrate and the second substrate,
   the electro-optical material between adjacent pixel electrodes being driven by mutually opposite polarity having a thickness less than a thickness of the electro-optical material between adjacent pixel electrodes being driven by same polarity.

2. The electro-optical device according to claim 1, further comprising:
   a thickness D of the electro-optical material formed in a transmissive area in relation to the pixel electrode; and
   a spacing W formed between the adjacent pixel electrodes being driven by mutually opposite polarity;
   the adjacent pixel electrodes arranged to have a relationship of 0.5D<W.

3. The electro-optical device according to claim 1, further comprising:
   a spacing W formed between the adjacent pixel electrodes being driven by mutually opposite polarity;
   a thickness d of the electro-optical material between one of the adjacent pixel electrodes being driven by mutually opposite polarity and the opposing electrode;
   the spacing being nearly equal to the thickness d.

4. The electro-optical device according to claim 1,
   the first substrate comprising a plurality of data lines, a plurality of scanning lines intersecting the data lines, a plurality of thin film transistors provided in corresponding to the plurality of data lines and the plurality of scanning lines.

5. The electro-optical device according to claim 4,
   the first substrate including:
   a plurality of projections formed in a position corresponding to a spacing between the adjacent pixel electrodes which are driven by mutually opposite polarity.

6. The electro-optical device according to claim 5,
   further comprising:
   a plurality of capacitor lines being formed along the scanning lines,
   the projections being formed in an area where the scanning line and the capacitor line are formed.

7. The electro-optical device according to claim 4,
   the second substrate including a plurality of projections formed in a position corresponding to a spacing between the adjacent pixel electrodes which are driven by mutually opposite polarity.

8. The electro-optical device according to claim 1,
   the electro-material being a vertically aligned liquid crystal.

9. A projector, comprising:
   a light valve including the electro-optical device according to claim 1; and
   a projection optical system.

* * * * *